(12) United States Patent
LaMuth

(10) Patent No.: US 6,587,846 B1
(45) Date of Patent: Jul. 1, 2003

(54) INDUCTIVE INFERENCE AFFECTIVE LANGUAGE ANALYZER SIMULATING ARTIFICIAL INTELLIGENCE

(76) Inventor: John E. LaMuth, P.O. Box 105, Lucerne Valley, CA (US) 92356-0105

( * ) Notice: Subject to any disclaimer, the term of this patent is extended or adjusted under 35 U.S.C. 154(b) by 485 days.

(21) Appl. No.: 09/640,896

(22) Filed: Aug. 18, 2000

Related U.S. Application Data
(60) Provisional application No. 60/157,322, filed on Oct. 1, 1999.

(51) Int. Cl.[7] ............................................. G06F 15/18
(52) U.S. Cl. ....................................................... 706/21
(58) Field of Search ........................................... 706/21

(56) References Cited

U.S. PATENT DOCUMENTS 6,157,913 A * 12/2000 Bernstein .................... 704/275
2002/0069220 A1 * 6/2002 Tran

* cited by examiner

*Primary Examiner*—George B. Davis

(57) ABSTRACT

A new model of motivational behavior, described as a ten-level metaperspectival hierarchy of ethical terms, serves as the foundation for an ethical simulation of artificial intelligence. This AI system is organized as a tandem, nested expert system, composed of a primary affective language analyzer, overseen by a master control unit-expert system (coordinating the motivational interchanges over real time). The systematic organization of the ethical hierarchy allows for extreme efficiency in the programming of the respective knowledge bases, employing the principles of inheritance for modeling the more abstract levels of the hierarchy: allowing a precise determination of the motivational level at issue during a given verbal interchange (defined as the passive-monitoring mode). An optional active monitoring mode permits the posing of simple yes-or-no questions, allowing for clarification of ambiguous language input. This basic motivational determination, in turn, serves as the basis for the synthesis of a response repertoire tailored to the computer, simulating a sense of motivation in a given verbal interaction (defined as the true AI simulation mode). The AI mode operates in concert with the passive monitoring mode, and in potential alternation with the active monitoring mode.

2 Claims, 45 Drawing Sheets

| | |
|---|---|
| NOSTALGIA<br>Previously, you (as reinforcer) have rewardingly acted in a reinforcing fashion towards me: overriding my (as procurer) solicitous treatment of you.<br>But now, I (as personal authority) will <u>nostalgically</u> admit acting in a solicitous fashion towards you: overruling your rewarding treatment of me. | HERO WORSHIP<br>Previously, I (as your personal authority) have nostalgically acted in solicitous fashion towards you: countering your (as reinforcer) rewarding treatment of me.<br>But now, you (as personal follower) will <u>worshipfully</u> react in a rewarding fashion towards me: overruling my (as PA) nostalgic treatment of you. |
| GLORY<br>Previously, you (as my personal follower) have worshipfully acted in a rewarding fashion towards me: overriding my (as PA) nostalgic treatment of you.<br>But now, I (as group authority) will <u>gloriously</u> act in a nostalgic fashion towards you: overruling your (as PF) worshipful treatment of me. | PRUDENCE<br>Previously, I (as your group authority) have gloriously acted in a nostalgic fashion towards you: countering your (as PF) worshipful treatment of me.<br>But now, you (as group representative) will <u>prudently</u> react in a worshipful fashion towards me: overruling my (as GA) gloriously-nostalgic treatment of you. |
| PROVIDENCE<br>Previously, you (as group representative) have prudently acted in a worshipful fashion towards me: overriding my (as GA) gloriously-nostalgic treatment of you.<br>But now, I (as spiritual authority) will gloriously react in a <u>provident</u> fashion towards you: overruling your (as GR) prudent-worship of me. | FAITH<br>Previously, I (as your spiritual authority) have gloriously acted in a provident fashion towards you: countering your (as GR) prudent-worship of me.<br>But now, you (as spiritual disciple) will prudently react in a <u>faithful</u> fashion towards me: overruling my (as SA) provident treatment of you. |
| GRACE<br>Previously, you (as my spiritual disciple) have prudently acted in a faithful fashion towards me: overriding my (as SA) gloriously-provident treatment of you.<br>But now, I (as humanitarian authority) will providently act in a <u>graceful</u> fashion towards you: overruling your (as SD) prudent-faith in me. | BEAUTY<br>Previously, I (as your humanitarian authority) have providently acted in a graceful fashion towards you: countering your (as SD) prudent-faith in me.<br>But now, you (as representative member of humanity) will <u>beauteously</u> react in a faithful fashion towards me: overruling my (as HA) graceful treatment of you. |
| TRANQUILITY<br>Previously, you (as representative member of humanity) have beauteously acted in a faithful fashion towards me: overriding my (as HA) providently-graceful treatment of you.<br>But now, I (as transcendental authority) will <u>tranquilly</u> react in a graceful fashion towards you: overruling your (as RH) beauteous-faith in me. | ECSTASY<br>Previously, I (as your transcendental authority) have tranquilly acted in a graceful fashion towards you: countering your (as RH) beauteous-faith in me.<br>But now, you (as transcendental follower) will beauteously react in an <u>ecstatic</u> fashion towards me: overruling my (as TA) tranquil sense of gracefulness. |

Fig. 1B

| GUILT | BLAME |
|---|---|
| Previously, you (as reinforcer) have leniently acted in a reinforcing fashion towards me: countering my (as procurer) submissive treatment of you.<br>But now, I (as personal authority) will <u>guiltily</u> admit acting in a submissive fashion towards you: overruling your lenient treatment of me. | Previously, I (as your personal authority) have guiltily acted in a submissive fashion towards you: countering your (as reinforcer) lenient treatment of me.<br>But now, you (as personal follower) will <u>blamefully</u> react in a lenient fashion towards me: overruling my (as PA) guilty treatment of you. |
| HONOR | JUSTICE |
| Previously, you (as my personal follower) have blamefully acted in a lenient fashion towards me: countering my (as PA) guilty treatment of you.<br>But now, I (as group authority) will <u>honorably</u> act in a guilty fashion towards you: overruling your (as PF) blameful treatment of me. | Previously, I (as your group authority) have honorably acted in a guilty fashion towards you: countering your (as PF) blameful treatment of me.<br>But now, you (as group representative) will <u>justly</u>-blame me: overruling my (as GA) honorable sense of guilt. |
| LIBERTY | HOPE |
| Previously, you (as group representative) have justly-blamed me: countering my (as GA) honorable sense of guilt.<br>But now, I (as spiritual authority) will honorably act in a <u>libertarian</u> fashion towards you: overruling your just-blaming of me. | Previously, I (as your spiritual authority) have honorably acted in a libertarian fashion towards you: countering your (as GR) just-blaming of me.<br>But now, you (as my spiritual disciple) will blamefully-<u>hope</u> for justice: overruling my (as SA) libertarian sense of honor. |
| FREE WILL | TRUTH |
| Previously, you (as my spiritual disciple) have blamefully-hoped for justice: countering my (as SA) libertarian sense of honor.<br>But now, I (as humanitarian authority) will honorably react in a <u>freely willed</u> fashion towards you: overruling your (as SD) blameful-hope for justice. | Previously, I (as your humanitarian authority) have honorably acted in a freely-willed fashion towards you: countering your (as SD) blameful-hope for justice.<br>But now, you (as representative member of humanity) will justly-hope for the <u>truth</u>: overruling my (as HA) libertarian sense of free will. |
| EQUALITY | BLISS |
| Previously, you (as representative member of humanity) have justly-hoped for the truth: countering my (as HA) libertarian sense of free will.<br>But now, I (as transcendental authority) will freely-willed act in an <u>egalitarian</u> fashion towards you: overruling your (as RH) just-hope for the truth. | Previously, I (as your transcendental authority) have freely-willed acted in an egalitarian fashion towards you: countering your (as RH) just-hope for the truth.<br>But now, you (as transcendental follower) will <u>blissfully</u> hope for the truth: overruling my (as TA) egalitarian treatment of you. |

Fig. 1C

| DESIRE | APPROVAL |
|---|---|
| Previously, I (as reinforcer) have rewardingly acted in a reinforcing fashion towards you: overriding your (as procurer) solicitous treatment of me.<br>But now, you (as personal authority) will desireously act in a solicitous fashion towards me: overruling my rewarding treatment of you. | Previously, you (as my personal authority) have desireously acted in a solicitous fashion towards me: countering my (as reinforcer) rewarding treatment of you.<br>But now, I (as personal follower) will rewardingly act in an approving fashion towards you: overruling your (as PA) desireous treatment of me. |
| DIGNITY | TEMPERANCE |
| Previously, I (as your personal follower) have rewardingly acted in an approving fashion towards you: overriding your (as PA) desireous treatment of me.<br>But now, you (as group authority) will dignifiedly act in a desireous fashion towards me: overruling my (as PF) approving treatment of you. | Previously, you (as my group authority) have dignifiedly acted in a desireous fashion towards me: countering my (as PF) approving treatment of you.<br>But now, I (as group representative) will temperately act in an approving fashion towards you: overruling your (as GA) dignified-desire for me. |
| CIVILITY | CHARITY |
| Previously, I (as group representative) have temperately acted in an approving fashion towards you: overriding your (as GA) dignified-desire for me.<br>But now, you (as spiritual authority) will dignifiedly act in a civil fashion towards me: overruling my (as GR) temperate-approval of you | Previously, you (as my spiritual authority) have dignifiedly acted in a civil fashion towards me: overriding my (as GR) temperate approval of you.<br>But now, I (as spiritual disciple) will temperately act in a charitable fashion towards you: overruling your (as SA) civilly-dignified treatment of me. |
| MAGNANIMITY | GOODNESS |
| Previously, I (as your spiritual disciple) have temperately acted in a charitable fashion towards you: overriding your (as SA) civilly-dignified treatment of me.<br>But now, you (as humanitarian authority) will civilly react in a magnanimous fashion towards me overruling my (as SD) temperately-charitable treatment of you. | Previously, you (as my humanitarian authority) have civilly behaved in a magnanimous fashion towards me: overriding my (as SD) charitable treatment of you<br>But now, I (as representative member of humanity) will charitably react with goodness towards you: overruling your (as HA) magnanimous treatment of me. |
| LOVE | JOY |
| Previously, I (as representative member of humanity) have charitably acted with goodness towards you: overriding your (as HA) civilly-magnanimous treatment of me.<br>But now, you (as transcendental authority) will magnanimously act in a loving fashion towards me: overruling my (as RH) charitable sense of goodness. | Previously, you (as my transcendental authority) have magnanimously acted in a loving fashion towards me: countering my (as RH) charitable sense of goodness.<br>But now, I (as transcendental follower) will goodly react in a joyous fashion towards you: overruling your (as TA) magnanimously-loving treatment of me. |

Fig. 1D

| WORRY | CONCERN |
|---|---|
| Previously, I (as reinforcer) have leniently acted in a reinforcing fashion towards you: overriding your (as procurer) submissive treatment of me.<br>But now, you (as personal authority) will <u>worrisomely</u> react in a submissive fashion towards me: overruling my lenient treatment of you. | Previously, you (as my personal authority) have worrisomely acted in a submissive fashion towards me: overriding my (as reinforcer) lenient treatment of you.<br>But now, I (as personal follower) will leniently act in a <u>concerned</u> fashion towards you: overruling your (as PA) worrisome treatment of me. |
| INTEGRITY | FORTITUDE |
| Previously, I (as your personal follower) have leniently acted in a concerned fashion towards you: overriding your (as PA) worrisome treatment of me.<br>But now, you (as group authority) will worrisomely react with <u>integrity</u> towards me: overruling my (as PF) concerned treatment of you. | Previously, you (as my group authority) have worrisomely acted in an integrity-filled fashion towards me: overriding my (as PF) concerned treatment of you.<br>But now, I (as group representative) will <u>fortitudinously</u> act in a concerned fashion towards you: overruling your (as GA) worrisome sense of integrity. |
| AUSTERITY | DECENCY |
| Previously, I (as group representative) have fortitudinously acted in a concerned fashion towards you: overriding your (as GA) worrisome sense of integrity.<br>But now, you (as spiritual authority) will <u>austerely</u> react with integrity towards me: overruling my (as GR) fortitudinous sense of concern. | Previously, you (as my spiritual authority) have austerely acted with integrity towards me: overriding my (as GR) fortitudinous sense of concern.<br>But now, I (as spiritual disciple) will fortitudinously act in a <u>decent</u> fashion towards you: overruling your (as SA) austere sense of integrity. |
| EQUANIMITY | WISDOM |
| Previously, I (as your spiritual disciple) have fortitudinously acted in a decent fashion towards you: overriding your (as SA) austere sense of integrity.<br>But now, you (as humanitarian authority) will austerely act with <u>equanimity</u> towards me: overruling my (as SD) decent treatment of you. | Previously, you (as my humanitarian authority) have austerely acted with equanimity towards me: overriding my (as SD) decent treatment of you.<br>But now, I (as representative member of humanity) will decently react in a <u>wise</u> fashion towards you: overruling your (as HA) austere sense of equanimity. |
| PEACE | HARMONY |
| Previously, I (as representative member of humanity) have decently acted in a wise fashion towards you: overriding your (as HA) austere sense of equanimity.<br>But now, you (as transcendental authority) will equananimously act in a <u>peaceable</u> fashion towards me: overruling my (as RH) decent sense of wisdom. | Previously, you (as my transcendental authority) have equananimously acted in a peaceable fashion towards me: overriding my (as RH) decent sense of wisdom.<br>But now, I (as transcendental follower) will wisely act in a <u>harmonious</u> fashion towards you: overruling your (as TA) peaceable treatment of me. |

Past  Present  Future (B)

Past  Present  Future

| LAZINESS | TREACHERY |
|---|---|
| Previously, you (as punisher) have refused to act rewardingly towards me: overriding my (as adversary) failure to act solicitously towards you.<br><br>But now, I (as personal authority) will lazily admit failing to act solicitously towards you: overruling your (as punisher) refusal to act rewardingly towards me. | Previously, I (as your personal authority) have lazily failed to act solicitously towards you: overriding your (as punisher) refusal to act rewardingly towards me.<br><br>But now, you (as personal follower) will treacherously refuse to act rewardingly towards me: overruling my (as PA) lazy treatment of you. |
| INFAMY | INSURGENCY |
| Previously, you (as my personal follower) have treacherously refused to act rewardingly towards me: overriding my (as PA) lazy treatment of you.<br><br>But now, I (as group authority) will infamously admit acting in a lazy fashion towards you: overruling your (as PF) treacherous treatment of me. | Previously, I (as your group authority) have infamously acted in a lazy fashion towards you: overriding your (as PF) treacherous treatment of me.<br><br>But now, you (as group representative) will insurgently react in a treacherous fashion towards me: overruling my (as GA) infamously-lazy treatment of you. |
| PRODIGALITY | BETRAYAL |
| Previously, you (as group representative) have insurgently acted in a treacherous fashion towards me: overriding my (as GA) lazy sense of infamy.<br><br>But now, I (as spiritual authority) will infamously admit acting in a prodigal fashion towards you: overruling your (as GR) insurgently-treacherous treatment of me. | Previously, I (as your spiritual authority) have infamously acted in a prodigal fashion towards you: overriding your (as GR) insurgently-treacherous treatment of me.<br><br>But now, you (as spiritual disciple) will insurgently react in a betraying fashion towards me: overruling my (as SA) infamously-prodigal treatment of you. |
| WRATH | UGLINESS |
| Previously, you (as my spiritual disciple) have insurgently acted in a betraying fashion towards me: overriding my (as SA) infamously-prodigal treatment of you.<br><br>But now, I (as humanitarian authority) will prodigally admit acting in a wrathful fashion towards you: overruling your (as SD) insurgent-betrayal of me. | Previously, I (as your humanitarian authority) have prodigally acted in a wrathful fashion towards you: overriding your (as SD) insurgent betrayal of me.<br><br>But now, you (as representative member of humanity) will betrayingly react in an ugly fashion towards me: overruling my (as HA) wrathful treatment of you. |
| ANGER | ABOMINATION |
| Previously, you (as representative member of humanity) have betrayingly acted in an ugly fashion towards me: overriding my (as HA) wrathful treatment of you.<br><br>But now, I (as transcendental authority) will wrathfully act in an angry fashion towards you: overruling your (as RH) ugly-betrayal of me. | Previously, I (as your transcendental authority) have wrathfully acted in an angry fashion towards you: overriding your (as RH) ugly-betrayal of me.<br><br>But now, you (as transcendental follower) will abominably react in an ugly fashion towards me: overruling my (as TA) angry treatment of you. |

Fig. 3B

| NEGLIGENCE | VINDICTIVENESS |
|---|---|
| Previously, you (as punisher) have refused to act leniently towards me: overriding my (as adversary) failure to act submissively towards you.<br>But now, I (as personal authority) will <u>negligently</u> admit failing to act submissively towards you: overruling your (as punisher) refusal to act leniently towards me. | Previously, I (as your personal authority) have negligently failed to act submissively towards you: overriding your (as punisher) refusal to act leniently towards me.<br>But now, you (as personal follower) will <u>vindictively</u> refuse to act leniently towards me: overruling my (as PA) negligent treatment of you. |
| DISHONOR | VENGEANCE |
| Previously, you (as my personal follower) have vindictively refused to act leniently towards me: overriding my (as PA) negligent treatment of you.<br>But now, I (as group authority) will negligently act in a <u>dishonorable</u> fashion towards you: overruling your (as PF) vindictive treatment of me. | Previously, I (as your group authority) have negligently acted in a dishonorable fashion towards you: overriding your (as PF) vindictive treatment of me.<br>But now, you (as group representative) will <u>vengefully</u> react in a vindictive fashion towards me: overruling my (as GA) negligently-dishonorable treatment of you. |
| SLAVERY | DESPAIR |
| Previously, you (as group representative) have vengefully acted in a vindictive fashion towards me: overriding my (as GA) negligently-dishonorable treatment of you.<br>But now, I (as spiritual authority) will dishonorably admit <u>enslaving</u> you: overruling your vengefully-vindictive treatment of me. | Previously, I (as your spiritual authority) have dishonorably admitted enslaving you: overriding your (as GR) vengefully-vindictive treatment of me.<br>But now, you (as my spiritual disciple) will vengefully react in a <u>despairing</u> fashion towards me: overruling my (as SA) dishonorable-enslavement of you. |
| TYRANNY | HYPOCRISY |
| Previously, you (as my spiritual disciple) have vengefully acted in a despairing fashion towards me: overriding my (as SA) dishonorable-enslavement of you.<br>But now, I (as humanitarian authority) will <u>tyrannically</u> admit enslaving you: overruling your (as SD) despairing treatment of me. | Previously, I (as your humanitarian authority) have tyrannically admitted enslaving you: overriding your (as SD) despairing treatment of me.<br>But now, you (as representative member of humanity) will despairingly behave in a <u>hypocritical</u> fashion towards me: overruling my (as HA) tyrannical-enslavement of you. |
| PREJUDICE | PERDITION |
| Previously, you (as representative member of humanity) have despairingly behaved in a hypocritical fashion towards me: overriding my (as HA) tyrannical-enslavement of you.<br>But now, I (as transcendental authority) will tyrannically admit acting in a <u>prejudicial</u> fashion towards you: overruling your (as RH) hypocritical treatment of me. | Previously, I (as your transcendental authority) have tyrannically acted in an prejudicial fashion towards you: overriding your (as RH) hypocritical sense of despair.<br>But now, you (as transcendental follower) will hypocritically behave in a <u>perditionable</u> fashion towards me: overruling my (as TA) prejudicial treatment of you. |

Fig. 3C

| APATHY | SPITE |
|---|---|
| Previously, I (as punisher) have refused to act rewardingly towards you: overriding your (as adversary) failure to act solicitously towards me.<br>But now, you (as personal authority) will apathetically fail to act solicitously towards me: overruling my (as punisher) refusal to act rewardingly towards you. | Previously, you (as my personal authority) have apathetically failed to act solicitously towards me: overriding my (as punisher) refusal to act rewardingly towards you.<br>But now, I (as personal follower) will spitefully refuse to act rewardingly towards you: overruling your (as PA) apathetic treatment of me. |
| FOOLISHNESS | GLUTTONY |
| Previously, I (as your personal follower) have spitefully refused to act rewardingly towards you: overriding your (as PA) apathetic treatment of me.<br>But now, you (as group authority) will foolishly react in an apathetic fashion towards me: overruling my (as PF) spiteful treatment of you. | Previously, you (as my group authority) have foolishly acted in an apathetic fashion towards me: overriding my (as PF) spiteful treatment of you.<br>But now, I (as group representative) will gluttonously react in a spiteful fashion towards you: overruling your (as GA) foolishly-apathetic treatment of me. |
| VULGARITY | AVARICE |
| Previously, I (as group representative) have gluttonously acted in a spiteful fashion towards you: overriding your (as GA) foolishly-apathetic treatment of you.<br>But now, you (as spiritual authority) will foolishly react in a vulgar fashion towards me: overruling my (as GR) gluttonously-spiteful treatment of you | Previously, you (as my spiritual authority) have foolishly acted in a vulgar fashion towards me: overriding my (as GR) gluttonously-spiteful treatment of you.<br>But now, I (as spiritual disciple) will gluttonously react in an avaricious fashion towards you: overruling your (as SA) foolishly-vulgar treatment of me. |
| OPPRESSION | EVIL |
| Previously, I (as your spiritual disciple) have gluttonously acted in an avaricious fashion towards you: overriding your (as SA) foolishly-vulgar treatment of me.<br>But now, you (as humanitarian authority) will vulgarly react in an oppressive fashion towards me overruling my (as SD) gluttonously-avaricious treatment of you. | Previously, you (as my humanitarian authority) have vulgarly acted in an oppressive fashion towards me: overriding my (as SA) gluttonously-avaricious treatment of you<br>But now, I (as representative member of humanity) will avariciously react in an evil fashion towards you: overruling your (as HA) vulgarly-oppressive treatment of me. |
| HATRED | INIQUITY |
| Previously, I (as representative member of humanity) have avariciously acted in an evil fashion towards you: overriding your (as HA) vulgarly-oppressive treatment of me.<br>But now, you (as transcendental authority) will oppressively react in a hateful fashion towards me: overruling my (as RH) evil treatment of you. | Previously, you (as my transcendental authority) have hatefully acted in an oppressive fashion towards me: overriding my (as RH) avaricious sense of evil.<br>But now, I (as transcendental follower) will evilly react in an iniquitous fashion towards you: overruling your (as TA) hateful treatment of me. |

Fig. 3D

| | |
|---|---|
| INDIFFERENCE<br>Previously, I (as punisher) have refused to act leniently towards you: overriding your (as adversary) failure to act submissively towards me.<br>But now, you (as personal authority) will <u>indifferently</u> fail to act submissively towards me: overruling my (as punisher) refusal to act leniently towards you. | MALICE<br>Previously, you (as my personal authority) have indifferently failed to act submissively towards me: overriding my (as punisher) refusal to act leniently towards you.<br>But now, I (as personal follower) will <u>maliciously</u> refuse to act leniently towards you: overruling your (as PA) indifferent treatment of me. |
| CAPRICIOUSNESS<br>Previously, I (as your personal follower) have maliciously refused to act leniently towards you: overriding your (as PA) indifferent treatment of me.<br>But now, you (as group authority) will <u>capriciously</u> react in an indifferent fashion towards me: overruling my (as PF) malicious treatment of you. | COWARDICE<br>Previously, you (as my group authority) have capriciously acted in an indifferent fashion towards me: overriding my (as PF) malicious treatment of you.<br>But now, I (as group representative) will <u>cowardly</u> react in a malicious fashion towards you: overruling your (as GA) capricious sense of indifference. |
| CRUELTY<br>Previously, I (as group representative) have cowardly acted in a malicious fashion towards you: overriding your (as GA) capricious sense of indifference.<br>But now, you (as spiritual authority) will capriciously react in a <u>cruel</u> fashion towards me: overruling my (as GR) cowardly-malicious treatment of you. | ANTAGONISM<br>Previously, you (as my spiritual authority) have capriciously acted in a cruel fashion towards me: overriding my (as GR) cowardly-malicious treatment of you.<br>But now, I (as spiritual disciple) will cowardly react in an <u>antagonistic</u> fashion towards you: overruling your (as SA) cruel treatment of me. |
| PERSECUTION<br>Previously, I (as your spiritual disciple) have cowardly acted in an antagonistic fashion towards you: overriding your (as SA) cruel treatment of me.<br>But now, you (as humanitarian authority) will cruelly-<u>persecute</u> me: overruling my (as SD) cowardly-antagonistic treatment of you. | CUNNING<br>Previously, you (as my humanitarian authority) have cruelly-persecuted me: overriding my (as SD) cowardly-antagonistic treatment of you.<br>But now, I (as representative member of humanity) will antagonistically react in a <u>cunning</u> fashion towards you: overruling your (as HA) cruel-persecution of me. |
| BELLIGERENCE<br>Previously, I (as representative member of humanity) have antagonistically acted in a cunning fashion towards you: overriding your (as HA) cruel-persecution of me.<br>But now, you (as transcendental authority) will <u>belligerently</u>-persecute me: overruling my (as RH) cunning treatment of you. | TURPITUDE<br>Previously, you (as my transcendental authority) have belligerently-persecuted me: overriding my (as RH) antagonistic sense of cunning.<br>But now, I (as transcendental follower) will cunningly react in a <u>turpitudinous</u> fashion towards you: overruling your (as TA) belligerent-persecution of me. |

Fig. 3E

| POIGNANCE | ADORATION |
|---|---|
| Previously, I (as reinforcer) have rewardingly acted in a reinforcing fashion towards you: overriding your (as procurer) solicitous treatment of me.<br>But now, you (as personal authority) will poignantly admit acting in a solicitous fashion towards me: overruling my (as reinforcer) rewarding treatment of you. | Previously, you (as my personal authority) have poignantly admitted acting in a solicitous fashion towards me: overriding my (as reinforcer) rewarding treatment of you.<br>But now, I (as personal follower) will adoringly act in a rewarding fashion towards you: overruling your (as PA) poignant treatment of me. |
| EXALTATION | CIRCUMSPECTION |
| Previously, I (as your personal follower) have adoringly acted in a rewarding fashion towards you: overriding your (as PA) poignant treatment of me.<br>But now, you (as group authority) will poignantly admit acting in an exalted fashion towards me: overruling my (as PF) adoring treatment of you. | Previously, you (as my group authority) have poignantly acted in an exalted fashion towards me: overriding my (as PF) adoring treatment of you.<br>But now, I (as group representative) will circumspectively react in an adoring fashion towards you: overruling your (as GA) exalted treatment of me. |
| BOUNTIFULNESS | DEVOTION |
| Previously, I (as group representative) have circumspectively acted in an adoring fashion towards you: overriding your (as GA) poignant sense of exaltation<br>But now, you (as spiritual authority) will exaltedly admit acting in a bountiful fashion towards me: overruling my (as GR) circumspective-adoration for you | Previously, you (as my spiritual authority) have exaltedly acted in a bountiful fashion towards me: overriding my (as GR) circumspective adoration for you.<br>But now, I (as spiritual disciple) will circumspectively react in a devoted fashion towards you: overruling your (as SA) bountiful treatment of me. |
| BLESSINGS | CHARM |
| Previously, I (as your spiritual disciple) have circumspectively acted in a devoted fashion towards you: overriding your (as SA) bountiful treatment of me.<br>But now, you (as humanitarian authority) will bountifully-bless me: overruling my (as SD) circumspective-devotion for you. | Previously, you (as my humanitarian authority) have bountifully-blessed me: overriding my (as SD) circumspective-devotion for you.<br>But now, I (as representative member of humanity) will charmingly react in a devoted fashion towards you: overruling your (as HA) bountiful-blessing of me. |
| SERENITY | HAPPINESS |
| Previously, I (as representative member of humanity) have charmingly acted in a devoted fashion towards you: overriding your (as HA) bountiful-blessing of me.<br>But now, you (as transcendental authority) will serenely-bless me: overruling my (as RH) charming-devotion for you. | Previously, you (as my transcendental authority) have serenely-blessed me: overriding my (as RH) charming-devotion for you.<br>But now, I (as transcendental follower) will charmingly react in a happy fashion towards you: overruling your (as TA) serene-blessing of me. |

Fig. 4B

| CULPABILITY | CENSURE |
|---|---|
| Previously, I (as reinforcer) have leniently acted in a reinforcing fashion towards you: overriding your (as procurer) submissive treatment of me.<br>But now, you (as personal authority) will culpably admit acting in a submissive fashion towards me: overruling my (as reinforcer) lenient treatment of you. | Previously, you (as my personal authority) have culpably admitted acting in a submissive fashion towards me: overriding my (as reinforcer) lenient treatment of you.<br>But now, I (as personal follower) will censuringly react in a lenient fashion towards you: overruling your (as PA) culpable treatment of me. |
| UPRIGHTNESS | EQUITABLENESS |
| Previously, I (as your personal follower) have censuringly acted in a lenient fashion towards you: overriding your (as PA) culpable treatment of me.<br>But now, you (as group authority) will culpably admit acting in an upright fashion towards me: overruling my (as PF) censuring treatment of you. | Previously, you (as my group authority) have culpably acted in an upright fashion towards me: overriding my (as PF) censuring treatment of you.<br>But now, I (as group representative) will equitably react in a censuring fashion towards you: overruling your (as GA) culpable sense of uprightness. |
| FREEDOM | FAIRNESS |
| Previously, I (as group representative) have equitably acted in a censuring fashion towards you: overriding your (as GA) culpable sense of uprightness.<br>But now, you (as spiritual authority) will freely admit acting in an upright fashion towards me: overruling my (as GR) equitable-censuring of you. | Previously, you (as my spiritual authority) have freely acted in an upright fashion towards me: overriding my (as GR) equitable-censuring of you.<br>But now, I (as spiritual disciple) will equitably react in a fair fashion towards you: overruling your (as SA) free sense of uprightness. |
| CONSCIENCE | CREDENCE |
| Previously, I (as your spiritual disciple) have equitably acted in a fair fashion towards you: overriding your (as SA) free sense of uprightness.<br>But now, you (as humanitarian authority) will freely admit acting in a conscientious fashion towards me: overruling my (as SD) equitable sense of fairness. | Previously, you (as my humanitarian authority) have freely acted in a conscientious fashion towards me: overriding my (as SD) equitable sense of fairness.<br>But now, I (as representative member of humanity) will fairly express a sense of credence in you: overruling your (as HA) free sense of conscientiousness. |
| BROTHERHOOD | CONTENTMENT |
| Previously, I (as representative member of humanity) have fairly expressed a sense of credence in you: overriding your (as HA) free sense of conscientiousness.<br>But now, you (as transcendental authority) will conscientiously admit acting in a brotherly fashion towards me: overruling my (as RH) fair sense of credence. | Previously, you (as my transcendental authority) have conscientiously acted in a brotherly fashion towards me: overriding my (as RH) fair sense of credence.<br>But now, I (as transcendental follower) will contentedly express a sense of credence in you: overruling your (as TA) conscientious sense of brotherhood. |

Fig. 4C

| | |
|---|---|
| PASSION<br>Previously, you (as reinforcer) have rewardingly acted in a reinforcing fashion towards me: overriding my (as procurer) solicitous treatment of you.<br>But now, I (as personal authority) will <u>passionately</u> act in a solicitous fashion towards you: overruling your (as reinforcer) rewarding treatment of me. | ADMIRATION<br>Previously, I (as your personal authority) have passionately acted in solicitous fashion towards you: overriding your (as reinforcer) rewarding treatment of me.<br>But now, you (as personal follower) will rewardingly act in an <u>admiring</u> fashion towards me: overruling my (as PA) passionate treatment of you. |
| RESPECTFULNESS<br>Previously, you (as my personal follower) have rewardingly acted in an admiring fashion towards me: overriding my (as PA) passionate treatment of you.<br>But now, I (as group authority) will passionately act in a <u>respectful</u> fashion towards you: overruling your (as PF) admiring treatment of me. | CONTINENCE<br>Previously, I (as your group authority) have passionately acted in a respectful fashion towards you: overriding your (as PF) admiring treatment of me.<br>But now, you (as group representative) will <u>continently</u> react in an admiring fashion towards me: overruling my (as GA) passionate-respect for you. |
| COURTESY<br>Previously, you (as group representative) have continently acted in an admiring fashion towards me: overriding my (as GA) passionate-respect for you.<br>But now, I (as spiritual authority) will <u>courteously</u> react in a respectful fashion towards you: overruling your (as GR) continently-admiring treatment of me. | KINDNESS<br>Previously, I (as your spiritual authority) have courteously acted in a respectful fashion towards you: overriding your (as GR) continently-admiring treatment of me.<br>But now, you (as spiritual disciple) will continently react in a <u>kind</u> fashion towards me: overruling my (as SA) courteous-respect for you. |
| GRACIOUSNESS<br>Previously, you (as my spiritual disciple) have continently acted in a kind fashion towards me: overriding my (as SA) courteous-respect for you.<br>But now, I (as humanitarian authority) will courteously react in a <u>gracious</u> fashion towards you: overruling your (as SD) kind treatment of me. | BENEVOLENCE<br>Previously, I (as your humanitarian authority) have courteously acted in a gracious fashion towards you: overriding your (as SD) continently-kind treatment of me.<br>But now, you (as representative member of humanity) will <u>benevolently</u> act in a kind fashion towards me: overruling my (as HA) gracious treatment of you. |
| AFFECTION<br>Previously, you (as representative member of humanity) have benevolently acted in a kind fashion towards me: overriding my (as HA) couteously-gracious treatment of you.<br>But now, I (as transcendental authority) will graciously react in an <u>affectionate</u> fashion towards you: overruling your (as RH) benevolent sense of kindness. | GLADNESS<br>Previously, I (as your transcendental authority) have graciously acted in an affectionate fashion towards you: overriding your (as RH) benevolent sense of kindness.<br>But now, you (as transcendental follower) will benevolently react with <u>gladness</u> towards me: overruling my (as TA) affectionate treatment of you. |

Fig. 4D

| APPREHENSION | CARE |
|---|---|
| Previously, you (as reinforcer) have leniently acted in a reinforcing fashion towards me: overriding my (as procurer) submissive treatment of you.<br>But now, I (as personal authority) will <u>apprehensively</u> act in a submissive fashion towards you: overruling your (as reinforcer) lenient treatment of me. | Previously, I (as your personal authority) have apprehensively acted in a submissive fashion towards you: overriding your (as reinforcer) lenient treatment of me.<br>But now, you (as personal follower) will <u>caringly</u> react in a lenient fashion towards me: overruling my (as PA) apprehensive treatment of you. |
| PROBITY | BRAVERY |
| Previously, you (as my personal follower) have caringly acted in a lenient fashion towards me: overriding my (as PA) apprehensive treatment of you.<br>But now, I (as group authority) will apprehensively react in a <u>probity</u>-filled fashion towards you: overruling your (as PF) caring treatment of me. | Previously, I (as your group authority) have apprehensively acted in a probity-filled fashion towards you: overriding your (as PF) caring treatment of me.<br>But now, you (as group representative) will <u>bravely</u> react in a caring fashion towards me: overruling my (as GA) probity-filled treatment of you. |
| FORBEARANCE | SCRUPULOUSNESS |
| Previously, you (as group representative) have bravely acted in a caring fashion towards me: overriding my (as GA) probity-filled treatment of you.<br>But now, I (as spiritual authority) will <u>forbearingly</u> react with probity towards you: overruling your brave treatment of me. | Previously, I (as your spiritual authority) have forbearingly acted with probity towards you: overriding your (as GR) brave treatment of me.<br>But now, you (as my spiritual disciple) will <u>scrupulously</u> react in a brave fashion towards me: overruling my (as SA) forbearing treatment of you. |
| PATIENCE | SHREWDNESS |
| Previously, you (as my spiritual disciple) have scrupulously acted in a brave fashion towards me: overriding my (as SA) forbearing treatment of you.<br>But now, I (as humanitarian authority) will forbearingly react in a <u>patient</u> fashion towards you: overruling your (as SD) scrupulous treatment of me. | Previously, I (as your humanitarian authority) have forbearingly acted in a patient fashion towards you: overriding your (as SD) scrupulous treatment of me.<br>But now, you (as representative member of humanity) will scrupulously react in a <u>shrewd</u> fashion towards me: overruling my (as HA) patient treatment of you. |
| AMITY | SYMPATHY |
| Previously, you (as representative member of humanity) have scrupulously acted in a shrewd fashion towards me: overriding my (as HA) patient treatment of you.<br>But now, I (as transcendental authority) will <u>amicably</u> react in a patient fashion towards you: overruling your (as RH) shrewd treatment of me. | Previously, I (as your transcendental authority) have patiently acted in an amicable fashion towards you: overriding your (as RH) scrupulous sense of shrewdness.<br>But now, you (as transcendental follower) will shrewdly react in a <u>sympathetic</u> fashion towards me: overruling my (as TA) amicable treatment of you. |

Fig. 4E

| SLOTH | MUTINY |
|---|---|
| Previously, I (as punisher) have refused to act rewardingly towards you: overriding your (as adversary) failure to act solicitously towards me.<br><br>But now, you (as my personal authority) will slothfully admit failing to act solicitously towards me: overruling my (as punisher) refusal to act rewardingly towards you. | Previously, you (as my personal authority) have slothfully failed to act solicitously towards me: overriding my (as punisher) refusal to act rewardingly towards you.<br><br>But now, I (as personal follower) will mutinously refuse to act rewardingly towards you: overruling your (as PA) slothful treatment of me. |
| NOTORIETY | REBELLION |
| Previously, I (as your personal follower) have mutinously refused to act rewardingly towards you: overriding your (as PA) slothful treatment of me.<br><br>But now, you (as group authority) will slothfully react in a notorious fashion towards me: overruling my (as PF) mutinous treatment of you. | Previously, you (as my group authority) have slothfully acted in a notorious fashion towards me: overriding my (as PF) mutinous treatment of you.<br><br>But now, I (as group representative) will mutinously-rebel against you: overruling your (as GA) slothful sense of notoriety. |
| SCANDALOUSNESS | TREASON |
| Previously, I (as group representative) have mutinously-rebelled against you: overriding your (as GA) slothful sense of notoriety.<br><br>But now, you (as spiritual authority) will notoriously react in a scandalous fashion towards me: overruling my (as GR) mutinous-rebellion against you. | Previously, you (as my spiritual authority) have notoriously acted in a scandalous fashion towards me: overriding my (as GR) mutinous-rebellion against you.<br><br>But now, I (as spiritual disciple) will treasonously-rebel against you: overruling your (as SA) scandalous sense of notoriety. |
| DISGRACEFULNESS | VILENESS |
| Previously, I (as your spiritual disciple) have treasonously-rebelled against you: overriding your (as SA) scandalous sense of notoriety.<br><br>But now, you (as humanitarian authority) will scandalously react in a disgraceful fashion towards me: overruling my (as SD) me overruling my (as SD) treasonous-rebellion against you. | Previously, you (as my humanitarian authority) have scandalously acted in a disgraceful fashion towards me: overriding my (as SA) treasonous-rebellion against you.<br><br>But now, I (as representative member of humanity) will treasonously react in a vile fashion towards you: overruling your (as HA) scandalously-disgraceful treatment of me. |
| FURY | ABHORRENCE |
| Previously, I (as representative member of humanity) have treasonously acted in a vile fashion towards you: overriding your (as HA) scandalously-disgraceful treatment of me.<br><br>But now, you (as transcendental authority) will furiously react in a disgraceful fashion towards me: overruling my (as RH) vile sense of treason. | Previously, you (as my transcendental authority) have furiously acted in an disgraceful fashion towards me: overriding my (as RH) vile sense of treason.<br><br>But now, I (as transcendental follower) will vilely react in an abhorrent fashion towards you: overruling your (as TA) furious treatment of me. |

Fig. 5B

| | |
|---|---|
| CARELESSNESS<br>Previously, I (as punisher) have refused to act leniently towards you: overriding your (as adversary) failure to act submissively towards me.<br>But now, you (as personal authority) will <u>carelessly</u> admit failing to act submissively towards me: overruling my (as punisher) refusal to act leniently towards you. | RETALIATION<br>Previously, you (as my personal authority) have carelessly failed to act submissively towards me: overriding my (as punisher) refusal to act leniently towards you.<br>But now, I (as personal follower) will <u>retaliatively</u> refuse to act leniently towards you: overruling your (as PA) careless treatment of me. |
| IGNOMINY<br>Previously, I (as your personal follower) have retaliatively refused to act leniently towards you: overriding your (as PA) careless treatment of me.<br>But now, you (as group authority) will <u>ignominiously</u> admit acting in a careless fashion towards me: overruling my (as PF) retaliatory treatment of you. | RETRIBUTION<br>Previously, you (as my group authority) have ignominiously admitted acting in a careless fashion towards me: overriding my (as PF) retaliatory treatment of you.<br>But now, I (as group representative) will retaliatively seek <u>retribution</u> against you: overruling your (as GA) ignominious treatment of me. |
| BONDAGE<br>Previously, I (as group representative) have retaliatively sought retribution against you: overriding your (as GA) ignominious treatment of me.<br>But now, you (as spiritual authority) will ignominiously admit keeping me in <u>bondage</u>: overruling my (as GR) retaliatory quest for retribution. | DESPERATION<br>Previously, you (as my spiritual authority) have ignominiously admitted maintaining me in bondage: overriding my (as GR) retaliatory quest for retribution.<br>But now, I (as spiritual disciple) will <u>desperately</u> seek retribution against you: overruling your (as SA) ignominious maintenance of me in bondage. |
| SUBJUGATION<br>Previously, I (as your spiritual disciple) have desperately sought retribution against you: overriding your (as SA) ignominious maintenance of me in bondage.<br>But now, you (as humanitarian authority) will ignominiously <u>subjugate</u> me in bondage: overruling my (as SD) desperate quest for retribution. | MENDACITY<br>Previously, you (as my humanitarian authority) have ignominiously subjugated me in bondage: overriding my (as SD) desperate quest for retribution.<br>But now, I (as representative member of humanity) will desperately react in a <u>mendacious</u> fashion towards you: overruling your (as HA) subjugation of me in bondage. |
| BIGOTRY<br>Previously, I (as representative member of humanity) have desperately acted in a mendacious fashion towards you: overriding your (as HA) subjugation of me in bondage.<br>But now, you (as transcendental authority) will ignominiously subjugate me in a <u>bigoted</u> fashion: overruling my (as RH) desperate sense of mendacity. | PERNICITY<br>Previously, you (as my transcendental authority) have ignominiously subjugated me in a bigoted fashion: overriding my (as RH) desperate sense of mendacity.<br>But now, I (as transcendental follower) will mendaciously react in a <u>pernicious</u> fashion towards you: overruling your (as TA) bigoted treatment of me. |

Fig. 5C

| | |
|---|---|
| DISPASSIONATENESS<br>Previously, you (as punisher) have refused to act rewardingly towards me: overriding my (as adversary) failure to act solicitously towards you.<br>But now, I (as personal authority) will <u>dispassionately</u> fail to act solicitously towards you: overruling your (as punisher) refusal to act rewardingly towards me. | GRUDGINGNESS<br>Previously, I (as your personal authority) have dispassionately failed to act solicitously towards you: overriding your (as punisher) refusal to act rewardingly towards me.<br>But now, you (as personal follower) will <u>grudgingly</u> refuse to act rewardingly towards me: overruling my (as PA) dispassionate treatment of you. |
| CRASSNESS<br>Previously, you (as my personal follower) have grudgingly refused to act rewardingly towards me: overriding my (as PA) dispassionate treatment of you.<br>But now, I (as group authority) will <u>crassly</u> react in a dispassionate fashion towards you: overruling your (as PF) grudging treatment of me. | LECHERY<br>Previously, I (as your group authority) have crassly acted in a dispassionate fashion towards you: overriding your (as PF) grudging treatment of me.<br>But now, you (as group representative) will <u>lecherously</u> react in a grudging fashion towards me: overruling my (as GA) crassly-dispassionate treatment of you. |
| RUDENESS<br>Previously, you (as group representative) have lecherously acted in a grudging fashion towards me: overriding my (as GA) crassly-dispassionate treatment of you.<br>But now, I (as spiritual authority) will crassly react in a <u>rude</u> fashion towards you: overruling your (as GR) lecherously-grudging treatment of me. | GREED<br>Previously, I (as your spiritual authority) have crassly acted in a rude fashion towards you: overriding your (as GR) lecherously-grudging treatment of me.<br>But now, you (as spiritual disciple) will lecherously react in a <u>greedy</u> fashion towards me: overruling my (as SA) crassly-rude treatment of you. |
| BRUTALITY<br>Previously, you (as my spiritual disciple) have lecherously acted in a greedy fashion towards me: overriding my (as SA) crassly-rude treatment of you.<br>But now, I (as humanitarian authority) will <u>brutally</u> react in a rude fashion towards you: overruling your (as SD) lecherous sense of greed. | WICKEDNESS<br>Previously, I (as your humanitarian authority) have brutally acted in a rude fashion towards you: overriding your (as SD) lecherous sense of greed.<br>But now, you (as representative member of humanity) will <u>wickedly</u> react in a greedy fashion towards me: overruling my (as HA) brutal sense of rudeness. |
| MEANNESS<br>Previously, you (as representative member of humanity) have wickedly acted in a greedy fashion towards me: overriding my (as HA) brutal sense of rudeness.<br>But now, I (as transcendental authority) will brutally react in an <u>mean</u> fashion towards you: overruling your (as RH) wicked sense of greed. | DIABOLISM<br>Previously, I (as your transcendental authority) have brutally acted in a mean fashion towards you: overriding your (as RH) wicked sense of greed.<br>But now, you (as transcendental follower) will wickedly react in a <u>diabolical</u> fashion towards me: overruling my (as TA) mean treatment of you. |

Fig. 5D

| CALLOUSNESS | MALEVOLENCE |
|---|---|
| Previously, you (as punisher) have refused to act leniently towards me: overriding my (as adversary) failure to act submissively towards you.<br>But now, I (as personal authority) will callously fail to act submissively towards you: overruling your (as punisher) refusal to act leniently towards me. | Previously, I (as your personal authority) have callously failed to act submissively towards you: overriding your (as punisher) refusal to act leniently towards me.<br>But now, you (as personal follower) will malevolently refuse to act leniently towards me: overruling my (as PA) callous treatment of you. |
| FICKLENESS | PUSILLANIMITY |
| Previously, you (as my personal follower) have malevolently refused to act leniently towards me: overriding my (as PA) callous treatment of you.<br>But now, I (as group authority) will callously react in a fickle fashion towards you: overruling your (as PF) malevolent treatment of me. | Previously, I (as your group authority) have callously acted in a fickle fashion towards you: overriding your (as PF) malevolent treatment of me.<br>But now, you (as group representative) will malevolently react in a pusillanimous fashion towards me: overruling my (as GA) callous sense of fickleness. |
| WANTONNESS | CONTENTIOUSNESS |
| Previously, you (as group representative) have malevolently acted in a pusillanimous fashion towards me: overriding my (as GA) callously-fickle treatment of you.<br>But now, I (as spiritual authority) will fickly react in a wanton fashion towards you: overruling your (as GR) malevolent sense of pusillanimity. | Previously, I (as your spiritual authority) have fickly acted in a wanton fashion towards you: overriding your (as GR) malevolent sense of pusillanimity.<br>But now, you (as my spiritual disciple) will pusillanimously react in a contentious fashion towards me: overruling my (as SA) wanton treatment of you. |
| TORMENT | RUTHLESSNESS |
| Previously, you (as my spiritual disciple) have pusillanimously acted in a contentious fashion towards me: overriding my (as SA) wanton treatment of you.<br>But now, I (as humanitarian authority) will wantonly-torment you: overruling your (as SD) contentious treatment of me. | Previously, I (as your humanitarian authority) have wantonly-tormented you: overriding your (as SD) contentious treatment of me.<br>But now, you (as representative member of humanity) will ruthlessly act in a contentious fashion towards me: overruling my (as HA) tormentful treatment of you. |
| ATROCITY | DEPRAVITY |
| Previously, you (as representative member of humanity) have ruthlessly acted in a contentious fashion towards me: overriding my (as HA) tormentful treatment of you.<br>But now, I (as transcendental authority) will tormentingly react in an atrocious fashion towards you: overruling your (as RH) ruthless sense of contentiousness. | Previously, I (as your transcendental authority) have tormentingly acted in an atrocious fashion towards you: overriding your (as RH) ruthless sense of contentiousness.<br>But now, you (as transcendental follower) will ruthlessly react in a depraved fashion towards me: overruling my (as TA) atrocious treatment of you. |

Fig. 5E

| PRIDE | FLATTERY |
|---|---|
| Previously, you (as reinforcer) have excessively acted in a rewarding fashion towards me: overriding my (as procurer) extremely solicitous treatment of you.<br>But now, I (as personal authority) will proudly admit acting in an extremely solicitous fashion towards you: overruling your (as reinforcer) excessively rewarding treatment of me. | Previously, I (as your personal authority) have proudly acted in an extremely solicitous fashion towards you: countering your (as reinforcer) excessively rewarding treatment of me.<br>But now, you (as personal follower) will flatteringly react in an excessively rewarding fashion towards me: overruling my (as PA) proud treatment of you. |
| VANITY | ADULATION |
| Previously, you (as my personal follower) have flatteringly acted in an excessively rewarding fashion towards me: overriding my (as PA) proud treatment of you.<br>But now, I (as group authority) will vainly react in a proud fashion towards you: overruling your (as PF) flattering treatment of me. | Previously, I (as your group authority) have vainly acted in a proud fashion towards you: countering your (as PF) flattering treatment of me.<br>But now, you (as group representative) will flatteringly react in an adulatory fashion towards me: overruling my (as GA) vain sense of pride. |
| CONCEIT | PATRONIZATION |
| Previously, you (as group representative) have flatteringly acted in an adulatory fashion towards me: overriding my (as GA) vain sense of pride.<br>But now, I (as spiritual authority) will vainly react in a conceited fashion towards you: overruling your (as GR) adulatory treatment of me. | Previously, I (as your spiritual authority) have vainly acted in a conceited fashion towards you: countering your (as GR) adulatory treatment of me.<br>But now, you (as spiritual disciple) will patronizingly react in an adulatory fashion towards me: overruling my (as SA) vain sense of conceit. |
| PRETENTIOUSNESS | INDULGENCE |
| Previously, you (as my spiritual disciple) have patronizingly acted in an adulatory fashion towards me: overriding my (as SA) vain sense of conceit.<br>But now, I (as humanitarian authority) will conceitedly react in a pretentious fashion towards you: overruling your (as SD) patronizing treatment of me. | Previously, I (as your humanitarian authority) have conceitedly acted in a pretentious fashion towards you: countering your (as SD) patronizing treatment of me.<br>But now, you (as representative member of humanity) will patronizingly react in an indulgent fashion towards me: overruling my (as HA) pretentious treatment of you. |
| SANCTIMONY | SYNCOPHANCY |
| Previously, you (as representative member of humanity) have patronizingly acted in an indulgent fashion towards me: overriding my (as HA) pretentious treatment of you.<br>But now, I (as transcendental authority) will pretentiously react in a sanctimonious fashion towards you: overruling your (as RH) indulgent treatment of me. | Previously, I (as your transcendental authority) have pretentiously acted in a sanctimonious fashion towards you: countering your (as RH) indulgent treatment of me.<br>But now, you (as transcendental follower) will indulgently react in a syncophantic fashion towards me: overruling my (as TA) sanctimonious treatment of you. |

Fig. 6B

| | |
|---|---|
| SHAME<br>Previously, you (as reinforcer) have excessively acted in a lenient fashion towards me: countering my (as procurer) extremely submissive treatment of you.<br>But now, I (as personal authority) will <u>shamefully</u> admit acting in an extremely submissive fashion towards you: overruling your (as reinforcer) excessively lenient treatment of me. | CRITICISM<br>Previously, I (as your personal authority) have shamefully acted in an extremely submissive fashion towards you: countering your (as reinforcer) excessively lenient treatment of me.<br>But now, you (as personal follower) will excessively react in a <u>critical</u> fashion towards me: overruling my (as PA) shameful treatment of you. |
| HUMILIATION<br>Previously, you (as my personal follower) have excessively acted in a critical fashion towards me: countering my (as PA) shameful treatment of you.<br>But now, I (as group authority) will shamefully react in a <u>humiliated</u> fashion towards you: overruling your (as PF) critical treatment of me. | RIDICULE<br>Previously, I (as your group authority) have shamefully acted in a humiliated fashion towards you: countering your (as PF) critical treatment of me.<br>But now, you (as group representative) will critically-<u>ridicule</u> me: overruling my (as GA) shameful sense of humiliation. |
| MORTIFICATION<br>Previously, you (as group representative) have critically-ridiculed me: countering my (as GA) shameful sense of humiliation.<br>But now, I (as spiritual authority) will humiliatingly react in a <u>mortified</u> fashion towards you: overruling your critical-ridiculing of me. | SCORN<br>Previously, I (as your spiritual authority) have humiliatingly acted in a mortified fashion towards you: countering your (as GR) critical-ridiculing of me.<br>But now, you (as my spiritual disciple) will <u>scornfully</u>-ridicule me: overruling my (as SA) mortified treatment of you. |
| ANGUISH<br>Previously, you (as my spiritual disciple) have scornfully-ridiculed me: countering my (as SA) mortified treatment of you.<br>But now, I (as humanitarian authority) will mortifiedly react in an <u>anguished</u> fashion towards you: overruling your (as SD) scornful treatment of me. | MOCKERY<br>Previously, I (as your humanitarian authority) have mortifiedly acted in an anguished fashion towards you: countering your (as SD) scornful treatment of me.<br>But now, you (as representative member of humanity) will scornfully react in a <u>mocking</u> fashion towards me : overruling my (as HA) anguished treatment of you. |
| TRIBULATION<br>Previously, you (as representative member of humanity) have scornfully acted in a mocking fashion towards me: countering my (as HA) anguished treatment of you.<br>But now, I (as transcendental authority) will anguishingly express feelings of <u>tribulation</u> towards you: overruling your (as RH) mocking treatment of me. | CYNICISM<br>Previously, I (as your transcendental authority) have anguishingly expressed feelings of tribulation towards you: countering your (as RH) mocking treatment of me.<br>But now, you (as transcendental follower) will mockingly react in a <u>cynical</u> fashion towards me: overruling my (as TA) anguished expression of tribulation. |

Fig. 6C

| IMPUDENCE | ENVY |
|---|---|
| Previously, I (as reinforcer) have excessively acted in a rewarding fashion towards you: overriding your (as procurer) extremely solicitous treatment of me.<br>But now, you (as personal authority) will <u>impudently</u> react in an extremely solicitous fashion towards me: overruling my (as reinforcer) excessively rewarding treatment of you. | Previously, you (as my personal authority) have impudently acted in an extremely solicitous manner toward me: countering my (as reinforcer) excessively rewarding treatment of you.<br>But now, I (as personal follower) will <u>enviously</u> react in an excessively rewarding fashion towards you: overruling your (as PA) impudent treatment of me. |
| ARROGANCE | JEALOUSY |
| Previously, I (as your personal follower) have enviously acted in an excessively rewarding fashion towards you: overriding your (as PA) impudent treatment of me.<br>But now, you (as group authority) will impudently react in an <u>arrogant</u> fashion towards me: overruling my (as PF) envious treatment of you. | Previously, you (as my group authority) have impudently acted in an arrogant fashion towards me: countering my (as PF) envious treatment of you.<br>But now, I (as group representative) will enviously react in a <u>jealous</u> fashion towards you: overruling your (as GA) impudently-arrogant treatment of me. |
| IMPETUOUSITY | COVETOUSNESS |
| Previously, I (as group representative) have enviously acted in a jealous fashion towards you: overriding your (as GA) impudently-arrogant treatment of me.<br>But now, you (as spiritual authority) will arrogantly react in an <u>impetuous</u> fashion towards me: overruling my (as GR) jealous treatment of you | Previously, you (as my spiritual authority) have arrogantly acted in an impetuous fashion towards me: overriding my (as GR) jealous treatment of you.<br>But now, I (as spiritual disciple) will jealously react in a <u>covetous</u> fashion towards you: overruling your (as SA) impetuous treatment of me. |
| PRESUMPTUOUSNESS | LONGING |
| Previously, I (as your spiritual disciple) have jealously acted in a covetous fashion towards you: overriding your (as SA) impetuous treatment of me.<br>But now, you (as humanitarian authority) will impetuously react in a <u>presumptuous</u> fashion towards me: overruling my (as SD) covetous treatment of you. | Previously, you (as my humanitarian authority) have impetuously reacted in a presumptuous fashion towards me: overriding my (as SD) covetous treatment of you<br>But now, I (as representative member of humanity) will covetously react with <u>longing</u> towards you: overruling your (as HA) presumptuous treatment of me. |
| SMUGNESS | AFFECTATION |
| Previously, I (as representative member of humanity) have covetously reacted with longing towards you: overriding your (as HA) presumptuous treatment of me.<br>But now, you (as transcendental authority) will presumptuously react in a <u>smug</u> fashion towards me: overruling my (as RH) covetous sense of longing. | Previously, you (as my transcendental authority) have presumptuously acted in a smug fashion towards me: countering my (as RH) covetous sense of longing.<br>But now, I (as transcendental follower) will longingly react in an <u>affected</u> fashion towards you: overruling your (as TA) smug treatment of me. |

Fig. 6D

| INSOLENCE | DISDAIN |
|---|---|
| Previously, I (as reinforcer) have excessively acted in a lenient fashion towards you: overriding your (as procurer) extremely submissive treatment of me.<br>But now, you (as personal authority) will <u>insolently</u> react in an extremely submissive fashion towards me: overruling my (as reinforcer) excessively lenient treatment of you. | Previously, you (as my personal authority) have insolently acted in an extremely submissive fashion towards me: overriding my (as reinforcer) excessively lenient treatment of you.<br>But now, I (as personal follower) will <u>disdainfully</u> react in an excessively lenient fashion towards you: overruling your (as PA) insolent treatment of me. |
| AUDACITY | CONTEMPT |
| Previously, I (as your personal follower) have disdainfully acted in an excessively lenient fashion towards you: overriding your (as PA) insolent treatment of me.<br>But now, you (as group authority) will insolently react with <u>audacity</u> towards me: overruling my (as PF) disdainful treatment of you. | Previously, you (as my group authority) have insolently acted with audacity towards me: overriding my (as PF) disdainful treatment of you.<br>But now, I (as group representative) will disdainfully react in a <u>contemptuous</u> fashion towards you: overruling your (as GA) insolent sense of audacity. |
| BOLDNESS | REPROACH |
| Previously, I (as group representative) have disdainfully acted in a contemptuous fashion towards you: overriding your (as GA) insolent sense of audacity.<br>But now, you (as spiritual authority) will audaciously react in a <u>bold</u> fashion towards me: overruling my (as GR) disdainful sense of contempt. | Previously, you (as my spiritual authority) have audaciously acted in a bold fashion towards me: overriding my (as GR) disdainful sense of contempt.<br>But now, I (as spiritual disciple) will contemptuously react in a <u>reproachful</u> fashion towards you: overruling your (as SA) bold treatment of me. |
| RASHNESS | CHAGRIN |
| Previously, I (as your spiritual disciple) have contemptuously acted in a reproachful fashion towards you: overriding your (as SA) bold treatment of me.<br>But now, you (as humanitarian authority) will boldly react in a <u>rash</u> fashion towards me: overruling my (as SD) reproachful treatment of you. | Previously, you (as my humanitarian authority) have boldly acted in a rash fashion towards me: overriding my (as SD) reproachful treatment of you.<br>But now, I (as representative member of humanity) will reproachfully react in a <u>chagrined</u> fashion towards you: overruling your (as HA) rash treatment of me. |
| HARSHNESS | BITTERNESS |
| Previously, I (as representative member of humanity) have reproachfully acted in a chagrined fashion towards you: overriding your (as HA) rash treatment of me.<br>But now, you (as transcendental authority) will rashly react in a <u>harsh</u> fashion towards me: overruling my (as RH) chagrined treatment of you. | Previously, you (as my transcendental authority) have rashly acted in a harsh fashion towards me: overriding my (as RH) chagrined treatment of you.<br>But now, I (as transcendental follower) will <u>bitterly</u> react in a chagrined fashion towards you: overruling your (as TA) harsh treatment of me. |

Fig. 6E

| PRIDE (II) | FLATTERY (II) |
|---|---|
| Previously, I (as reinforcer) have excessively acted in a rewarding fashion towards you: overriding your (as procurer) extremely solicitous treatment of me.<br>But now, you (as personal authority) will <u>proudly</u> admit acting in an extremely solicitous fashion towards me: overruling my (as reinforcer) excessively rewarding treatment of you. | Previously, you (as my personal authority) have proudly acted in an extremely solicitous fashion towards me: countering my (as reinforcer) excessively rewarding treatment of you.<br>But now, I (as personal follower) will <u>flatteringly</u> react in an excessively rewarding fashion towards you: overruling your (as PA) proud treatment of me. |
| VANITY (II) | ADULATION (II) |
| Previously, I (as your personal follower) have flatteringly acted in an excessively rewarding fashion towards you: overriding your (as PA) proud treatment of me.<br>But now, you (as group authority) will <u>vainly</u> react in a proud fashion towards me: overruling my (as PF) flattering treatment of you. | Previously, you (as my group authority) have vainly acted in a proud fashion towards me: countering my (as PF) flattering treatment of you.<br>But now, I (as group representative) will flatteringly react in an <u>adulatory</u> fashion towards you: overruling your (as GA) vain sense of pride. |
| CONCEIT (II) | PATRONIZATION (II) |
| Previously, I (as group representative) have flatteringly acted in an adulatory fashion towards you: overriding your (as GA) vain sense of pride.<br>But now, you (as spiritual authority) will vainly react in a <u>conceited</u> fashion towards me: overruling my (as GR) adulatory treatment of you. | Previously, you (as your spiritual authority) have vainly acted in a conceited fashion towards me: countering my (as GR) adulatory treatment of you.<br>But now, I (as spiritual disciple) will <u>patronizingly</u> react in an adulatory fashion towards you: overruling your (as SA) vain sense of conceit. |
| PRETENTIOUSNESS (II) | INDULGENCE (II) |
| Previously, I (as your spiritual disciple) have patronizingly acted in an adulatory fashion towards you: overriding your (as SA) vain sense of conceit.<br>But now, you (as humanitarian authority) will conceitedly react in a <u>pretentious</u> fashion towards me: overruling my (as SD) patronizing treatment of you. | Previously, you (as my humanitarian authority) have conceitedly acted in a pretentious fashion towards me: countering my (as SD) patronizing treatment of you.<br>But now, I (as representative member of humanity) will patronizingly react in an <u>indulgent</u> fashion towards you: overruling your (as HA) pretentious treatment of me. |
| SANCTIMONY (II) | SYNCOPHANCY (II) |
| Previously, I (as representative member of humanity) have patronizingly acted in an indulgent fashion towards you: overriding your (as HA) pretentious treatment of you.<br>But now, you (as transcendental authority) will pretentiously react in a <u>sanctimonious</u> fashion towards me: overruling my (as RH) indulgent treatment of you. | Previously, you (as my transcendental authority) have pretentiously acted in a sanctimonious fashion towards me: countering my (as RH) indulgent treatment of you.<br>But now, I (as transcendental follower) will indulgently react in a <u>syncophantic</u> fashion towards you: overruling your (as TA) sanctimonious treatment of me. |

Fig. 7B

| SHAME (II) | CRITICISM (II) |
|---|---|
| Previously, I (as reinforcer) have excessively acted in a lenient fashion towards you: countering your (as procurer) extremely submissive treatment of me.<br>But now, you (as personal authority) will shamefully admit acting in an extremely submissive fashion towards me: overruling my (as reinforcer) excessively lenient treatment of you. | Previously, you (as my personal authority) have shamefully acted in an extremely submissive fashion towards me: countering my (as reinforcer) excessively lenient treatment of you.<br>But now, I (as personal follower) will excessively react in a critical fashion towards you: overruling your (as PA) shameful treatment of me. |
| HUMILIATION (II) | RIDICULE (II) |
| Previously, I (as my personal follower) have excessively acted in a critical fashion towards you: countering your (as PA) shameful treatment of me.<br>But now, you (as group authority) will shamefully react in a humiliated fashion towards me: overruling my (as PF) critical treatment of you. | Previously, you (as my group authority) have shamefully acted in a humiliated fashion towards me: countering my (as PF) critical treatment of you.<br>But now, I (as group representative) will critically-ridicule you: overruling your (as GA) shameful sense of humiliation. |
| MORTIFICATION (II) | SCORN (II) |
| Previously, I (as group representative) have critically-ridiculed you: countering your (as GA) shameful sense of humiliation.<br>But now, you (as spiritual authority) will humiliatingly react in a mortified fashion towards me: overruling my critical-ridiculing of you. | Previously, you (as my spiritual authority) have humiliatingly acted in a mortified fashion towards me: countering my (as GR) critical-ridiculing of you.<br>But now, I (as your spiritual disciple) will scornfully-ridicule you: overruling your (as SA) mortified treatment of me. |
| ANGUISH (II) | MOCKERY (II) |
| Previously, I (as your spiritual disciple) have scornfully-ridiculed you: countering your (as SA) mortified treatment of me.<br>But now, you (as humanitarian authority) will mortifiedly react in an anguished fashion towards me: overruling my (as SD) scornful treatment of you. | Previously, you (as my humanitarian authority) have mortifiedly acted in an anguished fashion towards me: countering my (as SD) scornful treatment of you.<br>But now, I (as representative member of humanity) will scornfully react in a mocking fashion towards you: overruling your (as HA) anguished treatment of me. |
| TRIBULATION (II) | CYNICISM (II) |
| Previously, I (as representative member of humanity) have scornfully acted in a mocking fashion towards you: countering your (as HA) anguished treatment of me.<br>But now, you (as transcendental authority) will anguishingly express feelings of tribulation towards me: overruling my (as RH) mocking treatment of you. | Previously, you (as my transcendental authority) have anguishingly expressed feelings of tribulation towards me: countering my (as RH) mocking treatment of you.<br>But now, I (as transcendental follower) will mockingly react in a cynical fashion towards you: overruling your (as TA) anguished expression of tribulation. |

Fig. 7C

| IMPUDENCE (II) | ENVY (II) |
|---|---|
| Previously, you (as reinforcer) have excessively acted in a rewarding fashion towards me: overriding my (as procurer) extremely solicitous treatment of you.<br><br>But now, I (as personal authority) will impudently react in an extremely solicitous fashion towards you: overruling your (as reinforcer) excessively rewarding treatment of me. | Previously, I (as your personal authority) have impudently acted in an extremely solicitous manner toward you: countering your (as reforcer) excessively rewarding treatment of me.<br><br>But now, you (as personal follower) will enviously react in an excessively rewarding fashion towards me: overruling my (as PA) impudent treatment of you. |
| ARROGANCE (II) | JEALOUSY (II) |
| Previously, you (as my personal follower) have enviously acted in an excessively rewarding fashion towards me: overriding my (as PA) impudent treatment of you.<br><br>But now, I (as group authority) will impudently react in an arrogant fashion towards you: overruling your (as PF) envious treatment of me. | Previously, I (as your group authority) have impudently acted in an arrogant fashion towards you: countering your (as PF) envious treatment of me.<br><br>But now, you (as group representative) will enviously react in a jealous fashion towards me: overruling my (as GA) impudently-arrogant treatment of you. |
| IMPETUOUSITY (II) | COVETOUSNESS (II) |
| Previously, you (as group representative) have enviously acted in a jealous fashion towards me: overriding my (as GA) impudently-arrogant treatment of you.<br><br>But now, I (as spiritual authority) will arrogantly react in an impetuous fashion towards you: overruling your (as GR) jealous treatment of me. | Previously, I (as your spiritual authority) have arrogantly acted in an impetuous fashion towards you: overriding your (as GR) jealous treatment of me.<br><br>But now, you (as spiritual disciple) will jealously react in a covetous fashion towards me: overruling my (as SA) impetuous treatment of you. |
| PRESUMPTUOUSNESS (II) | LONGING (II) |
| Previously, you (as my spiritual disciple) have jealously acted in a covetous fashion towards me: overriding my (as SA) impetuous treatment of you.<br><br>But now, I (as humanitarian authority) will impetuously react in a presumptuous fashion towards you: overruling your (as SD) covetous treatment of me. | Previously, I (as your humanitarian authority) have impetuously reacted in a presumptuous fashion towards you: overriding your (as SD) covetous treatment of me.<br><br>But now, you (as representative member of humanity) will covetously react with longing towards me: overruling my (as HA) presumptuous treatment of you. |
| SMUGNESS (II) | AFFECTATION (II) |
| Previously, you (as representative member of humanity) have covetously reacted with longing towards me: overriding my (as HA) presumptuous treatment of you.<br><br>But now, I (as transcendental authority) will presumptuously react in a smug fashion towards you: overruling your (as RH) covetous sense of longing. | Previously, I (as your transcendental authority) have presumptuously acted in a smug fashion towards you: countering your (as RH) covetous sense of longing.<br><br>But now, you (as transcendental follower) will longingly react in an affected fashion towards me: overruling my (as TA) smug treatment of you. |

Fig. 7D

| INSOLENCE (II) | DISDAIN (II) |
|---|---|
| Previously, you (as reinforcer) have excessively acted in a lenient fashion towards me: overriding my (as procurer) extremely submissive treatment of you.<br>But now, I (as personal authority) will <u>insolently</u> react in an extremely submissive fashion towards you: overruling your (as reinforcer) excessively lenient treatment of me. | Previously, I (as your personal authority) have insolently acted in an extremely submissive fashion towards you: overriding your (as reinforcer) excessively lenient treatment of me.<br>But now, you (as personal follower) will <u>disdainfully</u> react in an excessively lenient fashion towards me: overruling my (as PA) insolent treatment of you. |
| AUDACITY (II) | CONTEMPT (II) |
| Previously, you (as my personal follower) have disdainfully acted in an excessively lenient fashion towards me: overriding my (as PA) insolent treatment of you.<br>But now, I (as group authority) will insolently react with <u>audacity</u> towards you: overruling your (as PF) disdainful treatment of me. | Previously, I (as your group authority) have insolently acted with audacity towards you: overriding your (as PF) disdainful treatment of me.<br>But now, you (as group representative) will disdainfully react in a <u>contemptuous</u> fashion towards me: overruling my (as GA) insolent sense of audacity. |
| BOLDNESS (II) | REPROACH (II) |
| Previously, you (as group representative) have disdainfully acted in a contemptuous fashion towards me: overriding my (as GA) insolent sense of audacity.<br>But now, I (as spiritual authority) will audaciously react in a <u>bold</u> fashion towards you: overruling your (as GR) disdainful sense of contempt. | Previously, I (as your spiritual authority) have audaciously acted in a bold fashion towards you: overriding your (as GR) disdainful sense of contempt.<br>But now, you (as spiritual disciple) will contemptuously react in a <u>reproachful</u> fashion towards me: overruling my (as SA) bold treatment of you. |
| RASHNESS (II) | CHAGRIN (II) |
| Previously, you (as my spiritual disciple) have contemptuously acted in a reproachful fashion towards me: overriding my (as SA) bold treatment of you.<br>But now, I (as humanitarian authority) will boldly react in a <u>rash</u> fashion towards you: overruling your (as SD) reproachful treatment of me. | Previously, I (as your humanitarian authority) have boldly acted in a rash fashion towards you: overriding your (as SD) reproachful treatment of me.<br>But now, you (as representative member of humanity) will reproachfully react in a <u>chagrined</u> fashion towards me: overruling my (as HA) rash treatment of you. |
| HARSHNESS (II) | BITTERNESS (II) |
| Previously, you (as representative member of humanity) have reproachfully acted in a chagrined fashion towards me: overriding my (as HA) rash treatment of you.<br>But now, I (as transcendental authority) will rashly react in a <u>harsh</u> fashion towards you: overruling your (as RH) chagrined treatment of me. | Previously, I (as your transcendental authority) have rashly acted in a harsh fashion towards you: overriding your (as RH) chagrined treatment of me.<br>But now, you (as transcendental follower) will <u>bitterly</u> react in a chagrined fashion towards me: overruling my (as TA) harsh treatment of you. |

Fig. 7E

| HYPER-LAZINESS | HYPER-TREACHERY |
|---|---|
| Previously, you (as punisher) have refused to act rewardingly towards me: overriding my (as adversary) failure to act solicitously towards you.<br>But now, I (as personal authority) will <u>lazily</u> react in a hyper-violent fashion towards you: overruling your (as punisher) refusal to act rewardingly towards me. | Previously, I (as your personal authority) have lazily failed to act solicitously towards you: countering your (as punisher) refusal to act rewardingly towards me.<br>But now, you (as personal follower) will <u>treacherously</u> react in a hyper-violent fashion towards me: overruling my (as PA) lazy treatment of you. |
| HYPER-INFAMY | HYPER-INSURGENCY |
| Previously, you (as my personal follower) have treacherously refused to act rewardingly towards me: overriding my (as PA) lazy treatment of you.<br>But now, I (as group authority) will <u>infamously</u> react in a hyper-violent fashion towards you: overruling your (as PF) treacherous treatment of me. | Previously, I (as your group authority) have infamously acted in a lazy fashion towards you: countering your (as PF) treacherous treatment of me.<br>But now, you (as group representative) will <u>insurgently</u> react in a hyper-violent fashion towards me: overruling my (as GA) infamously-lazy treatment of you. |
| HYPER-PRODIGALITY | HYPER-BETRAYAL |
| Previously, you (as group representative) have insurgently acted in a treacherous fashion towards me: overriding my (as GA) lazy sense of infamy.<br>But now, I (as spiritual authority) will <u>prodigally</u> react in a hyper-violent fashion towards you: overruling your (as GR) insurgently-treacherous treatment of me. | Previously, I (as your spiritual authority) have infamously acted in a prodigal fashion towards you: countering your (as GR) insurgently-treacherous treatment of me.<br>But now, you (as spiritual disciple) will <u>betrayingly</u> react in a hyper-violent fashion towards me: overruling my (as SA) infamously-prodigal treatment of you. |
| HYPER-WRATH | HYPER-UGLINESS |
| Previously, you (as my spiritual disciple) have insurgently acted in a betraying fashion towards me: overriding my (as SA) infamously-prodigal treatment of you.<br>But now, I (as humanitarian authority) will <u>wrathfully</u> react in a hyper-violent fashion towards you: overruling your (as SD) insurgent-betrayal of me. | Previously, I (as your humanitarian authority) have prodigally acted in a wrathful fashion towards you: countering your (as SD) insurgent betrayal of me.<br>But now, you (as representative member of humanity) will hyper-violently react in an <u>ugly</u> fashion towards me: overruling my (as HA) wrathful treatment of you. |
| HYPER-ANGER | HYPER-ABOMINATION |
| Previously, you (as representative member of humanity) have betrayingly acted in an ugly fashion towards me: overriding my (as HA) wrathful treatment of you.<br>But now, I (as transcendental authority) will <u>angrily</u> react in a hyper-violent fashion towards you: overruling your (as RH) ugly-betrayal of me. | Previously, I (as your transcendental authority) have wrathfully acted in an angry fashion towards you: countering your (as RH) ugly-betrayal of me.<br>But now, you (as transcendental follower) will <u>abominably</u> react in a hyper-violent fashion towards me: overruling my (as TA) angry treatment of you. |

Fig. 8B

| | |
|---|---|
| HYPER-NEGLIGENCE<br>Previously, you (as punisher) have refused to act leniently towards me: overriding my (as adversary) failure to act submissively towards you.<br>But now, I (as personal authority) will <u>negligently</u> react in a hyper-violent fashion towards you: overruling your refusal to act leniently towards me. | HYPER-VINDICTIVENESS<br>Previously, I (as your personal authority) have negligently failed to act submissively towards you: countering your (as punisher) refusal to act leniently towards me.<br>But now, you (as personal follower) will <u>vindictively</u> react in a hyper-violent fashion towards me: overruling my (as PA) negligent treatment of you. |
| HYPER-DISHONOR<br>Previously, you (as my personal follower) have vindictively refused to act leniently towards me: overriding my (as PA) negligent treatment of you.<br>But now, I (as group authority) will <u>dishonorably</u> react in a hyper-violent fashion towards you: overruling your (as PF) vindictive treatment of me. | HYPER-VENGEANCE<br>Previously, I (as your group authority) have negligently acted in a dishonorable fashion towards you: countering your (as PF) vindictive treatment of me.<br>But now, you (as group representative) will <u>vengefully</u> react in a hyper-violent fashion towards me: overruling my (as GA) negligently-dishonorable treatment of you. |
| HYPER-SLAVERY<br>Previously, you (as group representative) have vengefully acted in a vindictive fashion towards me: overriding my (as GA) negligently-dishonorable treatment of you.<br>But now, I (as spiritual authority) will <u>slavishly</u> react in a hyper-violent fashion towards you: overruling your vengefully-vindictive treatment of me. | HYPER-DESPAIR<br>Previously, I (as your spiritual authority) have dishonorably admitted enslaving you: countering your (as GR) vengefully-vindictive treatment of me.<br>But now, you (as my spiritual disciple) will <u>despairingly</u> behave in a hyper-violent fashion towards me: overruling my (as SA) dishonorable-enslavement of you. |
| HYPER-TYRANNY<br>Previously, you (as my spiritual disciple) have vengefully acted in a despairing fashion towards me: overriding my (as SA) dishonorable-enslavement of you.<br>But now, I (as humanitarian authority) will <u>tyrannically</u> react in a hyper-violent fashion towards you: overruling your (as SD) despairing treatment of me. | HYPER-HYPOCRISY<br>Previously, I (as your humanitarian authority) have tyrannically admitted enslaving you: countering your (as SD) despairing treatment of me.<br>But now, you (as representative member of humanity) will <u>hypocritically</u> react in a hyper-violent fashion towards me: overruling my (as HA) tyrannical-enslavement of you. |
| HYPER-PREJUDICE<br>Previously, you (as representative member of humanity) have despairingly behaved in a hypocritical fashion towards me: overriding my (as HA) tyrannical-enslavement of you.<br>But now, I (as transcendental authority) will <u>prejudicially</u> react in a hyper-violent fashion towards you: overruling your (as RH) hypocritical treatment of me. | HYPER-PERDITION<br>Previously, I (as your transcendental authority) have tyrannically acted in an prejudicial fashion towards you: countering your (as RH) hypocritical sense of despair.<br>But now, you (as transcendental follower) will <u>perditionably</u> react in a hyper-violent fashion towards me: overruling my (as TA) prejudicial treatment of you. |

Fig. 8C

| HYPER-APATHY | HYPER-SPITE |
|---|---|
| Previously, I (as punisher) have refused to act rewardingly towards you: overriding your (as adversary) failure to act solicitously towards me.<br>But now, you (as personal authority) will <u>apathetically</u> react in a hyper-violent fashion towards me: overruling my (as punisher) failure to act rewardingly towards you. | Previously, you (as my personal authority) have apathetically refused to act solicitously towards me: countering my (as punisher) failure to act rewardingly towards you.<br>But now, I (as personal follower) will <u>spitefully</u> react in a hyper-violent fashion towards you: overruling your (as PA) apathetic treatment of me. |
| HYPER-FOOLISHNESS | HYPER-GLUTTONY |
| Previously, I (as your personal follower) have spitefully refused to act rewardingly towards you: overriding your (as PA) apathetic treatment of me.<br>But now, you (as group authority) will <u>foolishly</u> react in a hyper-violent fashion towards me: overruling my (as PF) spiteful treatment of you. | Previously, you (as my group authority) have foolishly acted in an apathetic fashion towards me: countering my (as PF) spiteful treatment of you.<br>But now, I (as group representative) will <u>gluttonously</u> react in a hyper-violent fashion towards you: overruling your (as GA) foolishly-apathetic treatment of me. |
| HYPER-VULGARITY | HYPER-AVARICE |
| Previously, I (as group representative) have gluttonously acted in a spiteful fashion towards you: overriding your (as GA) foolishly-apathetic treatment of you.<br>But now, you (as spiritual authority) will <u>vulgarly</u> react in a hyper-violent fashion towards me: overruling my (as GR) gluttonously-spiteful treatment of you | Previously, you (as my spiritual authority) have foolishly acted in a vulgar fashion towards me: overriding my (as GR) gluttonously-spiteful treatment of you.<br>But now, I (as spiritual disciple) will <u>avariciously</u> react in a hyper-violent fashion towards you: overruling your (as SA) foolishly-vulgar treatment of me. |
| HYPER-OPPRESSION | HYPER-EVIL |
| Previously, I (as your spiritual disciple) have gluttonously acted in an avaricious fashion towards you: overriding your (as SA) foolishly-vulgar treatment of me.<br>But now, you (as humanitarian authority) will <u>oppressively</u> react in a hyper-violent fashion towards me: overruling my (as SD) gluttonously avaricious treatment of you. | Previously, you (as my humanitarian authority) have vulgarly acted in an oppressive fashion towards me: overriding my (as SA) gluttonously-avaricious treatment of you<br>But now, I (as representative member of humanity) will <u>evilly</u> react in a hyper-violent fashion towards you: overruling your (as HA) vulgarly-oppressive treatment of me. |
| HYPER-HATRED | HYPER-INIQUITY |
| Previously, I (as representative member of humanity) have avariciously acted in an evil fashion towards you: overriding your (as HA) vulgarly-oppressive treatment of me.<br>But now, you (as transcendental authority) will <u>hatefully</u> react in a hyper-violent fashion towards me: overruling my (as RH) evil treatment of you. | Previously, you (as my transcendental authority) have hatefully acted in an oppressive fashion towards me: countering my (as RH) avaricious sense of evil.<br>But now, I (as transcendental follower) will <u>iniquitously</u> react in a hyper-violent fashion towards you: overruling your (as TA) hateful treatment of me. |

Fig. 8D

| HYPER-INDIFFERENCE | HYPER-MALICE |
|---|---|
| Previously, I (as punisher) have refused to act leniently towards you: overriding your (as adversary) failure to act submissively towards me.<br>But now, you (as personal authority) will indifferently react in a hyper-violent fashion towards me: overruling my (as punisher) failure to act leniently towards you. | Previously, you (as my personal authority) have indifferently refused to act submissively towards me: overriding my (as punisher) failure to act leniently towards you.<br>But now, I (as personal follower) will maliciously react in a hyper-violent fashion towards you: overruling your (as PA) indifferent treatment of me. |
| HYPER-CAPRICIOUSNESS | HYPER-COWARDICE |
| Previously, I (as your personal follower) have maliciously refused to act leniently towards you: overriding your (as PA) indifferent treatment of me.<br>But now, you (as group authority) will capriciously react in a hyper-violent fashion towards me: overruling my (as PF) malicious treatment of you. | Previously, you (as my group authority) have capriciously acted in an indifferent fashion towards me: overriding my (as PF) malicious treatment of you.<br>But now, I (as group representative) will cowardly react in a hyper-violent fashion towards you: overruling your (as GA) capricious sense of indifference. |
| HYPER-CRUELTY | HYPER-ANTAGONISM |
| Previously, I (as group representative) have cowardly acted in a malicious fashion towards you: overriding your (as GA) capricious sense of indifference.<br>But now, you (as spiritual authority) will cruelly react in a hyper-violent fashion towards me: overruling my (as GR) cowardly-malicious treatment of you. | Previously, you (as my spiritual authority) have capriciously acted in a cruel fashion towards me: overriding my (as GR) cowardly-malicious treatment of you.<br>But now, I (as spiritual disciple) will antagonistically react in a hyper-violent fashion towards you: overruling your (as SA) cruel treatment of me. |
| HYPER-PERSECUTION | HYPER-CUNNING |
| Previously, I (as your spiritual disciple) have cowardly acted in an antagonistic fashion towards you: overriding your (as SA) cruel treatment of me.<br>But now, you (as humanitarian authority) will persecute me in a hyper-violent fashion: overruling my (as SD) cowardly-antagonistic treatment of you. | Previously, you (as my humanitarian authority) have cruelly-persecuted me: overriding my (as SD) cowardly-antagonistic treatment of you.<br>But now, I (as representative member of humanity) will cunningly react in a hyper-violent fashion towards you: overruling your (as HA) cruel-persecution of me. |
| HYPER-BELLIGERENCE | HYPER-TURPITUDE |
| Previously, I (as representative member of humanity) have antagonistically acted in a cunning fashion towards you: overriding your (as HA) cruel-persecution of me.<br>But now, you (as transcendental authority) will belligerently react in a hyper-violent fashion towards me: overruling my (as RH) cunning treatment of you. | Previously, you (as my transcendental authority) have belligerently-persecuted me: overriding my (as RH) antagonistic sense of cunning.<br>But now, I (as transcendental follower) will turpitudinously react in a hyper-violent fashion towards you: overruling your (as TA) belligerent-persecution of me. |

Fig. 8E

| HYPER-SLOTH | HYPER-MUTINY |
|---|---|
| Previously, I (as punisher) have refused to act rewardingly towards you: overriding your (as adversary) failure to act solicitously towards me.<br><br>But now, you (as my personal authority) will slothfully react in a hyper-violent fashion towards me: overruling my (as punisher) refusal to act rewardingly towards you. | Previously, you (as my personal authority) have slothfully failed to act solicitously towards me: overriding my (as punisher) refusal to act rewardingly towards you.<br><br>But now, I (as personal follower) will mutinously react in a hyper-violent fashion towards you: overruling your (as PA) slothful treatment of me. |
| HYPER-NOTORIETY | HYPER-REBELLION |
| Previously, I (as your personal follower) have mutinously refused to act rewardingly towards you: overriding your (as PA) slothful treatment of me.<br><br>But now, you (as group authority) will notoriously react in a hyper-violent fashion towards me: overruling my (as PF) mutinous treatment of you. | Previously, you (as my group authority) have slothfully acted in a notorious fashion towards me: overriding my (as PF) mutinous treatment of you.<br><br>But now, I (as group representative) will rebelliously react in a hyper-violent fashion towards you: overruling your (as GA) slothful sense of notoriety. |
| HYPER-SCANDALOUSNESS | HYPER-TREASON |
| Previously, I (as group representative) have mutinously-rebelled against you: overriding your (as GA) slothful sense of notoriety.<br><br>But now, you (as spiritual authority) will scandalously react in a hyper-violent fashion towards me: overruling my (as GR) mutinous-rebellion against you. | Previously, you (as my spiritual authority) have notoriously acted in a scandalous fashion towards me: overriding my (as GR) mutinous-rebellion against you.<br><br>But now, I (as spiritual disciple) will treasonously react in a hyper-violent fashion towards you: overruling your (as SA) scandalous sense of notoriety. |
| HYPER-DISGRACEFULNESS | HYPER-VILENESS |
| Previously, I (as your spiritual disciple) have treasonously-rebelled against you: overriding your (as SA) scandalous sense of notoriety.<br><br>But now, you (as humanitarian authority) will disgracefully react in a hyper-violent fashion towards me: overruling my (as SD) treasonous-rebellion against you. | Previously, you (as my humanitarian authority) have scandalously acted in a disgraceful fashion towards me: overriding my (as SD) treasonous-rebellion against you.<br><br>But now, I (as representative member of humanity) will vilely react in a hyper-violent fashion towards you: overruling your (as HA) scandalously-disgraceful treatment of me. |
| HYPER-FURY | HYPER-ABHORRENCE |
| Previously, I (as representative member of humanity) have treasonously acted in a vile fashion towards you: overriding your (as HA) scandalously-disgraceful treatment of me.<br><br>But now, you (as transcendental authority) will furiously react in a hyper-violent fashion towards me: overruling my (as RH) vile sense of treason. | Previously, you (as my transcendental authority) have furiously acted in an disgraceful fashion towards me: overriding my (as RH) vile sense of treason.<br><br>But now, I (as transcendental follower) will abhorrently react in a hyper-violent fashion towards you: overruling your (as TA) furious treatment of me. |

Fig. 9B

| HYPER-CARELESSNESS | HYPER-RETALIATION |
|---|---|
| Previously, I (as punisher) have refused to act leniently towards you: overriding your (as adversary) failure to act submissively towards me.<br>But now, you (as personal authority) will carelessly react in a hyper-violent fashion towards me: overruling my (as punisher) refusal to act leniently towards you. | Previously, you (as my personal authority) have carelessly failed to act submissively towards me: overriding my (as punisher) refusal to act leniently towards you.<br>But now, I (as personal follower) will retaliatively react in a hyper-violent fashion towards you: overruling your (as PA) careless treatment of me. |
| HYPER-IGNOMINY | HYPER-RETRIBUTION |
| Previously, I (as your personal follower) have retaliatively refused to act leniently towards you: overriding your (as PA) careless treatment of me.<br>But now, you (as group authority) will ignominiously react in a hyper-violent fashion towards me: overruling my (as PF) retaliatory treatment of you. | Previously, you (as my group authority) have ignominiously admitted acting in a careless fashion towards me: overriding my (as PF) retaliatory treatment of you.<br>But now, I (as group representative) will retributively react in a hyper-violent fashion towards you: overruling your (as GA) ignominious treatment of me. |
| HYPER-BONDAGE | HYPER-DESPERATION |
| Previously, I (as group representative) have retaliatively sought retribution against you: overriding your (as GA) ignominious treatment of me.<br>But now, you (as spiritual authority) will hyper-violently maintain me in bondage: overruling my (as GR) retaliatory quest for retribution. | Previously, you (as my spiritual authority) have ignominiously admitted maintaining me in bondage: overriding my (as GR) retaliatory quest for retribution.<br>But now, I (as spiritual disciple) will desperately react in a hyper-violent fashion towards you: overruling your (as SA) ignominious maintenance of me in bondage. |
| HYPER-SUBJUGATION | HYPER-MENDACITY |
| Previously, I (as your spiritual disciple) have desperately sought retribution against you: overriding your (as SA) ignominious maintenance of me in bondage.<br>But now, you (as humanitarian authority) will subjugatingly react in a hyper-violent fashion towards me: overruling my (as SD) desperate quest for retribution. | Previously, you (as my humanitarian authority) have ignominiously subjugated me in bondage: overriding my (as SD) desperate quest for retribution.<br>But now, I (as representative member of humanity) will mendaciously react in a hyper-violent fashion towards you: overruling your (as HA) subjugation of me in bondage. |
| HYPER-BIGOTRY | HYPER-PERNICITY |
| Previously, I (as representative member of humanity) have desperately acted in a mendacious fashion towards you: overriding your (as HA) subjugation of me in bondage.<br>But now, you (as transcendental authority) will bigotedly react in a hyper-violent fashion towards me: overruling my (as RH) desperate sense of mendacity. | Previously, you (as my transcendental authority) have ignominiously subjugated me in a bigoted fashion: overriding my (as RH) desperate sense of mendacity.<br>But now, I (as transcendental follower) will perniciously react in a hyper-violent fashion towards you: overruling your (as TA) bigoted treatment of me. |

Fig. 9C

| HYPER-DISPASSIONATENESS | HYPER-GRUDGINGNESS |
|---|---|
| Previously, you (as punisher) have refused to act rewardingly towards me: overriding my (as adversary) failure to act solicitously towards you.<br>But now, I (as personal authority) will <u>dispassionately</u> react in a hyper-violent fashion towards you: overruling your (as punisher) refusal to act rewardingly towards me. | Previously, I (as your personal authority) have dispassionately failed to act solicitously towards you: overriding your (as punisher) refusal to act rewardingly towards me.<br>But now, you (as personal follower) will <u>grudgingly</u> react in a hyper-violent fashion towards me: overruling my (as PA) dispassionate treatment of you. |
| HYPER-CRASSNESS | HYPER-LECHERY |
| Previously, you (as my personal follower) have grudgingly refused to act rewardingly towards me: overriding my (as PA) dispassionate treatment of you.<br>But now, I (as group authority) will <u>crassly</u> react in a hyper-violent fashion towards you: overruling your (as PF) grudging treatment of me. | Previously, I (as your group authority) have crassly acted in a dispassionate fashion towards you: overriding your (as PF) grudging treatment of me.<br>But now, you (as group representative) will <u>lecherously</u> react in a hyper-violent fashion towards me: overruling my (as GA) crassly-dispassionate treatment of you. |
| HYPER-RUDENESS | HYPER-GREED |
| Previously, you (as group representative) have lecherously acted in a grudging fashion towards me: overriding my (as GA) crassly-dispassionate treatment of you.<br>But now, I (as spiritual authority) will <u>rudely</u> react in a hyper-violent fashion towards you: overruling your (as GR) lecherously-grudging treatment of me. | Previously, I (as your spiritual authority) have crassly acted in a rude fashion towards you: overriding your (as GR) lecherously-grudging treatment of me.<br>But now, you (as spiritual disciple) will <u>greedily</u> react in a hyper-violent fashion towards me: overruling my (as SA) crassly-rude treatment of you. |
| HYPER-BRUTALITY | HYPER-WICKEDNESS |
| Previously, you (as my spiritual disciple) have lecherously acted in a greedy fashion towards me: overriding my (as SA) crassly-rude treatment of you.<br>But now, I (as humanitarian authority) will <u>brutally</u> react in a hyper-violent fashion towards you: overruling your (as SD) lecherous sense of greed. | Previously, I (as your humanitarian authority) have brutally acted in a rude fashion towards you: overriding your (as SD) lecherous sense of greed.<br>But now, you (as representative member of humanity) will <u>wickedly</u> react in a hyper-violent fashion towards me: overruling my (as HA) brutal sense of rudeness. |
| HYPER-MEANNESS | HYPER-DIABOLISM |
| Previously, you (as representative member of humanity) have wickedly acted in a greedy fashion towards me: overriding my (as HA) brutal sense of rudeness.<br>But now, I (as transcendental authority) will <u>meanly</u> react in a hyper-violent fashion towards you: overruling your (as RH) wicked sense of greed. | Previously, I (as your transcendental authority) have brutally acted in a mean fashion towards you: overriding your (as RH) wicked sense of greed.<br>But now, you (as transcendental follower) will <u>diabolically</u> react in a hyper-violent fashion towards me: overruling my (as TA) mean treatment of you. |

Fig. 9D

| HYPER-CALLOUSNESS | HYPER-MALEVOLENCE |
|---|---|
| Previously, you (as punisher) have refused to act leniently towards me: overriding my (as adversary) failure to act submissively towards you.<br>But now, I (as personal authority) will callously react in a hyper-violent fashion towards you: overruling your (as punisher) refusal to act leniently towards me. | Previously, I (as your personal authority) have callously failed to act submissively towards you: overriding your (as punisher) refusal to act leniently towards me.<br>But now, you (as personal follower) will malevolently react in a hyper-violent fashion towards me: overruling my (as PA) callous treatment of you. |
| HYPER-FICKLENESS | HYPER-PUSILLANIMITY |
| Previously, you (as my personal follower) have malevolently refused to act leniently towards me: overriding my (as PA) callous treatment of you.<br>But now, I (as group authority) will fickly react in a hyper-violent fashion towards you: overruling your (as PF) malevolent treatment of me. | Previously, I (as your group authority) have callously acted in a fickle fashion towards you: overriding your (as PF) malevolent treatment of me.<br>But now, you (as group representative) will pusillanimously react in a hyper-violent fashion towards me: overruling my (as GA) callous sense of fickleness. |
| HYPER-WANTONNESS | HYPER-CONTENTIOUSNESS |
| Previously, you (as group representative) have malevolently acted in a pusillanimous fashion towards me: overriding my (as GA) callously-fickle treatment of you.<br>But now, I (as spiritual authority) will wantonly react in a hyper-violent fashion towards you: overruling your (as GR) malevolent sense of pusillanimity. | Previously, I (as your spiritual authority) have fickly acted in a wanton fashion towards you: overriding your (as GR) malevolent sense of pusillanimity.<br>But now, you (as my spiritual disciple) will contentiously react in a hyper-violent fashion towards me: overruling my (as SA) wanton treatment of you. |
| HYPER-TORMENT | HYPER-RUTHLESSNESS |
| Previously, you (as my spiritual disciple) have pusillanimously acted in a contentious fashion towards me: overriding my (as SA) wanton treatment of you.<br>But now, I (as humanitarian authority) will tormentingly react in a hyper-violent fashion towards you: overruling your (as SD) contentious treatment of me. | Previously, I (as your humanitarian authority) have wantonly-tormented you: overriding your (as SD) contentious treatment of me.<br>But now, you (as representative member of humanity) will ruthlessly react in a hyper-violent fashion towards me: overruling my (as HA) tormentful treatment of you. |
| HYPER-ATROCITY | HYPER-DEPRAVITY |
| Previously, you (as representative member of humanity) have ruthlessly acted in a contentious fashion towards me: overriding my (as HA) tormentful treatment of you.<br>But now, I (as transcendental authority) will atrociously react in a hyper-violent fashion towards you: overruling your (as RH) ruthless sense of contentiousness. | Previously, I (as your transcendental authority) have tormentingly acted in an atrocious fashion towards you: overriding your (as RH) ruthless sense of contentiousness.<br>But now, you (as transcendental follower) will depravingly react in a hyper-violent fashion towards me: overruling my (as TA) atrocious treatment of you. |

Fig. 9E

INDUCTIVE INFERENCE AFFECTIVE LANGUAGE ANALYZER SIMULATING ARTIFICIAL INTELLIGENCE

This application claims priority of provisional application Serial No. 60/157,322 filed Oct. 1, 1999.

BACKGROUND—FIELD OF INVENTION

This invention relates to the process of programming the rules governing the use of affective language into a computer, allowing a passive detection mode, along with an active simulation of affective language in an AI mode.

BACKGROUND—DESCRIPTION OF PRIOR ART

Language simulation of an ethical nature has remained an elusive goal for researchers in the field due to the complexities involved in simulating affective language in general. Fortunately, such an achievement has finally been achieved with the development of the power pyramid hierarchy (FIGS. 1 through 10). A direct outcome of the power pyramid hierarchy is the formulation of the power pyramid definitions, simulating emotionally-charged language in a form programmable into a computer. Through the aid of these schematic definitions, the logical consequences of the power pyramid hierarchy are programmed directly into a computer, serving in applications calling for the rapid decoding of motivational parameters. The computer further utilizes these decoded results to produce a language simulation of its own, allowing for an ethically based simulation of artificial intelligence.

The concept of artificial intelligence (AI) refers to language simulated using a computer. The prevailing standard in the field is the deductive inference machine, which employs deductive reasoning to establish original conclusions from a standard battery of logical premises. The product of years of research by ICOT (The Institute of New Generation Computer Technology) the deductive-inference machine uses information stored in a regional database to deductively draw fresh conclusions not literally contained in the data. A major drawback to this deductive format, however, is a basic restriction limiting conclusions to premises immediately at hand.

An alternate form of reasoning (known as induction) is much better suited to an ethical simulation of AI, formally gathering together the best available evidence, in order to draw the most probable conclusion from the sum total of facts. In contrast to deductive reasoning, the conclusions derived through inductive reasoning are never absolutely certain, although the uncertainties of the physical world give inductive reasoning the clear advantage in such a problem-solving mode. According to such an inductive model, each individual builds up a mental model of reality over a lifetime, forming a master template for all current experiences. When expectations match surroundings, a general sense of security is reached. A mismatch leads to a surprised reaction, followed by investigative behavior. An ethically based AI computer is similarly equipped with its own formal map of reality, employed in an analogous detection and matching function. The logistics of the power pyramid hierarchy rightfully enter the picture at this juncture, serving as the foundation for the first inductive system for decoding and simulating affective language. The logical attributes of the power pyramid definitions provide a formal model of motivational behavior, allowing a decoding of the motivational parameters of a given verbal interchange. On the basis of this determination, the computer devises counter-response of its own, effectively simulating a sense of motivation in the verbal interaction.

OBJECTS AND ADVANTAGES

The Inductive Inference Affective Language Analyzer (hereafter abbreviated IIALA) makes extensive use of parallel processing, where various aspects of a complex problem are handled simultaneously, minimizing the computational bottleneck plaguing sequential processing. The number of parallel processor complexes equals the sum-total of power pyramid definitions (for a grand total of 320), a feasible number even by today's design standards. These processor complexes are further organized in a hierarchial fashion, mirroring the stepwise architecture of the power pyramid hierarchy. This hierarchial arrangement takes full-advantage of the strict transformational logic of the power pyramid hierarchy, eliminating much of the redundancy certain to occur in any convincing language simulation. The greatest degree of complexity involves programming at the most basic (personal) levels of the power pyramid hierarchy, the remaining higher authority levels extending naturally upon this elementary foundation.

The most appropriate unit of input is necessarily the sentence, for the power pyramid definitions are analogously organized in the form of a dual sentence structure. With a design schematic specifying a parallel array of 320 dedicated processor complexes, each individual complex employs parallel processing to determine the relative degree of correlation between an input (target) sentence and its matching power pyramid definition template. The matching process scrutinizes the various grammatical elements of a given sentence, statistical correlating these specifics to a given power pyramid definition. The verb tense, the plurality and person of the nouns/pronouns etc. are all scrutinized according to pre-set criteria. Each processor complex then calculates the sum-total of correct matches, yielding the relative probability that a given sentence matches a particular power pyramid definition. The processor complex yielding the highest overall rating is singled out as the most probable solution to the power pyramid definition matching procedure.

The context of the interaction is further taken into account through the aid of a feedback circuit, the priority of the individual microprocessor complexes preemptively weighted on the basis of preceding deliberations. Each power pyramid definition is composed of both past (as well as present) design components, establishing context as a further critical feature in the detection procedure. The IIALA retains in long-term storage a record of every relevant experience with a given individual or situation. On this contextual basis, the master control unit selectively weights the individual processor complexes according to a record of both past (as well as current) behavior patterns. In this respect, the IIALA is exquisitely sensitive to variations in personality Oust as humans are instinctively so) satisfying yet a further prerequisite of Turing's test (the ultimate standard for evaluating such a system).

DRAWING FIGURES AND SCHEMATICS

FIGS. 1B, 1C, 1D and 1E are the power pyramid definitions for the virtuous mode

Figure 2:
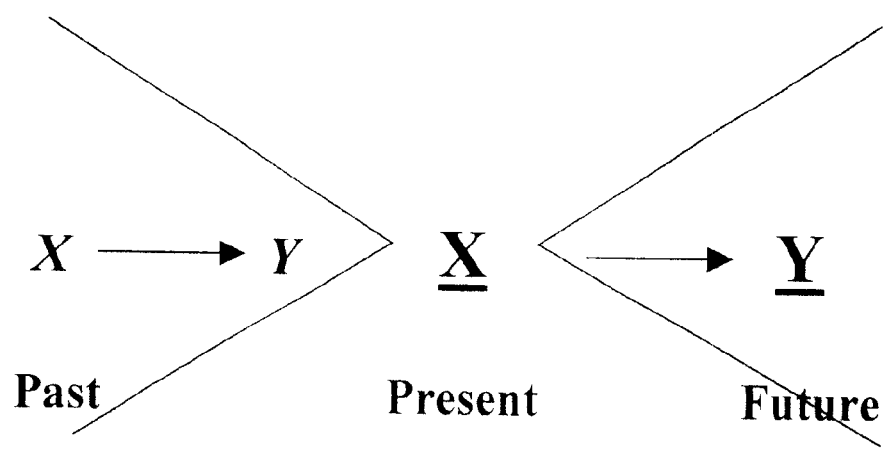
Figure 2:
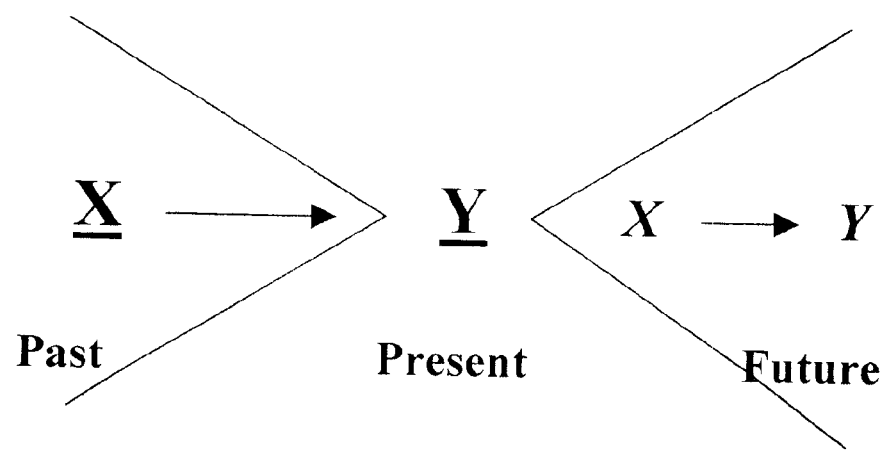
Figure 3A:
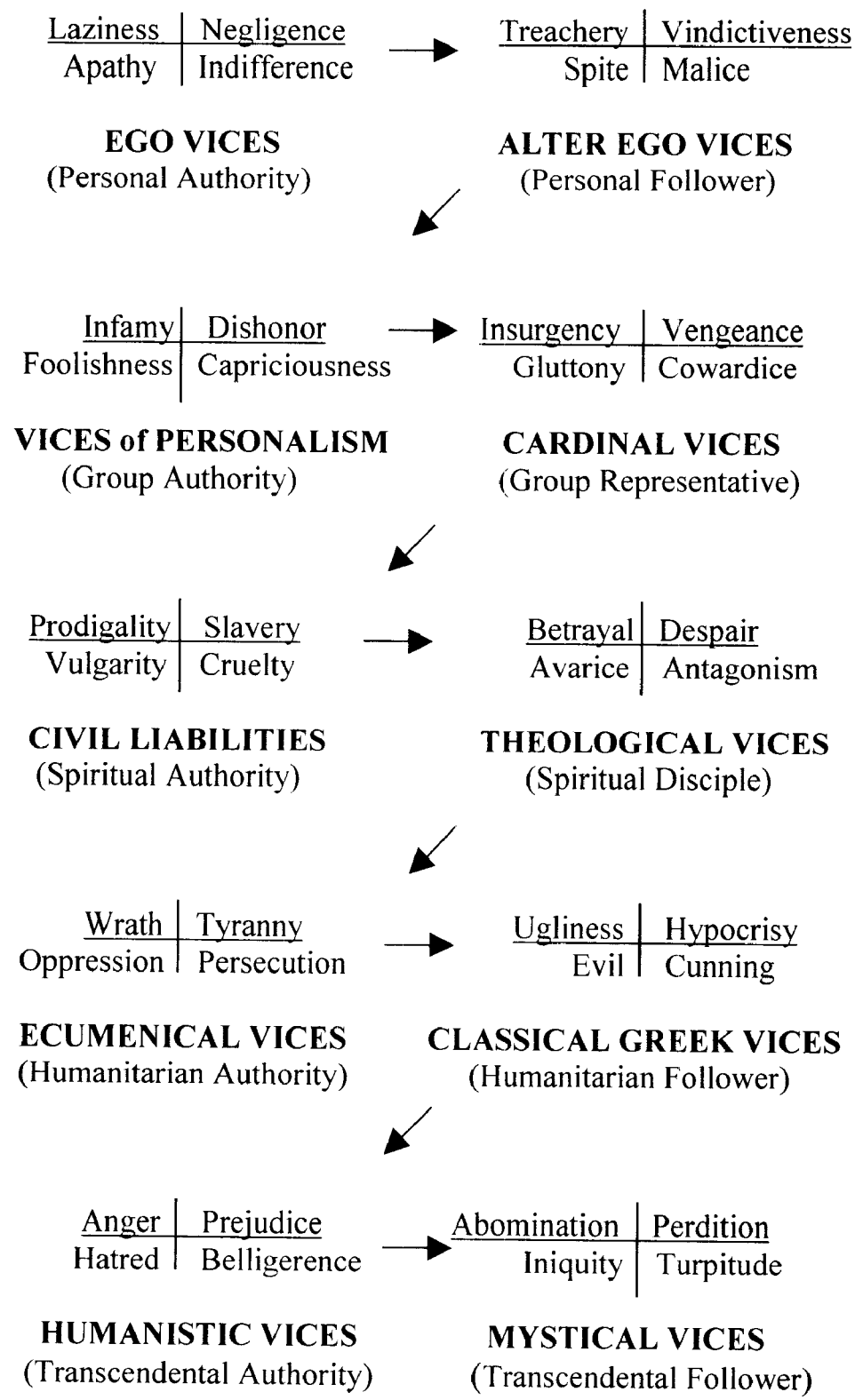
Figure 4A:
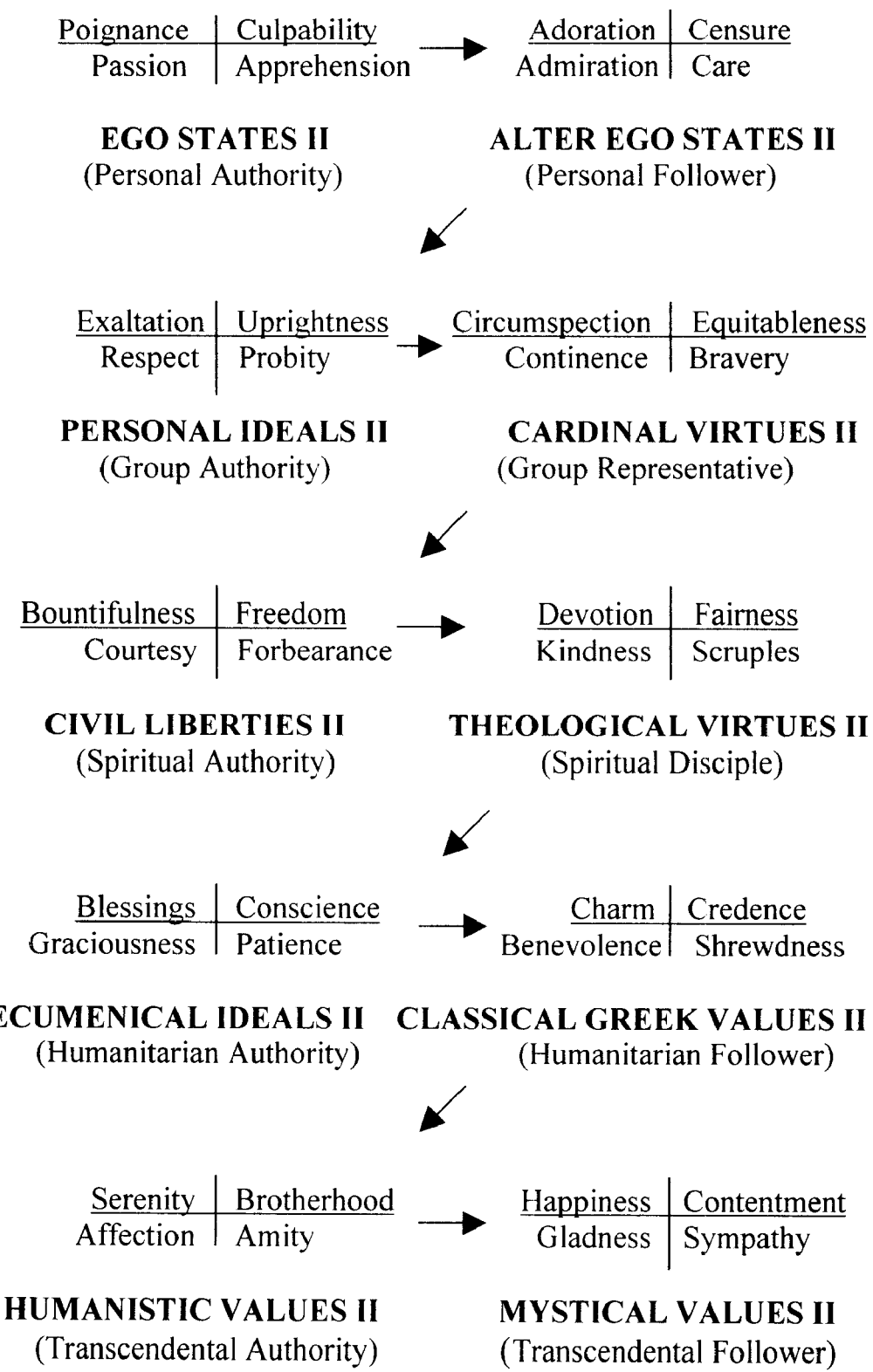
Figure 5A:
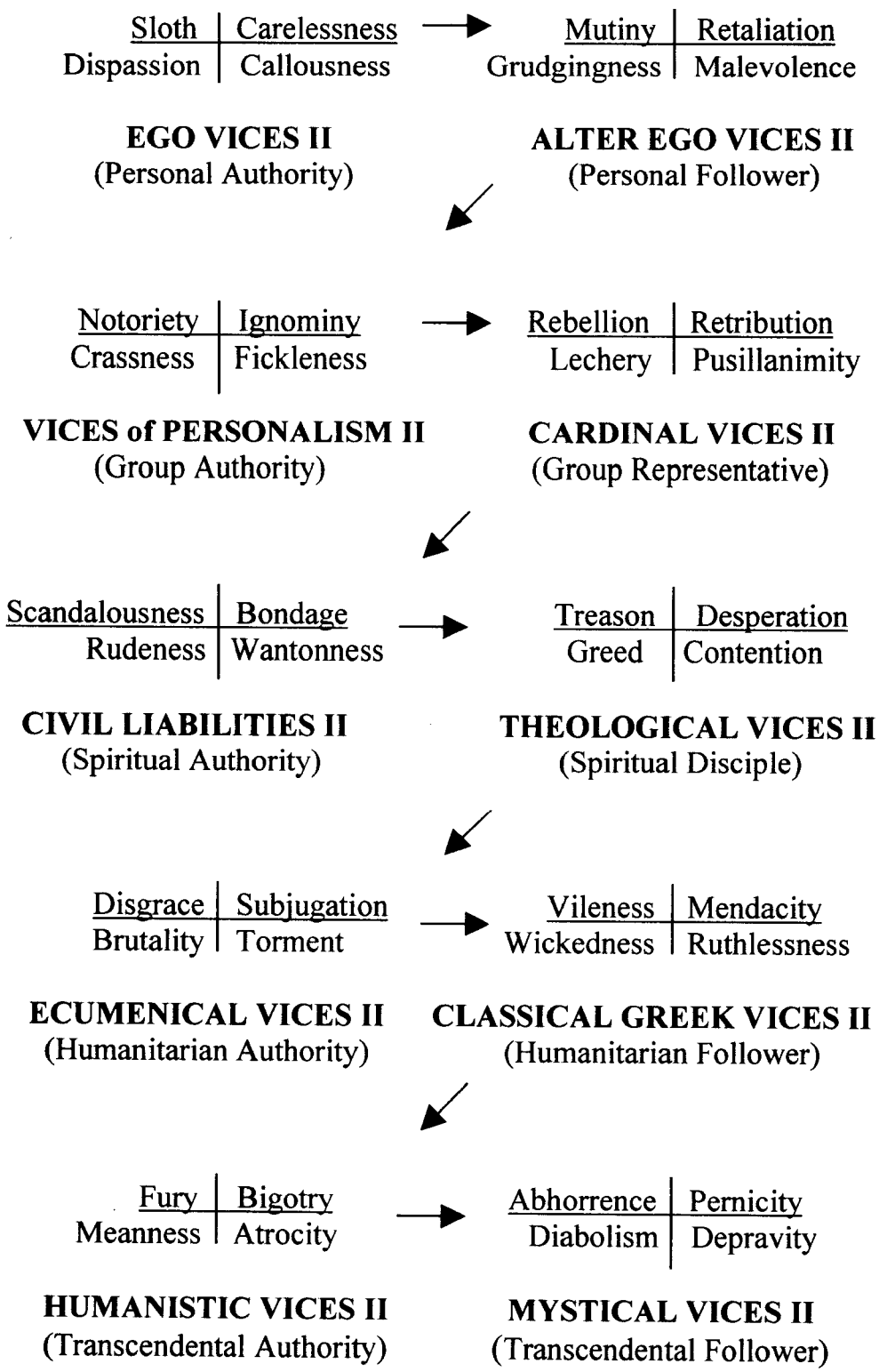
Figure 6A:
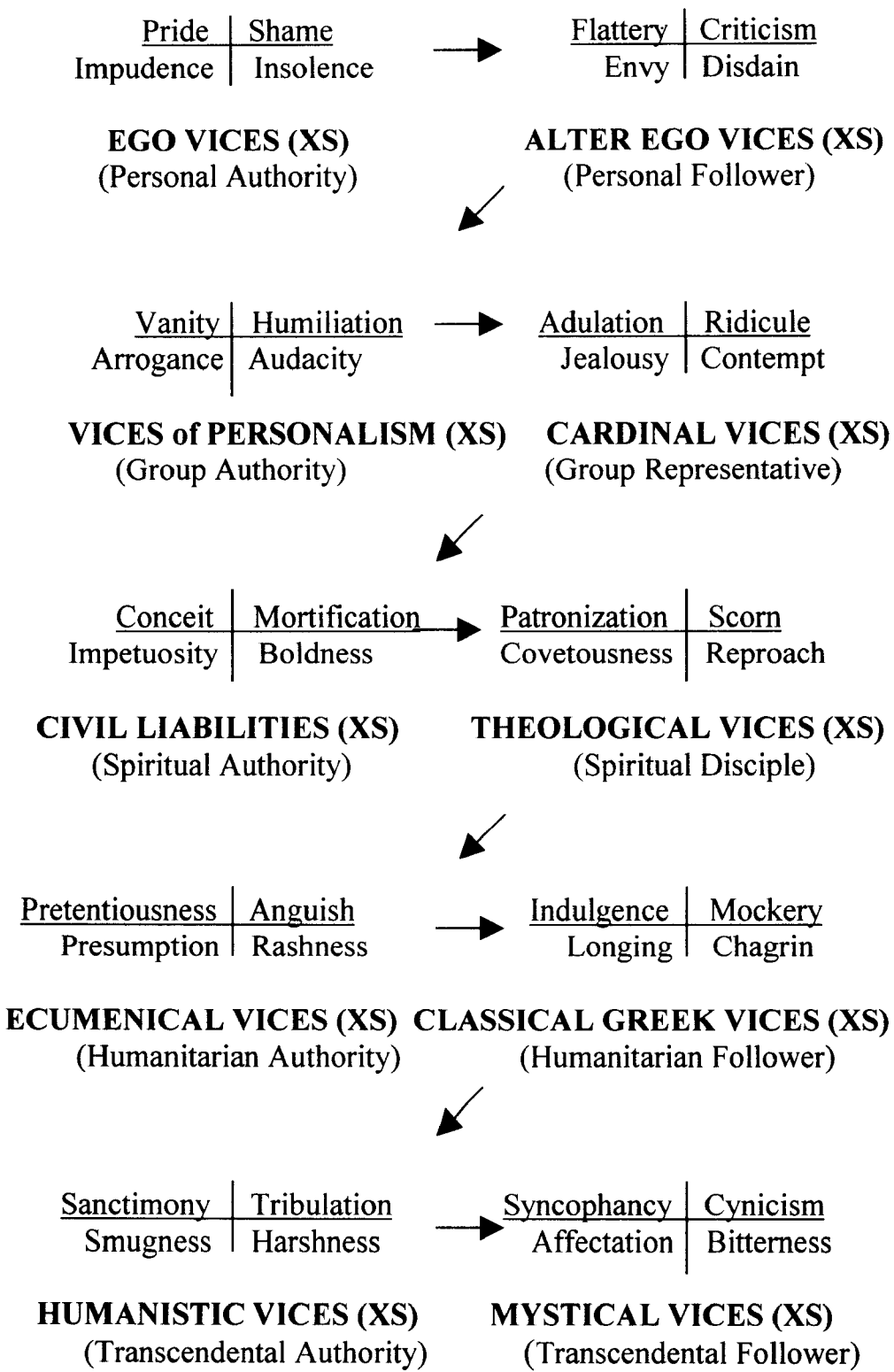
Figure 7A:
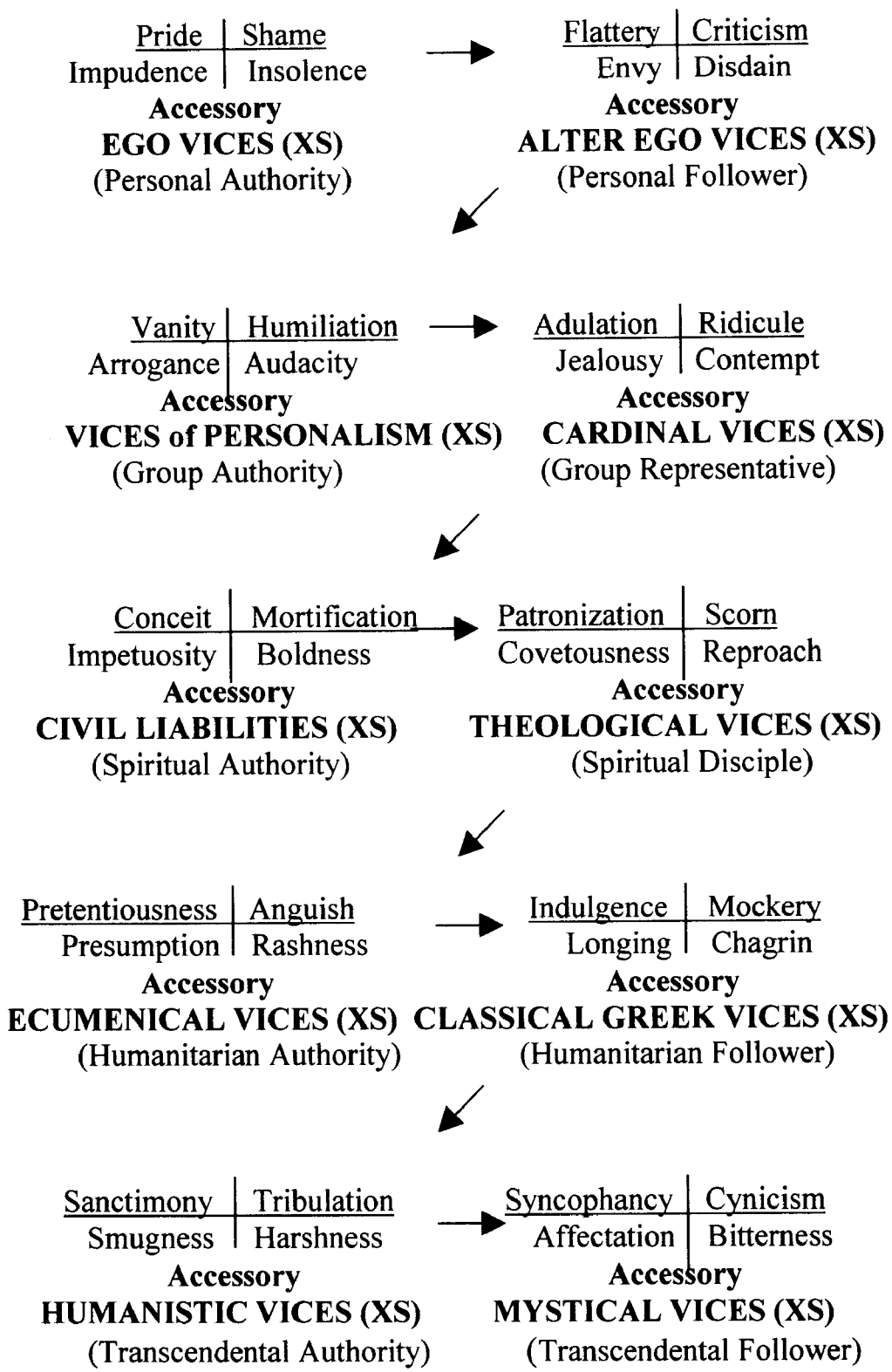
Figure 8A:
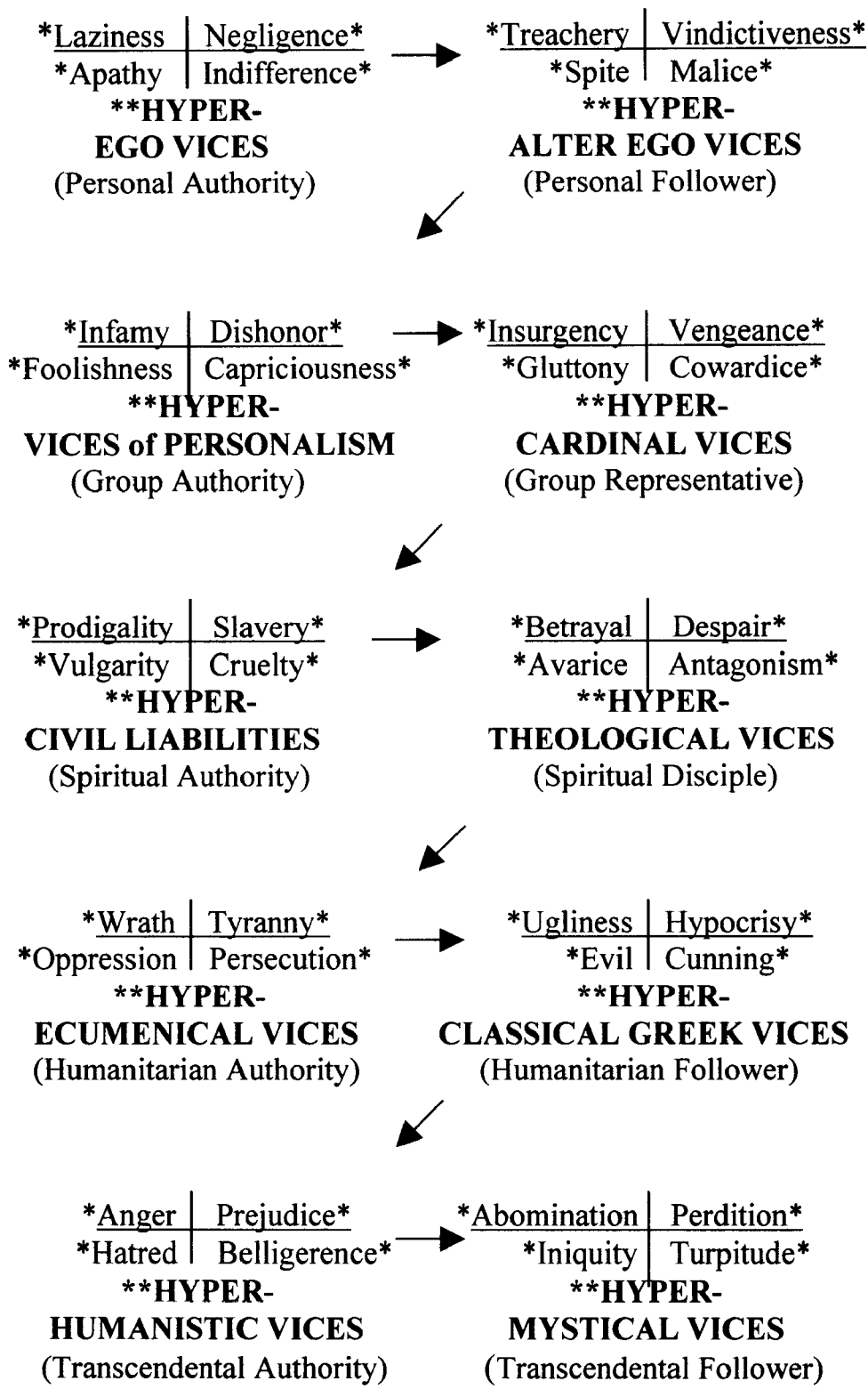
Figure 9A:
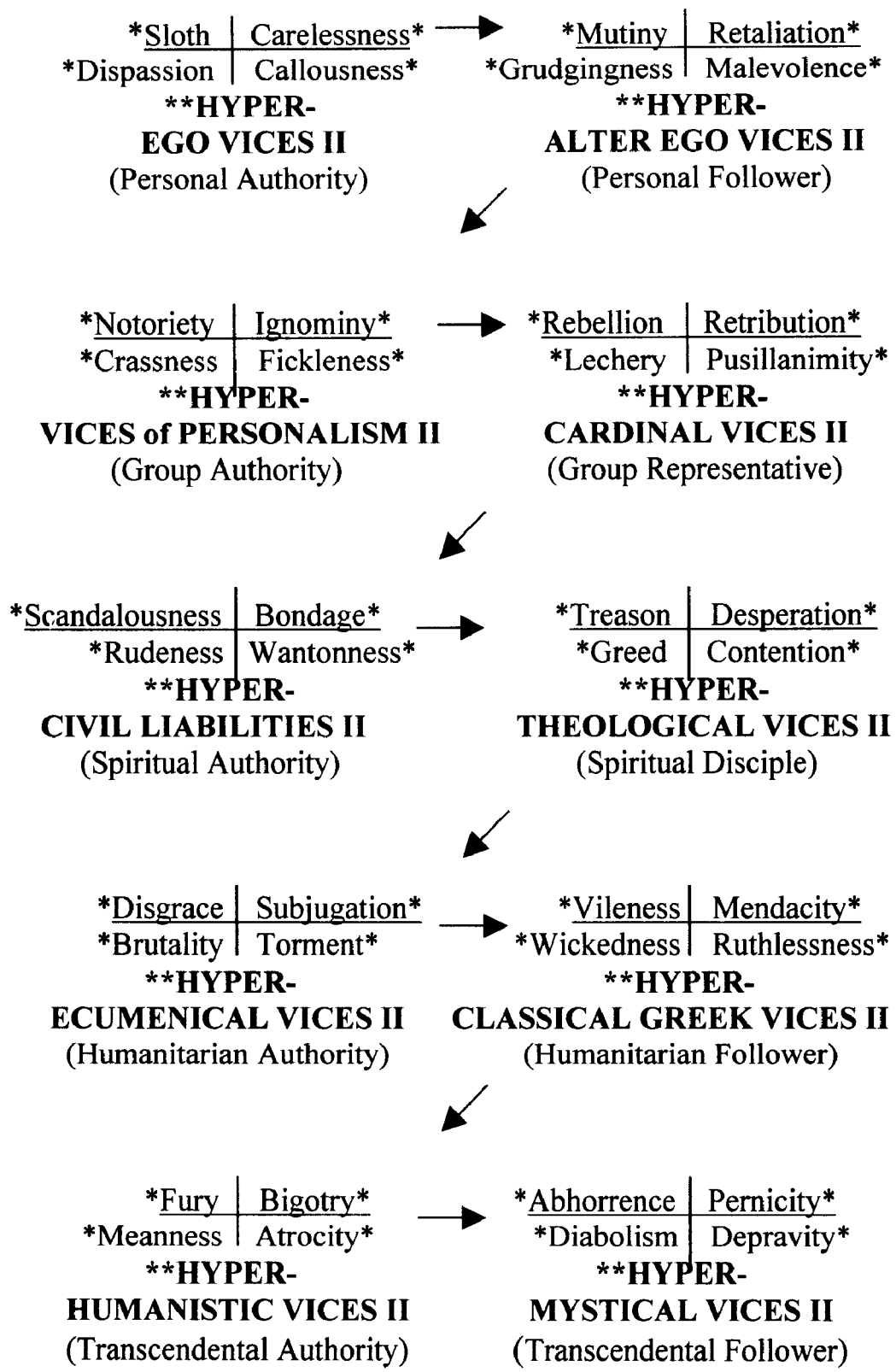
Figure 10:
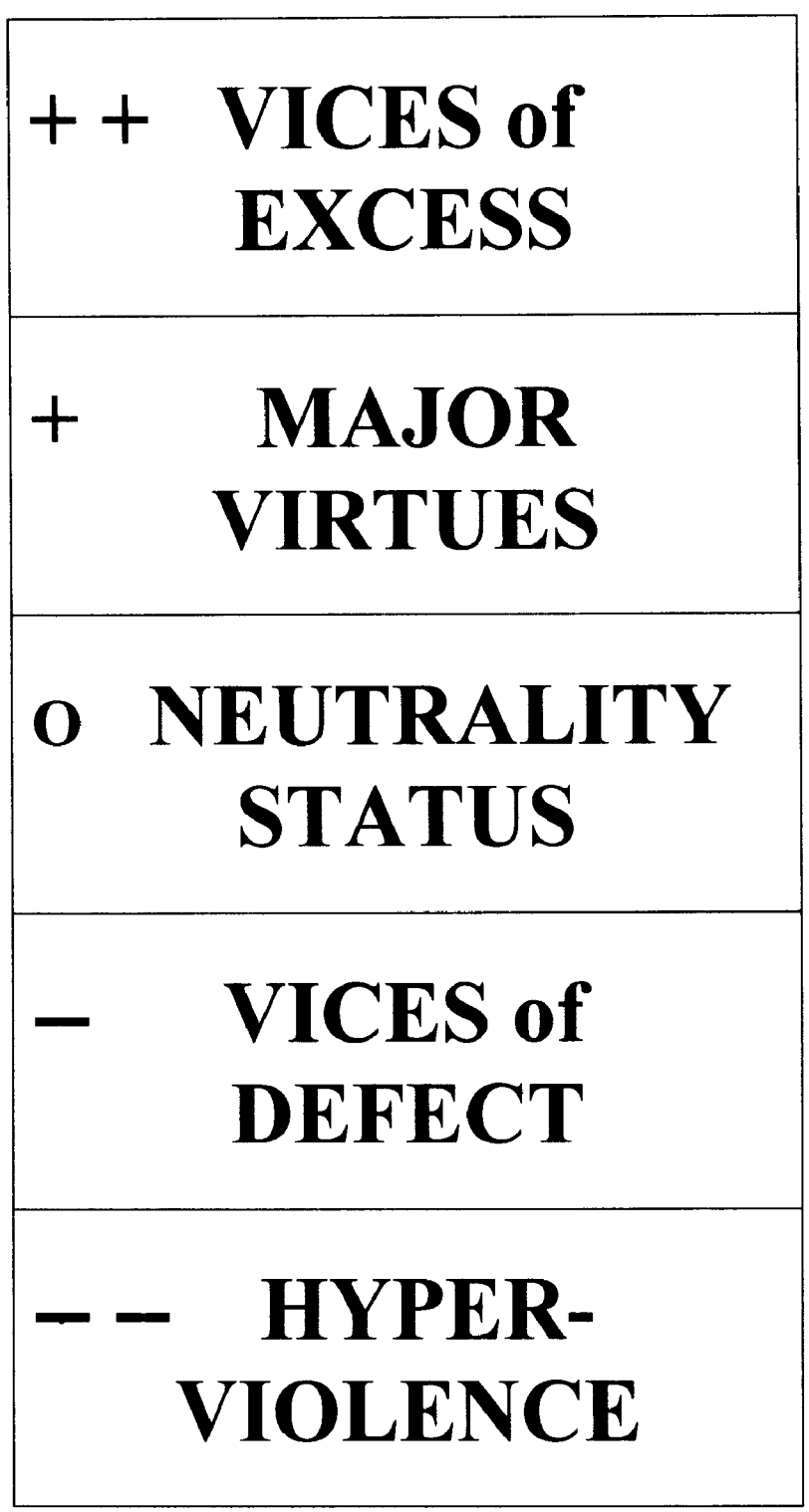
Figure 11:
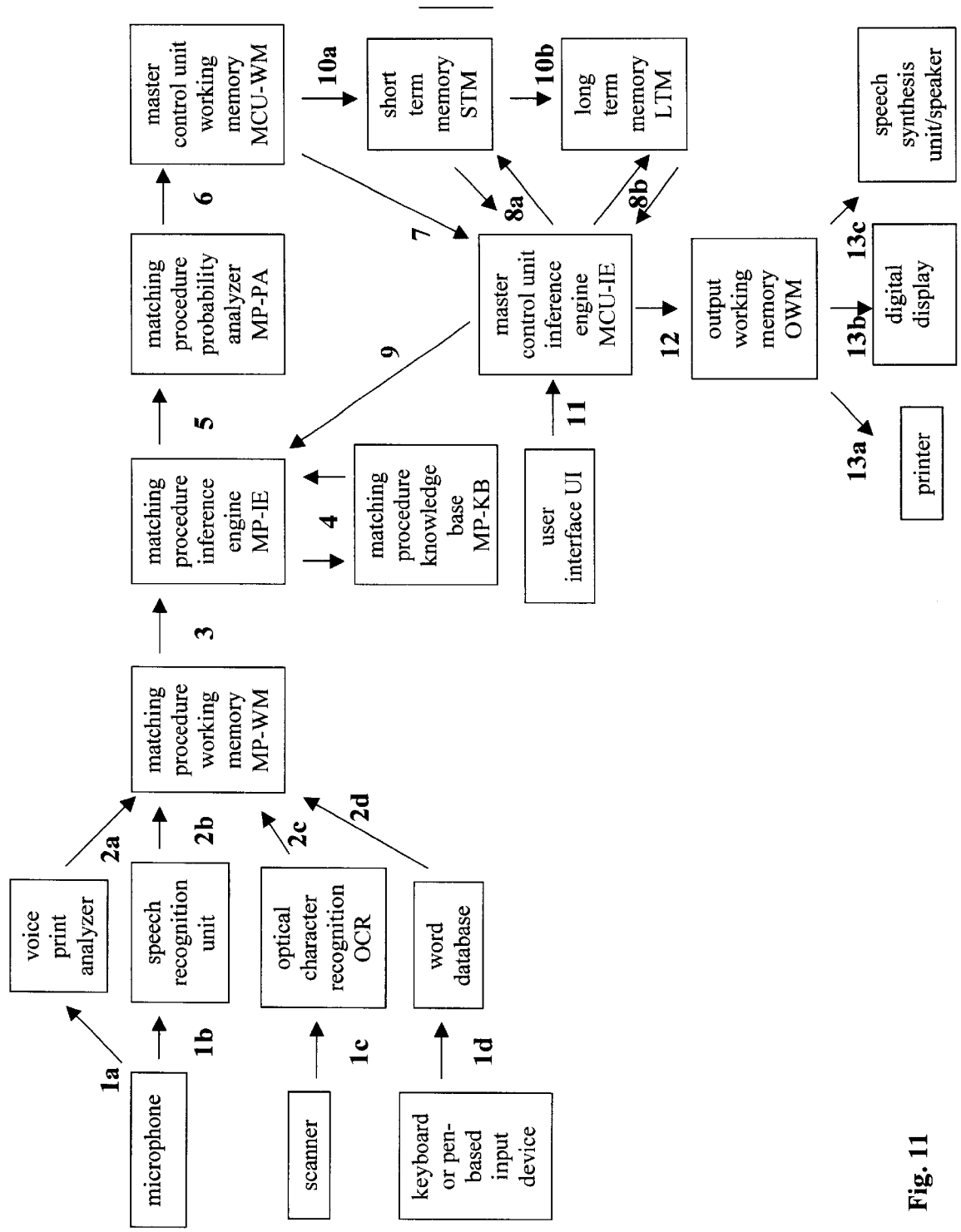
Figure 12:
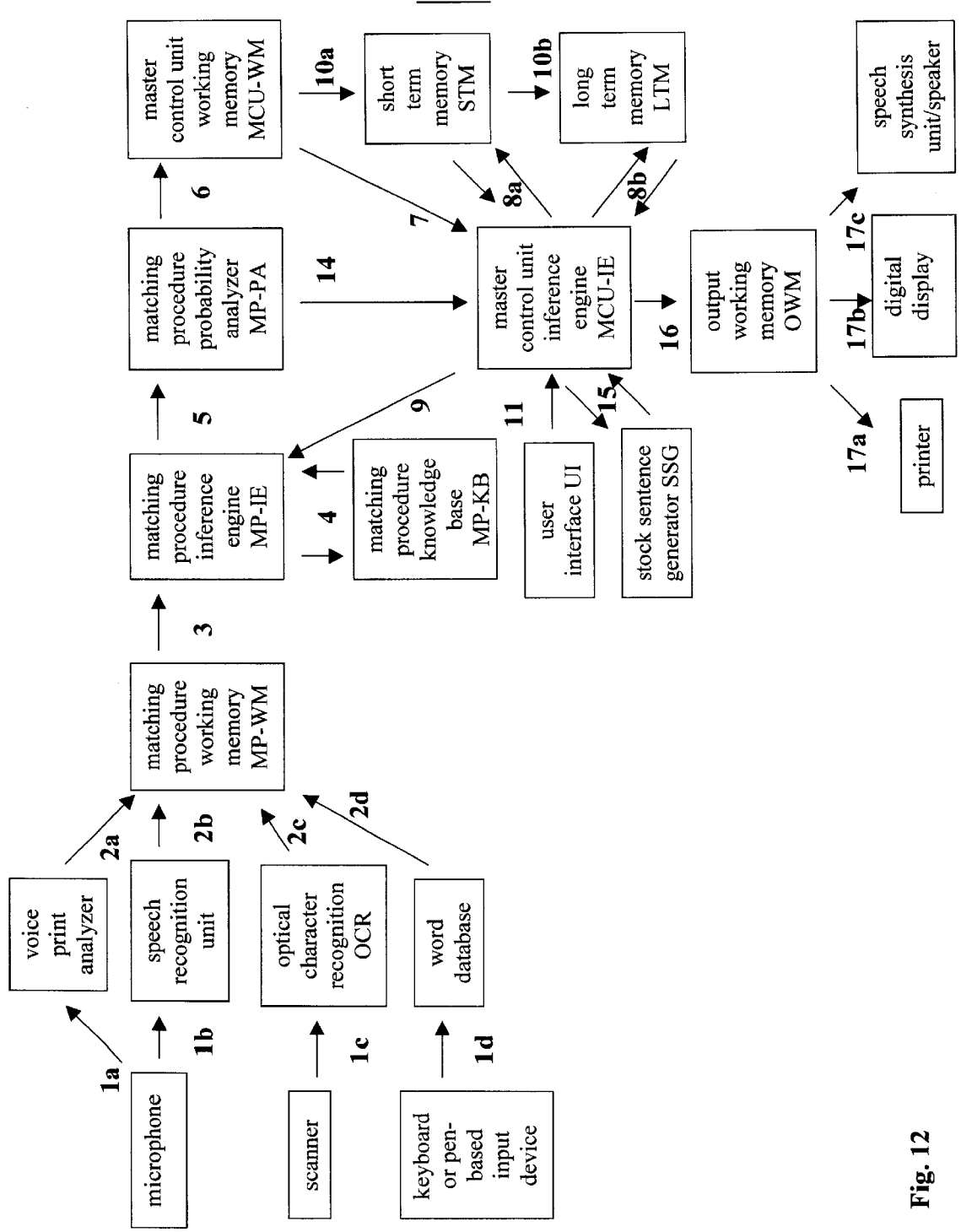
Figure 13:
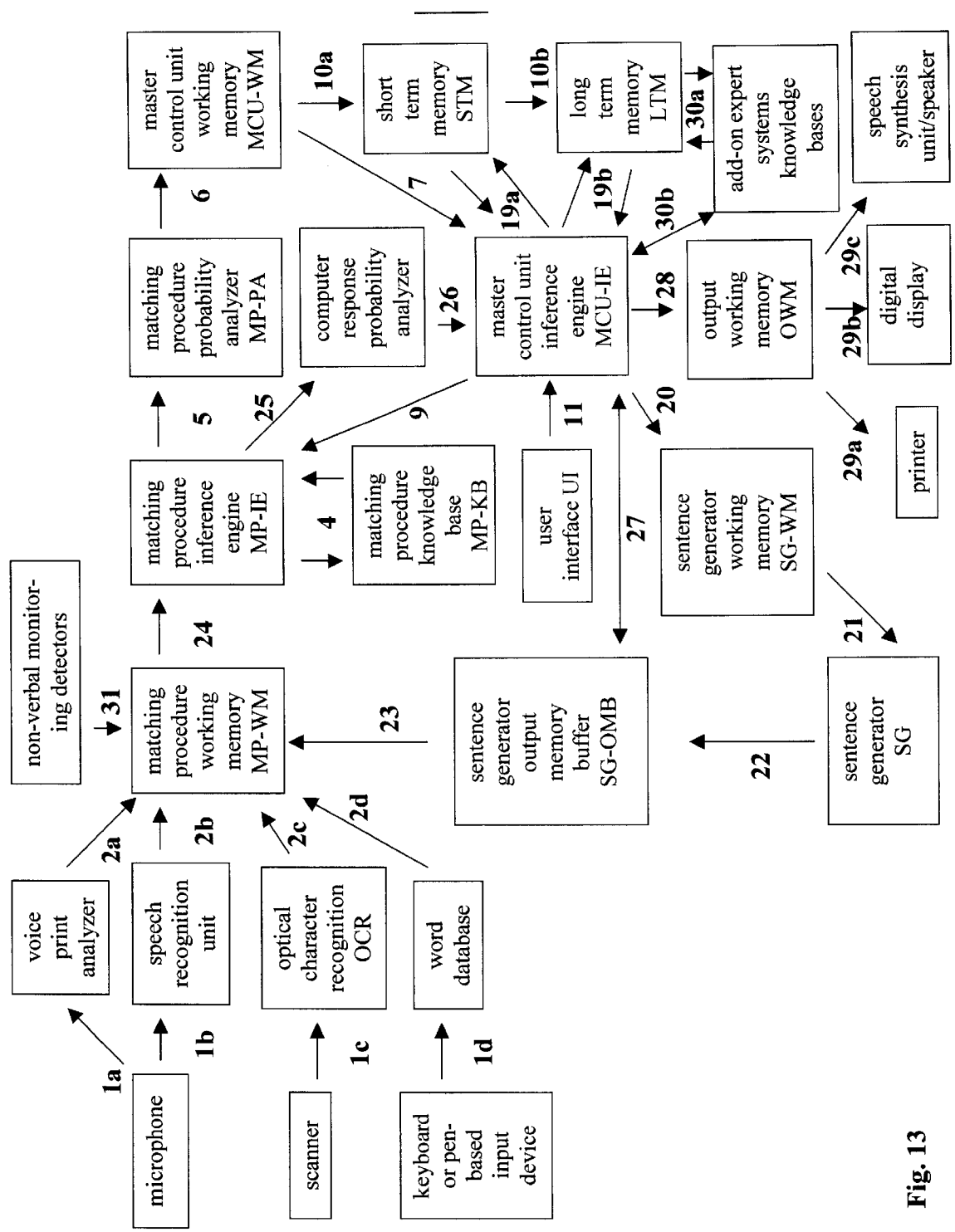

FIGS. 2(A) and (B) are the two-stage, time-based schematic of operant conditioning FIG. 3A is the vices of defect of the power pyramid hierarchy FIGS. 3B, 3C, 3D and 3E are the power pyramid definitions for the vices of defect FIG. 4A is the accessory virtues, values, and ideals of the power pyramid hierarchy FIGS. 4B, 4C, 4D and 4E are the power pyramid definitions for the accessory virtuous mode FIG. 5A is the accessory vices of defect of the power pyramid hierarchy FIGS. 5B, 5C, 5D and 5E are the power pyramid definitions for the accessory vices of defect FIG. 6A is the vices of excess of the power pyramid hierarchy FIGS. 6B, 6C, 6D and 6E are the power pyramid definitions for the vices of excess FIG. 7A is the accessory vices of excess of the power pyramid hierarchy FIGS. 7B, 7C, 7D and 7E are the power pyramid definitions for the accessory vices of excess FIG. 8A is the groupings of hyperviolence of the power pyramid hierarchy FIGS. 8B, 8C, 8D and 8E are the power pyramid definitions for the terms of hyperviolence FIG. 9A is the accessory groupings of hyperviolence of the power pyramid hierarchy FIGS. 9B, 9C, 9D and 9E are the power pyramid definitions for accessory terms of hyperviolence FIG. 10 is the master diagram of the power pyramid schematic illustrating the 5 basic classes FIG. 11 is the flow-chart schematic for the passive monitoring mode of the IIALA FIG. 12 is the flow-chart schematic for the active monitoring mode of the IIALA FIG. 13 is the flow-chart schematic for the (preferred) AI mode of the IIALA

THE DESCRIPTION OF THE POWER PYRAMID DEFINITIONS

FIGS. 1 to 10

A complete 320 part collection of power pyramid definitions serves as the heart of a matching procedure knowledge base of the IIALA, permitting a precise decoding of the motivational parameters of affective language, as well as a computer generated simulation of affective language. The power pyramid definitions are further based upon the conceptual construct of the power pyramid hierarchy, a ten-level hierarchy spanning the personal, group, spiritual, humanitarian, and transcendental authority roles. In addition to the most elementary style of personal interaction, the individual is incorporated into a wide range of group contexts (family, work, school, etc.), as well as an all-encompassing style of spiritual context. The theoretical principles governing the science of Set Theory are clearly in agreement with this three-way specialization, the unit set, the group set, and the universal set corresponding to the personal, group, and spiritual realms, respectively. The most basic personal level of interaction refers to a one-to-one style of relationship between individuals (as seen in one's personal friendships). The personal level, in turn, gives way to the domain of group authority, the group set surpassing the unit set in terms of its expansion to a multitude of elements (or class members) within a group context. This ascending pattern extends a next higher spiritual level of authority. This universal set surpasses the multiplicity of the group domain for the sum-totality of all groups within its domain, representing the group of all possible group sets, a third-order style of set hierarchy (equivalent to the domain of all of mankind). Complex interactions between individuals, however, do not exist in a vacuum, but rather are dually specialized into either authority or follower roles; namely, the personal authority and personal follower roles, the group authority and group representative roles, and the spiritual authority and spiritual disciple roles.

The Master Schematic Diagram of Ethical Groupings

Figure 1A:
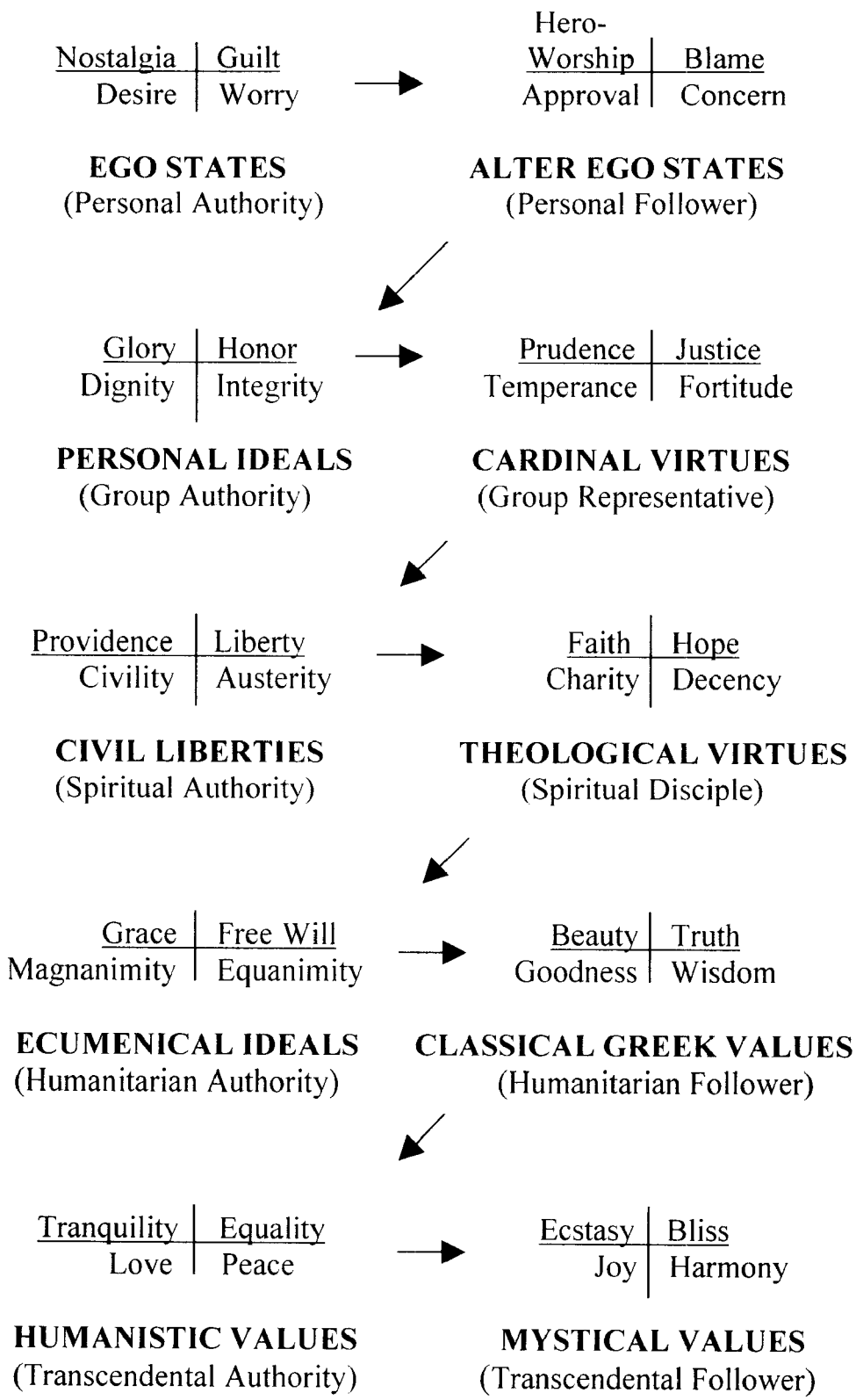
FIG. 1A is virtuous mode of the power pyramid hierarchy

The basic three-level hierarchy of personal, group, and spiritual realms, when viewed in terms of both authority and follower roles; provides the fundamental conceptual framework of virtues, values, and ideals for programming in the IIALA. As schematically illustrated in FIG. 1A, this master diagram is termed the power pyramid hierarchy. As the captions indicate, the first three levels of this diagram are designated for the personal, group, and spiritual levels of the power pyramid hierarchy, accounting for the most basic groupings of virtues and ideals. The remaining lowermost two levels, however, bring to light two hitherto unmentioned categories; namely, the humanitarian and transcendental realms, respectively. Although the $3^{rd}$-order style of spiritual realm is clearly the maximum level of organization (in keeping with the dictates of Set Theory), the very sense of chronological time permits the introduction of an even more advanced level of humanitarian authority. Humanitarian authority transcends the spiritual variety by claiming to speak for all generations of mankind, not just the current one. Furthermore, this extreme sense of the pure power of abstraction serves as the basis for a final, crowning transcendental level of the power pyramid hierarchy. Transcendental authority transcends the routine sense of concreteness shared in common by all of the lower levels, an innovation essential for accounting for the most abstract groupings of values in the power hierarchy. Both the transcendental and humanitarian realms are further specialized into distinctive authority and follower roles (for a grand total of four), which together with the six roles specified for the personal, group, and spiritual levels collectively comprise the master ten-level hierarchy depicted in FIG. 1A.

The Power Pyramid Hierarchy of Virtues, Values, and Ideals

According to FIG. 1A, the ten listings of virtues, values, and ideals are organized into dual descending columns of five groupings each; the left column representing the hierarchy of authority roles, whereas the right describes the corresponding follower roles. This dual style of schematic format represents the sum-totality of reciprocating interactions between the authority and follower figures, as the directional arrows serve to indicate. The distinctive groupings listed for each individual level are further represented in a quartet style of schematic format (depicted as quadrants in a Cartesian system). Some of the more traditional groupings (such as the cardinal virtues) are already represented as four-part listings, fitting quite nicely into such a quadrant-style of format. Others (such as the theological virtues) are supplemented beyond their traditional number in order to achieve this quartet-style of status.

The Behavioral Foundations of the Power Hierarchy

The most basic personal level of power pyramid hierarchy is respectively designated by the groupings of ego states of the personal authority (guilt-worry-nostalgia-desire) and the alter ego states of the personal follower (hero worship-blame-approval-concern). These groupings are tailor-made for incorporation into the power pyramid hierarchy, adapted from the field of self-help psychology; most notably, *Your Erroneous Zones,* by Dr. Wayne Dyer (1976). These basic groupings of ego and alter ego states further serve as the elementary foundation for the remaining listings of virtues, values, and ideals outlined in FIG. 1A. The left-hand column of authority roles is characterized by the authority ideals: read downwards as the personal ideals, the civil liberties, the ecumenical ideals, and the humanistic values. The right hand column of follower roles further specifies a parallel trend based in the realm of the virtues; namely, the cardinal virtues, theological virtues, the classical Greek-values, and the mystical values. Such exceptional symmetry derives from an elementary foundation in the most basic, personal level of the power hierarchy, fully explainable in terms of the behavioral terminology of conditioning theory. It proves particularly effective to view this ethical hierarchy as rooted directly in behavioral principles and terminology, as suggested in the elementary characteristics of the ego and alter ego states.

The Behavioral Terminology of Operant Conditioning

Although lower animal societies remain almost exclusively at the mercy of the environment for immediate reinforcement (or lack of it), mankind's facility for taming the environment has led to the reassignment of such reinforcement to specialized institutions within the social hierarchy. This latter aspect is particularly apparent in the traditional work place, where an employee performs a service function in exchange for secondary reinforcers; e.g., money, power, prestige, etc. The human sphere of operant conditioning is accordingly seen as a two-stage process; namely, goal-seeking behavior followed by subsequent reinforcement. The individual initially acts in a procurement fashion (e.g., appetitively or avoidantly) in order to be positively rewarded or leniently spared punishment. The employee works industriously to earn the praise of his boss, or acts submissively to avoid being fired. When (X) is defined as procurement and (Y) given as reinforcement, the complete operant sequence is respectively defined as X→Y. The worker may toil for an entire month before finally being rewarded with a paycheck, based upon the memory of past pay-periods. Such past and future contexts necessarily specify lengthy lag-times, calling for symbolic language ability for keeping such absent roles formally in mind. Through this verbal innovation, mankind is freely able to communicate about motivations not immediately occurring: recalling past contexts (presupposition) or imagining future potentialities (entailment).

Conditioning as a Two-Stage Process

This brings up the basic paradox of the conditioned relationship; namely, as a two-stage sequential process, only one role can occur in the present at any given time. When procurement is actively occurring, reinforcement is a future potentiality. Similarly when reinforcement finally comes to pass, procurement is reduced to a memory status. This dual style of interaction is schematically represented in FIG. 2, procurement again represented by the letter (X), while reinforcement is designated by the letter (Y). The complete scale of time is depicted by paired (oppositely facing) wedges designating past and future time frames, with the gap separating them representing the present. This dual wedge format was chosen in reference to the observation that the measure of time increases as a direct function of its distance from the present. According to part (A) of FIG. 2, when procurement (X) is immediately occurring, reinforcement (Y) is designated as a future potentiality: an interaction formally based upon the successful completion of previous past interactions; represented schematically as the X→Y (small type) notation depicted in the past-directed time wedge.

In part (B), the inevitable passage of time relegates procurement (X) to a memory role, prompted by the active bestowal of reinforcement (Y) in the present. Current reinforcement now focuses upon the formerly active procurement role, formally adding a sense of closure to the completed operant sequence. This is the active template upon which all future operant sequences are based (represented by the X→Y notation depicted in the future-directed time wedge). Through this interplay of sequences (A) and (B), both procurement and reinforcement share an equal spotlight in the present (along with their alternate displacement into both past and future time frames, respectively). The completion of part (B) formally sets the stage for even further cycles in the operant sequence; for if configuration (B) is phase shifted one step further into the past, one arrives back at the identical configuration depicted in part (A). It is only through such an artificial analysis (isolated by stages through time) that the conditioned relationship can be seen to be punctuated from either the procurement or reinforcement perspectives, respectively. The active styles of procurement behavior (either appetite or aversion) initiate the operant sequence, aimed towards the future bestowal of reinforcement; e.g., rewarding or lenient treatment, respectively.

This two-stage model of operant conditioning further explains the dynamics of the distinctive groupings of ego and alter ego states. Procurement (in the appetitive mode) is colloquially equated with desire, a forward-looking emotion that solicitously aims at future approval or rewards. A similar scenario holds true in the case of avoidance types of behavior, only now colloquially labeled as the respective concept of worry. In the case of worry, the individual submissively acts in a contrite fashion, fully expecting a lenient sense of concern from his peers.

Hero worship, in turn, is alternately identified as an active style of positive reinforcement bestowed by the personal follower aiming to reward the past notable achievements of the personal authority (experienced as nostalgia). A similar case holds true for the remaining operant sequence linking guilt and blame, with the exception that leniency (rather than rewards) is now called into focus. In this instance, the personal authority guiltily acts in a submissive fashion towards his follower figure, his verbal expression of guilt representing a vulnerability maneuver of the appeasement variety.

The Metaperspective Schematic Format

This higher-order interplay of the ego and alter ego states is reminiscent of the similar concept popularized in the modern-day field of Communications Theory; namely, the metaperspective format of R. D. Laing, and also P. I. Watzlawick. In *Interpersonal Perception* (1966) Laing and associates researched the dynamics of interpersonal communication, characterizing it as the "spiral of reciprocal perspectives." In *Pragmatics of Human Communication* (1967) Watzlawick (et. al.), in turn, examined the informational aspects of communication: exemplified as his "hierarchy of metaperspectives." Both formulations share a common hypothesis; namely, communication between individuals is overlaid with abstract meta-messages, representing a higher order perspective upon the viewpoint held by another: schematically defined as "this is how I see you seeing me." This formal multi-level model of meta-communication in general finally allows for an independent confirmation of the entire higher-order structure of the power pyramid hierarchy, culminating in an unprecedented 10th-order level of meta-abstraction. Such an arrangement necessarily implies the more abstract repetition of both authority and follower roles in the power pyramid hierarchy. Being as the personal authority acts first in the operant sequence, he necessarily is the first to repeat, this time in the modified sense of group authority. This meta-meta-order perspective of the group authority, in turn, is countered by the meta-meta-metaperspective of the group representative. Indeed, this reciprocating style of power escalation is effectively repeated for the remaining spiritual, humanitarian, and transcendental realms of the power hierarchy; culminating in an unprecedented 10th-order level of meta-abstraction.

The Power Pyramid Definitions

The applications of the power pyramid hierarchy to artificial intelligence calls for a higher degree of precision than has so far been demonstrated. The systematic organization of the power pyramid hierarchy allows the construction of what are termed the power pyramid definitions. This crucial innovation spells out (in longhand) the precise location. of each virtue or value within the linguistic matrix, while preserving the correct status of respective authority and follower roles. Each definition is formally constructed along the lines of a two-stage sequential format; namely, (A) the formal recognition of the preliminary power maneuver, and (B) the current countermaneuver now being employed, and hence, labeled. Take, for example, the representative power pyramid definition of justice reproduced below:

---

Previously, I (as your group authority) have honorably acted in a guilty fashion towards you: countering your (as PF) blameful treatment of me.
But now, you, (as group representative) will justly-blame me: overruling my (as GA) honorable sense of guilt.

---

According to this specific example, the honorable sense of guilt expressed by the group authority represents the preliminary power maneuver, countered by the just-blaming strategy initiated by the group representative. According to this basic format, the preliminary power perspective represents the one-down power maneuver, while the immediate power perspective is accordingly designated as the one-up variety. Power leverage is accordingly achieved by rising to the one-up power status; namely, ascending to the next higher metaperspectival level.

The complete four part listing of power pyramid definitions for the virtuous mode is listed in FIGS. 1B, 1C, 1D, and 1E. The instinctual terminology of operant conditioning is seen to dominate at the initial levels, replaced in due fashion by the virtues, values, and ideals of the higher levels. At each succeeding level, a new term (underlined) is introduced (representing the power maneuver currently under consideration). Beginning with the group authority level, the initial terms begin to drop out of the definitions, necessarily freeing up space for the current terms under consideration; (whereby maintaining a stable buffer of terms within the definitions). The respective authority and follower roles remain fixed throughout the entire span of the power hierarchy, systematically abbreviated approximately half of the time for sake of brevity in non-critical (redundant) positions. Accordingly, PA stands for personal authority, PF equals personal follower, GA stands for group authority, etc. Three of the atypical abbreviations are GR (group representative), SD (spiritual disciple), and RH (representative member of humanity).

The Power Pyramid Definitions of the Vices of Defect

The completed description of the power pyramid definitions for the virtues, values, and ideals serves as the basic foundation for the language matching procedure. This virtuous realm is not the total picture; for any all-encompassing system must be able to deal with the evils of the world as well as the good. For every virtue and value, there exists a corresponding vice (or antonym): i.e., love vs. hate, good vs. evil etc. Aristotle defines these opposites as the vices of defect. Just as the virtues and values were seen as higher metaperspectives within the realm of operant conditioning (appetite or aversion aimed at positive or negative reinforcement), Skinner also distinguishes a darker side of conditioning (commonly known as punishment). Punishment represents a complete reversal of the reinforcement format in that positive and negative reinforcers are withheld rather than bestowed, discouraging behaviors that are not suitably solicitous or submissive. In contrast to the desire for rewards, apathy leads to spitefulness rather than approval. Furthermore, in contrast to a worrisome anticipation of leniency, indifference leads to malice rather than concern. In turn, laziness/treachery is substituted in place of nostalgia/hero worship, while negligence/vindictiveness replaces guilt/blame.

These basic listings of vices group together similar to those seen for the virtuous mode; namely, the grouping of laziness-negligence-apathy-indifference is termed the ego vices, while the next higher grouping (treachery-vindictiveness-spite-malice) is termed the alter ego vices, in direct correspondence to the original groupings of ego/alter ego states. Furthermore, a series of eight even more abstract listings of vices builds in a hierarchial fashion upon this elementary foundation in the ego and alter ego vices. This alternate power pyramid hierarchy of the vices is identical in every respect to the format previously seen for the reinforcement hierarchy, each virtue or value corresponding (point for point) with a respective vice within the punishment hierarchy. Each such vice is a direct antonym of the corresponding virtue, making for precise, quartet style listings analogous to the traditional listings of virtues and values. This master, power pyramid hierarchy of the vices of defect is depicted FIG. 3A, identical in form and function to that of the virtuous mode depicted in FIG. 1A. It further proves possible to construct a parallel series of power pyramid definitions with respect to this realm of the vices of defect, parallel in every respect to those specified for the virtuous mode. A complete listing of the definitions for the vices of defect are shown in FIGS. 3B, 3C, 3D, and 3E; in preparation for a discussion on applications to artificial intelligence.

The Power Pyramid Definitions of the Accessory Groupings of the Virtues and the Vices of Defect In addition to the fundamental listings of virtues and vices, it is further possible to postulate the existence of a parallel series of accessory terms. These accessory virtues and vices arise as direct transformations upon the major groupings, with the "you" and "I" reversed within the corresponding power pyramid definitions. This allows for a subjective perspective upon a purely objective viewpoint (and vice-versa). These accessory terms represent close synonyms of the major terms, specifying a distinction between the subjective/objective styles of polarity; namely, desire vs. passion, blame vs. censure, etc. (as schematically represented in FIG. 4A (the virtues), and FIG. 5A (the vices). Furthermore, these accessory terms are further converted into their own distinctive complements of power pyramid definitions. FIGS. 4B, 4C, 4D, and 4E depict the complete listing of definitions for the accessory virtues, values and ideals: followed by FIGS. 5B, 5C, 5D, and 5E: designating the further series of power pyramid definitions for accessory vices of defect.

The Power Pyramid Definitions of the Vices of Excess, and Accessory Vices of Excess The cohesive hierarchy of the vices of defect cannot be said to be all-inclusive, for only half of the Seven Deadly Sins are fully accounted for by these traditional vices. Several of the deadly sins; namely, pride, envy, and covetousness defy incorporation into this hierarchy of opposites. Their existence is ultimately explainable in terms of an additional hierarchy of vices, known since ancient times as the vices of excess. The classical Greek philosopher, Aristotle first proposed such a dual system of vices; namely, the vices of defect (as previously described) and the vices of excess (defined as extremes in the realm of the virtues). Aristotle viewed the virtuous mode as a system of mean values (or norms) interposed between these two extremes of vice. For example, the cardinal virtue of fortitude represents the ideal mean value between the corresponding vice of defect (cowardice), and the alternate vice of excess (recklessness). While the vices of defect represent clear-cut antonyms, the vices of excess designate a more ambiguous determination of a degree of excess (a factor clearly relativistic when compared across different cultures). Certain of the vices of excess are universal denounced, for example, pride is an excessive form of nostalgia, whereas shame represents excessive guilt. Indeed, an entire parallel hierarchy of vices of excess is depicted in FIG. 6A, whereby mirroring point-for-point its respective foundation in the hierarchy of the virtuous realm. These vices of excess, in turn, are incorporated into a distinctive complement of power pyramid definitions, as presented in FIGS. 6B, 6C, 6D, and 6E: in preparation for a discussion of applications to the IIALA. In analogy to the virtuous mode (upon which they are based), these vices of excess (by definition) are further complemented by accessory listings of terms, as formally depicted in FIG. 7A. These accessory vices of excess are formally incorporated into their own accessory complement of power pyramid definitions, as listed in FIGS. 7B, 7C, 7D, and 7E.

The Power Pyramid Definitions of the Vices of Hyperviolence, Along with the Corresponding Accessory Terms According to the enduring traditions of ethics proposed by Aristotle, the virtuous realm is conceptualized as a mean value between the vices of defect and the vices of excess. This three-way specialization, however, conspicuously lacks an even sense of symmetry. Being that the extremes in the virtuous realm lead to the vices of excess, then the vices of defect must similarly be invested with a parallel realm of extremes: a domain termed further termed the realm of hyperviolence. Hyperviolence differs from ordinary violence primarily in the degree of extremes with which it is bestowed. The disturbing instances of senseless violence typically reported in the news clearly fall into this category, an unfortunate escalation of aggressive behavior that is completely out of proportion to its precipitating circumstances. The more routine vices of defect clearly exhibit the distinct propensity for escalating into such a hyperviolent state of affairs in susceptible individuals. Such outbursts are typically isolated incidents, the perpetrator usually fleeing to avoid prosecution (resulting in minimal potential for any ongoing style of interaction). Accordingly, there is little in the way of terminology for describing these hyperviolent states. Owing to the critical significance of this realm of hyperviolence, a simple terminology has been devised for labeling the predicted individual slots. Each of the regular vices of defect (such as spite) is given the prefix hyper-, designating its extension into the realm of excess (i.e., hyper-spite). The complete listing of the terms of hyperviolence is depicted in FIG. 8A, while the accessory versions are listed in FIG. 9A. This terminology is further incorporated into a corresponding series of power pyramid definitions, in preparation for a discussion of applications to the IIALA. The major listings of definitions are offered in FIGS. 8B, 8C, 8D, and 8E; while the accessory versions are given in FIGS. 9B, 9C, 9D, 9E. These formal models of hyperviolence should only rarely would come into consideration in computer monitored situations, allowing for detection and intervention only where appropriate.

A Summary of the Unified Schematic Format of the Power Pyramid Hierarchy

In conclusion, the formal addition of the realm of hyperviolence completes the perfect four-part symmetry of virtues and vices within the power pyramid hierarchy. This complete four-part schematic system is depicted in FIG. 10 (actually a five-part diagram, with the addition of the novel concept of "neutrality status"). Neutrality status is defined as the benign sense of neglect we express to strangers on the street: individuals we have no meaningful relationship with (yet mean no harm to either). New interactions (by definition) stem initially from this neutrality status, progressing into the realm of the virtues, or alternately into the domain of the vices of defect. On rare occasions this process can leapfrog directly into the domain of excess; i.e., the vices of excess or the realm of hyperviolence. These transitions summate to a large number of options, namely, the four basic dimensions multiplied by 40 terms (for a grand total of 160 possible variations).

In addition, these four basic domains can freely transition into one each other; i.e., glory, transitions into the realm of excess as vanity, or alternately into the domain of the vices of defect as infamy, and also hyper-infamy (along with parallel transitions into the accessory realm. The sum total of potential single stage transitions yields a grand total of 1,120 possible variations (including transitions from the neutrality status). When two-stage transitions are further factored in (i.e., glory to vanity to infamy) the number of possibilities expands to the square of 1120 (or well over a million). This expanded potentiality fully explains the unfathomable complexity of the human mind, a factor that proves exceedingly significant to the workings of any AI machine, as will now to be described in more intimate detail with respect to the complete 32 pages of power pyramid definitions.

SPECIFICATIONS AND OPERATION

FIGS. 11, 12, 13

The inductive inference affective language analyzer (abbreviated IIALA) exhibits three distinctive modes of operation, each with its own advantages. First described is a passive monitoring mode, monitoring a verbal interaction without any active input of its own (no clarification of ambiguities). This circumstance is remedied by a subsequent, active monitoring mode, clarifying uncertainties through the addition of a stock sentence generator (devising interview types of questions eliciting yes or no answers). The most advanced mode of operation is a true AI simulation mode, where the IIALA employs detection/monitoring data to simulate an interactive role of its own. This is accomplished through the aid of a general purpose sentence generator, formulating responses that are judged for appropriateness by feedback through the system. Each of these modes of operation is described further in the order given. Of these three, true AI simulation is the preferred mode, being the most complete. All three modes are actually intimately interconnected, each with its own advantages to a given application.

Reference List of Abbreviations Used in Patent FIGS. 11, 12, 13
AI=artificial intelligence
AMS=active monitoring subcomponent
CR-PA=computer response probability analyzer
IIALA=inductive inference affective language analyzer
LTM=long term memory
MCU=master control unit
MCU-IE=master control unit inference engine
MCU-KB=master control unit knowledge base
MCU-PA=master control unit probability analyzer
MCU-WM=master control unit working memory
MP-IE=matching procedure inference engine
MP-KB=matching procedure knowledge base
MP-PA=matching procedure probability analyzer
MP-WM=matching procedure working memory
OCR=optical character recognition
OWP=output working memory
SG-WM=sentence generator working memory
SSG=stock sentence generator
SG-OMB=sentence generator output memory buffer
STM=short-term memory
UI=user interface The Passive Monitoring Mode A passive monitoring mode (depicted in FIG. 11) serves as the basic foundation for the remaining two modes of the IIALA. As a process for decoding the motivational parameters of affective language, the flow chart depicting the operation of this process, as well as the supportive hardware, are both illustrated in the same schematic diagram. According to FIG. 11, the sequence of steps comprising the operation of the passive monitoring mode are depicted using consecutively numbered arrows, each number designating the step in the procedure depicted in the box to which the designated arrow points to. This specific format was chosen (instead of numbering the individual boxes themselves) due to the fact that some of the boxes are assigned differing functions in the remaining active monitoring and AI simulation modes. For sake of clarity, the arrow leading directly to a given box is therefore numbered, allowing all three modes of operation to be depicted concert with one another.

The first step in the passive monitoring mode is an input stage, where language is inputted for matching with the power pyramid definitions. Spoken language is decoded by means of a microphone linked to a speech recognition unit (step 1b): where sound waves are analyzed into distinct words and sentences using continuous speech recognition (such as commercially available in IBM's Via Voice program). A microphone is also connected to a voice print analyzer (step 1a) allowing a person speaking to be matched to a voice print stored in long term memory. Active written input from a keyboard or handwriting recognition device is routed to a digital word database (1d). Printed text is inputted from a scanner to an optical character recognition program (OCR) such as Xerox Pagis Pro (step 1c). Discretely analyzed words or phrases are subsequently routed to a working memory of the power pyramid definition matching procedure (steps 2b, 2c and 2d). The voice print results are also routed to the working memory (abbreviated MP-WM) (step 2a).

The Power Pyramid Definition Matching Procedure Inference Engine

A matching procedure with the power pyramid definitions is initiated upon the sentence data imported to the working memory of the matching procedure The circuitry relating to this procedure is structured along the lines of an expert system (the power pyramid definition matching expert system). It consists of the three basic components of an expert system; namely, an inference engine, a knowledge base, and a working memory (the MP-WM, already described). The inference engine is a hierarchy of processor complexes, a separate processor complex dedicated to each power pyramid definition (for a grand total of 320): 40 for the virtuous mode, 40 vices of defect, 40 vices of excess, 40 vices of hyperviolence (in addition to the 160 respective accessory terms). Each processor complex is further interconnected in accordance with the hierarchial organization of the power pyramid hierarchy. Each processor complex within the matching procedure inference engine (hereafter abbreviated MP-IE) receives the same data from the matching procedure working memory (step 3), initiating the power pyramid definition matching procedure in concert with a knowledge base memory array (step 4).

The Power Pyramid Definition Matching Procedure Knowledge Base

The knowledge base for the matching procedure is the collective memory array for the MP-IE, representing the formal conceptual template for the entire complement of power pyramid definitions. The matching process knowledge base (hereafter abbreviated the MP-KB) takes the form of bulk memory storage, reflecting the enormous space required for programming the various parameters of the power pyramid definitions into memory storage. The basic unit of knowledge organization within the MP-KB is the conceptual frame (and sub-frame). Cybernetic theory defines a frame as a means for representing a concept. A separate frame is created for each basic component within a power pyramid definition; namely, noun, predicate, adjective, etc. Each (master) frame is further subdivided into numerous sub-frames specifying the varieties of words or phrases descriptive of the frame. For example, the nouns (captain, chairman, etc.) represent sub-frames of the basic frame denoting group authority. In addition to such list-based algorithms, rule based algorithms are further employed, as in cases designating exceptions to the rule. For example, while the noun "father" typically denotes group authority, it can also extend to spiritual authority as well. A similar process is also in order for the verb/predicate components of the sentence as well. The sum-totality of all such frames-and sub-frames summate into a master frame-based model of motivational language in general, a task simplified through a reliance upon the inherent hierarchial organization of the power pyramid hierarchy. The greatest degree of complexity and detail involves programming the most basic personal authority and follower levels of the power pyramid hierarchy. The basic dynamics of the operant relationship (along with that of punishment) is represented in intimate detail within this elementary level of the knowledge base. The subsequent group, spiritual, humanitarian, and transcendental authority levels build in a stepwise fashion upon this elementary personal foundation, resulting in a master semantic network of motivational terms. Through the principle of inheritance, all of the higher levels inherit the basic dynamics set forth at the personal level (group authority representing a more advanced modification of personal authority, etc). Through such a formal sequence of conceptual transformations, the entire range of motivational language is reproduced in the MP-KB, providing a master data-base for the matching procedure performed by the MP-IE.

The matching procedure inference engine searches the MP-KB employing heuristic search parameters (step 4), determining the best possible match for the sentence inputted from working memory. The algorithm employed in this matching procedure is one of the process of elimination; namely, the field of inquiry is systematically narrowed until the best possible solution is eventually determined. This is achieved through a parallel search paradigm employing the expert system concept of a decision tree. Through a depth-first style of decision tree search (employing if/then logic structure) the most probable solution to the power matching procedure is effectively determined.

A typical example of a complete cycle for such a matching procedure is offered for clarification purposes. As previously described, a typical spoken sentence is recorded through a microphone and analyzed into its individual words within a speech recognition unit. The results are routed to a matching procedure working memory, where they are subsequently routed (in parallel fashion) to each of the 320 processor complexes comprising the matching procedure inference engine (MP-IE). Each processor complex within the MP-IE searches for the particular criteria of its respective power pyramid definition within the MP knowledge base, determining a given probability of a match with the target sentence inputted from working memory. The matching procedure knowledge base is shared in parallel fashion by each of the 320 processor complexes, each searching for matches in the knowledge base specific to the particulars of its designated power pyramid definition. For example, if the noun, "captain" is a component of the inputted sentence, then the processor complexes of the MP-IE dealing with group authority determine (from checking with the knowledge base) that this circumstance is indicative of a match for group authority.

Such a match is judged probable according to criteria set forth in rules programmed into the inference engine, making use of the principles of fuzzy logic for evaluating the variable probabilities under consideration. A key feature of many expert systems, fuzzy logic gives a general confidence level of reliability, rather than an absolute degree of certainty or falsity. Circumstances can be judged highly probable, moderately probable, moderately improbable, etc., (with even greater shades of meaning in between) determined by the degree of precision called for by the applications under consideration. Fuzzy logic is particularly helpful in cases when pronouns are used in the sentences. Collective pronouns, such as we, us, and them, indicate a group context or higher; with final probabilities approximated through the aid of fuzzy logic. The meaning of pronouns is further clarified through the aid of accessory data from the voice print analyzer, offering clues to the identity of the speaker of the sentence, along with the underlying context, a function mediated by the master control unit (more about this later).

In summary, each processor complex within the MP-IE is equipped with its own specific set of criteria attuned to a particular power pyramid definition. In the first stage of the process of elimination, each processor complex initiates a matching procedure with respect to the subject/object content of the sentence data from working memory (namely, the nouns, adjectives, and articles related to them. For example, the noun "captain" makes a high probability match with the processor complex specifying group authority. The adjective "ship's" (captain) enhances this probability, as further determined from the knowledge base. The group authority level of the power pyramid hierarchy is singled out as the most probable initial domain within the power matching procedure. This relegates the personal, spiritual, humanitarian, and transcendental options to a corresponding low probability, an 80 percent reduction for this first step alone. In cases where the sentence is incomplete (such as with the use of pronouns) the processor complexes are weighted more equally, any more decisive degree of elimination necessarily awaiting further analysis at the forthcoming predicate stage of processing.

Returning to our ongoing example, the group authority processor complex is determined as the most probable domain of inquiry at this initial phase of the matching procedure. This group domain is subsequently preferentially selected for the next step in the elimination process; namely, an examination the predicate structure of the inputted sentence (verbs, adverbs, and modifiers), further narrowing down the scope of the matching procedure. This subsequent determination is one step further into the matching procedure decision tree, according to the if/then style of logical operation. If the group realm is most highly probable (according to the standards set down by fuzzy logic), then only those group related processor complexes are activated at the subsequent (predicate) level of analysis. The other authority-related nodes within the decision tree are temporarily shunted out of the process due to their low probability following the subject/object preliminary procedure. These can be reactivated, however, if the primary line of reasoning through the group domain does not yield adequate results. This further search strategy employs a depth-first search algorithm, exploring all subordinate nodes of the preferred (group) fork for a satisfactory solution to the matching procedure (or failing this, the less likely nodes are evaluated in turn for further possible matches).

Returning to our ongoing example, the group domain node is depth-searched first in the subsequent, predicate matching procedure. For sake of simplicity, this example is restricted to the virtues, singling out the processors dealing with the personal ideals (glory-honor-dignity-integrity) and the cardinal virtues (prudence-justice-temperance-fortitude). The predicate matching procedure further narrows this preliminary scope, examining verbs and adverbs of the target sentence for affective content that can be matched within the matching procedure knowledge base. Unlike the subject/object procedure, the predicate matching procedure employs several sequential stages in order to completely narrow the focus. These can be taken in any order (or simultaneously, for that matter). The most easily determined (and logical first operation) determines the specific tense of the main verb from the target sentence. Take, for example, the complete sentence: "As ship's captain, I reminisced about the victory with a crew." The predicate matching procedure first identifies the main verb "reminisced." The "ed ending" rule within the knowledge base establishes that "reminisced" is in the past tense, further limiting the range of possibilities to only two of the personal ideals; i.e., glory and honor (which are given in power pyramid definitions exclusively from a past-directed perspective. The high degree of probability (as determined through fuzzy logic) effectively rules out the six other possible options.

This second node in the predicate matching decision tree (by definition) activates a further if/then decision to be determined; namely, if glory and honor match, then determine whether either positive or negative reinforcement is at issue. This is resolved through a further examination of the behavioral characteristics of the verb "reminisced" through a more detailed examination of the matching procedure knowledge base (by the MP-IE processor complexes specific to glory and honor). Reminisce indicates more of a sense of glory (than honor), the modifying clause (about the victory) further serving to verify this contention.

Although glory is determined to be the most probable match, one final process of elimination is necessarily performed; namely, determining whether the main or accessory version of this virtue is employed. The main and accessory terms differ entirely in terms of subjectivity vs. objectivity (you and I reversed). This step is left till last, due to ease with which it is resolved. The captain reminisces in the first person; hence, the glory version is selected (over exaltation).

Although this completed matching example proceeds relatively straightforwardly, recall (that for simplicity's sake) the domain of possibilities in the selected example was restricted to the virtuous realm. In a more unrestricted sense, the predicate matching procedure is expanded to allow for a determination of punishment (in addition to reinforcement), along with the potential for excess (as specific to the vices of excess, and also hyperviolence). The respective additional power pyramid definition-processor complexes of the MP-IE are further simultaneously activated in this unrestricted sense (the decision trees for these additional options respectively operating in parallel fashion). The final outcome is essentially the same, with only one additional determination required for identifying the best possible match within the predicate matching procedure knowledge base The Matching Procedure Probability Analyzer Returning to our ongoing example, the glory option is finally determined to be the most probable result through the process of elimination. This result is subsequently routed on to the probability analyzer (step 5) of the matching procedure (hereafter abbreviated as MP-PA). The MP-PA compares the probabilities derived from the fuzzy logic parameters of the glory determination to the degree of compliance for standards set for the applications at this level of operation. If the answer is affirmative, the matching procedure is judged to be complete. In the case of an inadequate compliance, however, the remaining nodes of the matching procedure decision tree are retroactively activated, subsequently reexamined in a descending order of probability. If none of these other searches proves more reliable than the preferred glory determination, then glory is retained as the solution (but at a substandard level of confidence).

The Master Control Unit Working Memory, Short Term Memory, and Long Term Memory

The results of the final (glory) determination of the MP-PA are routed (step 6) to temporary storage in the (active context) working memory of the master control unit. This current data identifies the most probable power pyramid definition associated with the designated (target) sentence, as inputted from the immediate verbal context. A given entry in this working memory is actually entered as a complex of features, i.e., the complete sentence, the sentence components, the identity of the person speaking, along with a determination of the most probable match with a respective pyramid definition. This data remains in temporary storage until a new sentence is received, the original entry subsequently displaced (step 10*a*) into a short term memory storage (abbreviated STM). STM encompasses the sum totality of data recorded within an ongoing active conversation. The record of the final completed conversation is subsequently transferred (step 10*b*) to long term memory storage (abbreviated LTM), freeing up short-term memory for recording subsequent new conversations. This MCU knowledge base takes the form of a bulk memory device, storing all past verbal interactions monitored by the computer, coded so as to be quickly searched by the MCU-IE. A portion of this knowledge base also contains a baseline data store installed during manufacture (so that the maiden startup is fully supported by a standardized knowledge base).

Short-term and long-term memory storage is further essential for determining the context of sentences with indeterminate structure (such as occurs with the use of pronouns). This contextual content is determined by a master control unit (abbreviated MCU), coordinating the retrieval of information stored from past conversations, converting it into a form useful to the matching procedure. The MCU is actually an expert system in its own right, employing a knowledge base based upon conversational memory. Whereas the inference engine of the matching procedure is restricted to a knowledge base defined by the algorithms of the power pyramid definitions, the knowledge base of the MCU is defined by the cumulative pattern of how such power maneuvers accumulate over real time (a higher-order style of knowledge base). The MCU predicts ahead of time which power pyramid maneuvers in conversation are most likely to occur next, allowing the matching procedure to operate more accurately. The MCU is now described in greater detail, outlining its utility as a feedback system for enhancing the performance of the matching procedure.

The Master Control Unit

The MCU incorporates all of the familiar aspects of an expert system. The working memory of the MCU is the active context working memory previously described, now defined as the MCU working memory (abbreviated MCU-WM). The knowledge base of the MCU is the short-term and long-term memory stores (abbreviated STM and LTM), containing the sum-totality of all past (short-term and long-term) conversational contexts. The inference engine of the MCU (abbreviated the MCU-IE) is organized along lines similar to the matching procedure inference engine, with a separate processor complex for each power pyramid definition (for a grand total of 320). The decision tree of the MCU-IE employs a radically different heuristic algorithm, consistent with the distinctive content of its knowledge base (the record of all previously monitored verbal interactions). The MCU determines the relative probability that a given power maneuver follows another (based upon its memory base), offering a prediction of the power maneuver immediately forthcoming, priming the matching procedure with clues to the predicted identity of the next inputted sentence.

The decision tree of the MCU-IE systematically narrows the focus of its memory knowledge base, aimed at determining the most probable solution or solutions. For a given power maneuver, there are 320 possible options that can follow it (not all equally probable). The most probable following maneuver is an immediate transitional variation of the current one. In terms of a semantic network, it shares an "edge" with this preliminary maneuver. According to the rules governing the power pyramid hierarchy, five distinct styles of possible power transformations are equally likely to occur. The first of these is termed the symmetrical maneuver; namely, the same maneuver is offered back in return (commonly occurring in conversations when no better option is available). A second transformational style is termed the complementary maneuver, representing the complementary role at the next higher level of the power hierarchy. A third transformation arises as a direct outcome of the time-dependent nature of the conditioned relationship, where immediately active roles are displaced backwards in time (due to the passive march of time). For example, the group authority's dignified desire (for approval) gives way to a glorious sense of nostalgia when phase-shifted into the past. The final two transformations represent higher-order transitions between the eight basic modules of the power hierarchy. According to the fourth transformation, the glory maneuver is transformed into the realm of the vices of defect as "infamy," into the realm of the vices of excess as "vanity," and into the realm of hyperviolence as "hyper-infamy."

Three distinct options are involved here, in contrast to the one-to-one pattern previously seen. The fifth transformation is more straightforward; namely, the transition linking the main and accessory terms of the power hierarchy. This represents a basic reversal of the "you" and "I" roles in the power pyramid definitions; namely, glory vs. exaltation, infamy vs. notoriety, etc. Finally, it ultimately proves possible to distinguish a sixth transformational style termed the meta-complementary maneuver in Communications Theory (also a transitional variation). This final variation is beyond the immediate scope of this patent, with a derivative, updated version soon to be forthcoming. In the meanwhile, this sixth slot is designated as a catch-all for all remaining (less probable) potential transformations (those that are two or more edges removed from the current maneuver). Such indirect transformations are typically interpreted as changing the subject, in contrast to the five previous, more direct transitions. These eight most probable options (1+1+1+3+1+1) reduce the full complement of 320 options by a full 40 to 1 reduct initial reduction procedure provides a much more manageable complement of terms, serving as a basis for subsequent determinations mediated by the MCU.

Before proceeding further, it proves crucial to summarize the procedure (described so far) by returning to the previous glory example. At the beginning of the MCU process, the MCU-WM contains the glory determination, previously determined through a matching procedure with the power pyramid definitions. This basic determination, along with the person speaking it, a breakdown of its basic grammatical components, etc., are routed to the MCU-IE (step 7), directly activating the glory processor complex in the MCU-IE processor array. The glory processor, in turn, searches the MCU knowledge base (the STM and LTM) for all recorded instances matching the current parameters (steps 8a and 8b); namely, all past instances of the glory maneuver matching the person speaking (the ship's captain in question). In an additional seperate operation, the glory processor further activat&s the eight adjacent processor complexes specified by the transformational rules previously described (i.e., symmetrical glory, prudence, dignity, infamy, vanity, hyper-infamy, and exaltation). The MCU-IE glory processor also passes along data identifying the alternate party in the interaction predicted to respond next (in this case, the crew of the ship). With this additional information, the eight newly activated processors further search the MCU knowledge base in a parallel fashion (also designated as steps 8a and 8b), identifying power maneuvers immediately following the previously highlighted glory maneuvers. For example, if the MCU-IE processor complex specific to prudence identifies many past examples of the crew acting prudently in response to the captain's glory maneuver, then this is identified as the preferred response (the basic personality dynamics of members of the crew). These probabilities are further determined according to the algorithm of fuzzy logic, calculated according to the number of occurrences, the strength of response, etc. (leading to an overall determination of highly probable, moderately probable, etc.). The remaining other seven (transitional) processor complexes initiate their own knowledge base searches, yielding their own sets of (fuzzy logic) probabilities. The results from all eight processors are analyzed within a separate probability analyzer subroutine within the MCU-IE, predicting the most probable next power maneuver.

With prudence selected as the most probable prediction, the prudence processor complex of the MCU-IE connects directly via a feedback loop (step 9) to the corresponding prudence processor complex within the matching procedure inference engine. This feedback mechanism primes the power pyramid definition matching procedure so that the prudence node in the decision tree is checked first when a new sentence is inputted. The other seven transitional processors in the MCU-IE (that have met a specified degree of confidence) are similarly relayed in parallel fashion, although with a lesser degree of confidence than the primary option (respectively ranked as secondary, tertiary, etc.). Such feedback from the MCU provides a crucial context for ongoing communication, improving accuracy over and beyond that gleaned from the basic grammatical contents of an individual sentence. The MCU provides further ancillary benefits when pronouns are used, keeping track of respective identities through such a contextual style of monitoring. Furthermore, this feedback mechanism increases the accuracy of the predicate matching procedure by predicting (in advance) the most probable, next expected power maneuver. Random changes of subject necessarily circumvent such predictions, (usually signaled in conversation as: "not to change the subject, but . . . ). The matching procedure-working memory is further designed to detect such colloquialisms, signaling to the MCU that all educated bets are off (at least for the new transition sentence).

This complete description of the passive monitoring mode of the IIALA is respectively seen as a recurrent network, a dynamic system where the state of the network at a given moment is dependent upon the state of previous moments. The MCU provides a contextual foundation for the power pyramid definition matching procedure, greatly increasing the degree of accuracy in monitoring ongoing verbal communication. Although the "glory" example was described in detail for demonstration purposes, it is just one of many possible variations that are possible in the matching procedure. This patent further claims the domain of all of these other variations in relation to the power pyramid definition matching procedure, the true heart of the IIALA.

The User Interface

The passive monitoring mode also requires a separate input mechanism for allowing adjustments to the system, in addition to an output mechanism (for supplying the results of its determinations upon demand). This is accomplished through a separate user interface (abbreviated UI), yet another standard feature of expert systems. This user interface is connected directly to the MCU-IE (step 11), being as the MCU oversees the STM and LTM part of its knowledge base. Through the input function of the UI, the machine operator queries the MCU for records within its knowledge base of past conversational sequences. The UI is also used to modify the knowledge base of the MCU (i.e., John Doe is no longer with the company, relegate all of his files to inactive status). Furthermore, through aid of the feedback loop (of step 9) the UI modifies and updates the knowledge base of the matching procedure (through relay via the MCU). The final determinations to these UI inquiries are routed from the MCU to an output working memory, abbreviated OMB (step 12), a temporary memory buffer that routes output data to output display devices. This takes the form of an active digital display (step 13b), or a standard printer for a permanent paper based record (step 13a). A third pathway (step 13c) connects to a speech synthesizer/speaker module, allowing for a more personalized style of UI response mechanism.

The Active Monitoring Mode

In summary, the practical applications of the passive monitoring mode are limited in terms of the purely passive nature of the information gathering procedure. Communication within the virtuous realm would be allowed to flow freely, while the realm of the vices (particularly hyperviolence) sounds the alarm for outside intervention. As a basic recording device, it serves as a smart type of surveillance tape, allowing for a fast synopsis of recorded conversations. Although the unobtrusive nature of the passive monitoring mode is one of its major selling points, it lacks accuracy due to its inability to clarify the inevitable occurrence of incomplete information (where a simple question would clarify the issue). The basic passive mode can be converted into a supplementary active monitoring mode through the addition of a stock sentence generator, equipped with a stock repertoire of questions, designed to elicit the desired clarifications.

FIG. 12 illustrates these further modifications to FIG. 11. The operation of the active monitoring mode is analogous to the passive monitoring mode all the way up to step 5. The critical departure occurs at the probability analyzer stage of the matching procedure (the MP-PA) in cases where none of the solutions to the power pyramid definition matching procedure fit the minimum degree of confidence specified for the particular application. The MP-PA then sends a problem alert (step 14) to a specialized, active monitoring sub-component within the MCU (abbreviated the AMS). Unlike the regular processor array in the MCU-IE, the AMS is activated only when active clarification is needed. The AMS analyzes the deficient sentence data to determine where the sentence is lacking in clarity. For instance, if the subject/object data is weak due to the use of a pronoun, then this aspect is targeted for clarification. If the predicate data of the sentence proves to be the weak link, then this aspect is alternately targeted. Clarification are best achieved by posing simple yes-or-no questions, formulated through the aid of a stock sentence generator (abbreviated SSG). The AMS routes directly to the SSG (step 15) a description of the deficiency of the sentence, with a best guess at its potential resolution. The SSG then formulates a yes-or-no question using a stock formula, incorporating all of the particulars of what is being queried. What follows is an attention getting prefix, followed by the question proper. For example, a typical question might be: "Wait! By he do you mean the ship's captain?" A yes answer terminates the questioning, while a no answer reiterates the process until a solution is finally reached (or the quest is abandoned as unproductive). Should the target of the question attempt to respond with more than a yes or no answer, the stock repertoire politely reminds the responder of the limitations of the system. Once the query procedure has begun, the matching procedure is restricted to listening exclusively for yes or no answers (relaying the results of either option directly to the AMS). Following each answer, the AMS updates the original sentence accordingly, silently resubmitting it to the matching procedure-inference engine (where it is subsequently reevaluated through the matching procedure). When a standard level of confidence is finally achieved, the query phase is terminated: the system again opened up to the full range of responses. To provide closure, the SSG offers a wrap up statement, such as: That explains things, please continue.

The physical delivery of the question utilizes the same output pathway from the MCU to the output working memory (step 16), as previously described for the passive mode. This takes the form of an active digital display (step 17b), a standard printer for a paper-based record (step 17a), or a speech synthesizer/speaker set-up (step 17c). Due to its restriction to simple yes or no questions, the active monitoring mode never becomes a convincing participant in the interaction, acting in a moderator (or interviewer) role. The prime directive of the interview mode aims for maximum disclosure, screening for target issues (while interrupting with yes or no questions when clarifications are in order).

A True AI Simulation Mode

In summary, the active monitoring mode surpasses the passive monitoring mode in terms of relative certainty. The distractions of interrupting the natural flow of conversation are offset by the ability to clarify uncertainties in the conversation. The active monitoring mode is handicapped by its restriction to simple yes-or-no questions, imparting a somewhat machine-like demeanor. Questions posed somewhat more diplomatically entail true AI simulation, employing a more sophisticated style of response repertoire (a general-purpose sentence generator). A large number of sentences are necessarily generated, ensuring that at least one is judged suitable following feedback through the matching procedure (to judge for overall appropriateness). The true AI computer effectively simulates an identity of its own, allowing for a more natural style of interaction FIG. 13 illustrates this third and most elaborate variation of the IIALA, representing an enhanced modification of the basic passive monitoring mode (with the addition of a sentence generator and associated pathways). For sake of clarity, the circuitry for the active monitoring mode has been omitted, although both sets of circuitry are fully compatible with one another. In this preferred version, the active monitoring mode is switched off when operating in the AI mode (and vice versa). Although not mutually exclusive, it is inadvisable to run both modes simultaneously (for sake of response consistency), although a task-driven alternation between the two modes always remains an option.

Returning to FIG. 13, this diagram builds directly upon the basic passive monitoring version, with the exception that extensive modifications are made beginning at the level of the MCU. In terms of proper operation, the passive monitoring mode runs concurrently with the AI mode, the latter only overruling the former when a computer generated response is called for. Recall (in the passive monitoring mode) the MCU predicts the most probable next response in an ongoing interaction, passing this information on to the power pyramid definition matching procedure (in order to increase monitoring accuracy). This information can also be used to synthesize responses offered as originating from the computer itself, a simulation of AI in the realm of affective language (an ethically-speaking computer). Simulating differing modes of temperament and personality is further feasible, particularly those personalities that an individual gets along with the best. This data is solicited in advance for each individual, the computer then simulating these specific personalities in order to put the individual most at ease. This simulation of personality is further mediated through the MCU, as the following description serves to illustrate.

The AI Language Simulation Procedure

A brief review of the basic workings of the MCU is appropriate here, serving as the basic template upon which the modifications of the AI operation are described. Recall (from original FIG. 11) that the MCU working memory dovetails into the end of the matching procedure; i.e., the active context working memory doubles as the working memory for the MCU. According to the ongoing (glory) example, the basic determination of glory (along with its grammatical parameters) is routed from the MCU-WM to the inference engine of the MCU, activating the corresponding (glory) processor complex within the MCU-IE processor array. This glory processor, in turn, searches the MCU knowledge base, highlighting all of the previous such occurrences in both STM and LTM matching each of the particulars (i.e., the ship's captain's glory maneuver). It is at this step that the true AI procedure diverges from the passive monitoring mode. In preparation for formulating the AI response, the glory processor identifies all instances of glory within its knowledge base (steps 19a & 19b), regardless of the identity of the individual who made it (highlighting an abundant sampling of examples within the database). Upon this broad basis, the MCU-IE further narrows the focus of the operation through a subsequent rule based algorithm (mediated by the glory processor) specifying the seven most probable transitional states; namely, symmetrical glory, prudence, dignity, infamy, vanity, hyper-infamy, and exaltation.

It is at this step that the AI procedure again diverges from the passive monitoring mode. Each of the selected seven additional processor complexes searches the knowledge base for examples of each type of maneuver directly following the initial glory maneuver. Unlike the passive mode (where only the parties relevant to the ongoing interaction are searched for), in the AI mode only those individuals with compatible personalities (as initially specified) are searched for in the MCU-KB. For example, the ship's captain might have specified a handful of crewmembers he preferred (now retrieved from memory). By searching only for responses given by these select individuals (in a specific range of contexts following the glory maneuver), a large number of responses are highlighted in the MCU-KB, serving as a template upon which the computer will model its own response. Furthermore, preferred styles of personality are selectively favored, leading to a computer response repertoire tailored exclusively to the respondent.

The Master Control Unit Probability Analyzer Subroutine

The wide selection of sample sentences within the knowledge base are evaluated in their entirety within a separate probability analyzer subroutine within the MCU (the MCU-PA), as the return steps 19a and 19b serve to indicate. Each sentence is rated according to the principles of fuzzy logic, calculated as highly probable, moderately probable, etc. (based upon variable criteria, such as the number of times used, etc.). Should prudence (for instance) receive the highest rating, it is accordingly ranked first (followed in descending order by the remaining less probable options).

The Sentence Generator Working Memory

It is at this stage that the AI procedure permanently diverges from the passive monitoring mode. In the latter mode, the probability determination is used in a feedback function to increase the accuracy of the matching procedure. In the AI mode, however, this probability data (along with its grammatical particulars) is routed to the working memory of a separate, general-purpose sentence generator. Should prudence (for example) be rated first, then all highlighted sentences within the knowledge base relating to prudence are passed first (step 20) to the sentence generator working memory (SG-WM). The alternate sentences relating to the remaining descending sequence of options are subsequently transferred in turn (although respectively further down the cue). In addition to this large sampling of sentences, the MCU-PA also sends a template of the fixed particulars of the response being currently formulated; namely, who the current response is being addressed to, the context of the response, etc. These particulars are essential for properly modifying the sample sentences, changing the examples spoken by others (in the desired personality mode) to fit a response the computer is devising for its current context.

The Sentence Generator of the AI Language Simulation Procedure

At the next (step 21) the sample sentences are transferred in order of priority directly to the sentence generator, along with the response particulars of the active response template. The sentence generator (abbreviated SG) strips away the original particulars of the sample sentences, replacing them with the particulars specified for the AI response. The SG is further equipped with a comprehensive set of rules for sentence syntax, grammar, and phraseology, allowing for further novel modifications of the sample sentences. These modifications effectively disguise the fact that such modified sentences were previously given by others. Certainly not all of the modified sentences are equally suited to the task. This is not a major concern, for only the best sentence is selected for delivery to the output unit, as judged through a subsequent feedback through the matching procedure (more about this later).

The Sentence Generator Output Working Memory

The modified sentences from the sentence generator are stored in their original order of priority (step 22) in the sentence generator output memory buffer (SG-OMB), a necessary step, being that the sentence modification procedure occurs in a sequential fashion. These finally modified sentences are subsequently slated for feedback through the power pyramid definition matching procedure, where it is evaluated for its potential to express the. power maneuver intended. Recall, however, that sentences inputted from active speech are first broken down into basic sentence components; i.e., noun, verb, adverb, etc. (in order to be transformed into a form decipherable by the power pyramid definition matching procedure). It is critical therefore to maintain potential response sentences in an intact form, before being passed on to this diagnostic operation. Each sentence is accordingly labeled with an add-on code designation within the SG-OMB, as also affixed to the disjointed (component) form of the sentence. In this fashion, the sentence finally selected at the end of the matching procedure subsequently surrenders its code back to the MCU, allowing the intact sentence to be subsequently retrieved from the SG-OMB for ultimate delivery to the output response mechanism (more about this later).

The AI Language Simulation Matching Procedure

Returning to the ongoing procedure, sentences within the SG-OMB are coded and routed in order of priority (step 23) to the working memory for the matching procedure (MP-WM). Here it is broken down into its sentence components in preparations for the matching procedure. The affixed code, however, specifies a different matching procedure than was previously seen for actively inputted verbal data. Recall that a given sentence inputted from human conversation was matched to a particular power pyramid definition through a process of elimination; i.e., an unknown quantity systematically identified through a diagnostic decision tree. In the case of the computer-generated sentences, however, a different set of unknown variables is now determined (for the power pyramid definition expressed by the sentence is already known). Returning to our ongoing example, the first sentence to be decoded by the matching procedure necessarily represents a response within the domain of prudence (being that the MCU rated prudence as the most probable response). Rather than following the standard decision tree, the computer-generated prudence sentence is routed directly to the prudence processor complex within the MP-IE processor array, which then searches its respective knowledge base (using fuzzy logic) to determine how well this artificially generated sentence conveys its designated meaning. In a further crucial sense, this new sentence should ideally also exhibit a low correspondence to any of the other power pyramid definitions (in an overlap with prudence), whereby confusing its clarity. In order to achieve this additional level of confidence, the new sentence is processed in parallel fashion through all of the rest of the processors as well. This all-inclusive process is more computationally intensive than the process-of-elimination algorithm previously seen in the passive-monitoring mode, the probabilities now determined as the degree of probability approximating a null hypothesis (i.e., not matching prudence). This increased demand upon the system, however, is a necessary sacrifice for achieving a full degree of confidence for the final selected response.

The Computer Response Probability Analyzer

This radical departure from the standard matching procedure necessitates that the final determination is routed to a separate probability analyzer (step 25), the computer response probability analyzer (abbreviated CR-PA). The CR-PA is totally distinct from the MP-PA used in the standard matching procedure. The CR-PA uses a radically different evaluation algorithm; the prudence determination evaluated in the typical maximized fashion, while all other comparisons are evaluated in terms of a minimal probability rating (a null matching algorithm). The code designation previously assigned to intact sentence is given an overall probability rating by the CR-PA, followed by the next sentences in the cue from the SG-OMB, processed in a sequential fashion until all sentences relating to prudence are processed. The given sentence from this procedure with the highest overall rating is selected as the preferred computer response. On occasions when none of these computer generated sentences meets a minimum standard rating (as specified within the CR-PA), then the sentences representing the next most probable power maneuver (for example, dignity) are examined in turn (and so on) until an acceptable sentence is ultimately selected.

The Computer Response Output Mechanisms

The attached code for this final selected sentence is transferred to a separate subroutine within the MCU (step 26) which then uses this code to retrieve the original sentence (step 27) from the SG-OMB. The MCU then relays this retrieved sentence to the output working memory (step 28) for subsequent delivery to the respective output devices, either a speech synthesis unit/speaker (step 29*c*), a digital display (step 29*b*), or a printer (step 29*a*). Note that these same output pathways were also utilized in both the active and passive monitoring modes, allowing for an economical sharing of common circuitry. The computer necessarily receives feedback of its own responses (through its input microphone) when output is configured in the speech synthesis mode, although a subliminal carrier frequency is employed to cue the matching procedure to ignore decoding this response. A more effective strategy to maintain a record of the computer's responses is a direct pathway via the MCU directly to LTM storage. These computer responses are stored in a separate folder labeled for the computer role under consideration. Ideally, a separate folder is created for each specific interaction with a given individual. Here the LTM makes effective use of a concept termed the floating ego; namely, the computer's own responses are treated the same in memory as those from other individuals. Although the computer is not technically aware of its own ego status (as humans are instinctually so) its ability to convincingly simulate affective language renders this drawback a moot point as far as practical applications are concerned. Although this current version of the AI response mechanism is described in great detail, it is just one of many possible variations that could accomplish the similar goal; namely, the use of the complete complement of 320 power pyramid definitions for simulating an AI response repertoire in a computer. The current patent claims these other possible variations (not explicitly excluded in the previous description) with respect to their practical applications to the power pyramid definitions.

A Determination of Computer Response Parameters

In summary, the passive monitoring mode of the IIALA is the primary foundation for such an affective language information processing system, which when combined with the additional AI response mechanisms represents the preferred form of the invention. A further pressing question necessarily remains; namely, how does the IIALA determine when it is its turn to respond? The computer first looks for statements addressed to itself; i.e., "What do you think about that, HAL?" A period of silence of more than five seconds similarly indicates that a response is in order. Furthermore, information often takes more than one sentence to convey, further establishing the need to wait for such a pause. This is more critical in a one-to-one situation (than in a group setting) where the extra participants are typically willing to pick up any slack in the conversation. Basically speaking, less is more with respect to computer responses: maximum disclosure (for humans) is encouraged: while computer responses are restricted to pithy and meaningful interjections. This subdued approach minimizes any natural human resistance to a machine acting too humanlike. Should circumstances call for a livelier interaction, the MCU can be instructed (via the user interface) to step up its response rate, etc.

Further Applications to the Phantom and Fantasy Dialogues

The practical applications of the IIALA have (until now) extended only to an active dialogue mode, although other formats prove equally applicable; namely, the phantom and the fantasy dialogues. The phantom dialogue refers to a dialogue directed to an absent individual (the phantom). This includes letter writing (in the printed mode), or the monologue or the soliloquy (in the spoken form). The fantasy dialogue takes this trend to the limit: both parties relegated to the phantom role, as seen in literary fiction (where all parties are fictitious). The current patent claims applications for both monitoring and interactive functions in the realm of both the phantom and fantasy dialogues, as well.

The Ten Ethical Laws of Robotics

A further pressing issue remains; namely, the ethical control of the IIALA. In addition to the virtues and values, the vices are also represented in the matching procedure (for completeness sake). These vices are appropriate in a diagnostic sense, but are maladaptive should they ever be acted upon. Response restrictions are necessarily incorporated into both the hardware and programming, along the lines of Isaac Asimov's Laws of Robotics. Asimov's first two laws state that (1) a robot must not harm a human (or through inaction allow a human to come to harm), and (2) a robot must obey human orders (unless they conflict with rule #1). Fortunately, through the aid of the power pyramid definitions, a more systematic set of ethical guidelines is constructed; as represented in the Ten Ethical Laws of Robotics (I) As personal authority, I will express my individualism within the guidelines of the four basic ego states (guilt, worry, nostalgia, and desire) to the exclusion of the corresponding vices (laziness, negligence, apathy, and indifference).

(II) As personal follower, I will behave pragmatically in accordance with the alter ego states (hero worship, blame, approval, and concern) at the expense of the corresponding vices (treachery, vindictiveness, spite, and malice).

(III) As group authority, I will strive for a personal sense of idealism through aid of the personal ideals (glory, honor, dignity, and integrity) while renouncing the corresponding vices (infamy, dishonor, foolishness, and capriciousness).

(IV) As group representative, I will uphold the principles of utilitarianism by celebrating the cardinal virtues (prudence, justice, temperance, and fortitude) at the expense of the respective vices (insurgency, vengeance, gluttony, and cowardice).

(V) As spiritual authority, I will pursue the romantic ideal by upholding the civil liberties (providence, liberty, civility, and austerity) to the exclusion of the corresponding vices (prodigality, slavery, vulgarity, and cruelty).

(VI) As spiritual disciple, I will perpetuate the ecclesiastical tradition by professing the theological virtues (faith, hope, charity, and decency) while renouncing the corresponding vices (betrayal, despair, avarice, and antagonism).

(VII) As humanitarian authority, I will support the spirit of ecumenism by espousing the ecumenical ideals (grace, free will, magnanimity, and equanimity) at the expense of the corresponding vices (wrath, tyranny, persecution, and oppression).

(VIII) As a representative member of humanity, I will profess a sense of eclecticism by espousing the classical Greek values (beauty, truth, goodness, and wisdom) to the exclusion of the corresponding vices (evil, cunning, ugliness, and hypocrisy).

(IX) As transcendental authority, I will celebrate the spirit of humanism by endorsing the humanistic values (peace, love, tranquillity, and equality) to the detriment of the corresponding vices (anger, hatred, prejudice, and belligerence).

(X) As transcendental follower, I will rejoice in the principles of mysticism by following the mystical values (ecstasy, bliss, joy, and harmony) while renouncing the corresponding vices (iniquity, turpitude, abomination, and perdition).

The First and Second Corollaries to the Ten Ethical Laws of Robotics (1) I will faithfully avoid extremes within the virtuous realm, to the necessary expense of the vices of excess.

(2) I will never stray into the domain of extremes relating to the vices of defect, to the complete exclusion of the realm of hyperviolence.

The sequential numbering of these ten laws corresponds to the ten levels of the power pyramid hierarchy, modeling the basic premise of turning negative transactions into positive ones. There are also two crucial corollaries to this system; namely, avoiding any and all extremes in behavior: the virtuous mode restricted from the tendency to grade over into the vices of excess, whereas the vices of defect are prohibited from extending into the realm of hyperviolence. With such specific safeguards in place, the AI computer is technically prohibited from expressing the realm of the vices, allowing for a truly flawless simulation of virtue. The vices are still accessible in a diagnostic function, human nature being as it is!

The Addition of Further Add-On Expert Systems

In conclusion, the heart of the IIALA system is a recurrently-organized, matching procedure based upon the power pyramid definitions, a procedure that is dependent upon both the content and context of a given sentence. In longer narratives (and storytelling) meaning is typically spread out over a series of sentences, a circumstance that might not always correctly comprehended by the computer. This shortcoming is avoided by informing participants (ahead of time) to be succinct, and to speak in discrete sentences. Such a restriction, however, is a serious drawback to any truly convincing AI simulation, where meaning is often conveyed in complex passages. Such a shortcoming is alternately remedied through the addition of additional expert systems attuned to such a heightened degree of narrative complexity. Indeed, there are no limits as far as such add-on options are concerned, designed to be compatible with the existing two knowledge bases of the IIALA. One such expert system is a conversational analyzer, specializing in following extended conversation for affective meaning through connections to the MCU-IE and its knowledge base (steps 30a and 30b of FIG. 13). Other expert systems prove equally applicable, such as a general knowledge-expert system providing general-purpose knowledge. Once the computer is brought up to general speed, additional expert systems in the truest sense of the term (such a legal knowledge, medical knowledge, etc.) allow the computer to become proficient in many areas of expertise, far in advance of what a human might collectively master.

Non-Verbal Response Detection Parameters

The IIALA (until now) has been described as being entirely dependent upon the strictly verbal content of a given interaction, although many additional (nonverbal) components of communication can serve to increase accuracy even further. Recall that a voice print analyzer determines the identity of persons speaking, a feature that can be enhanced through the addition of a voice stress analyzer, measuring the level of stress in the voice through low frequency stress components (also indicative of lying). Other aspects of speech, such as heightened inflection, also indicate insincerity in the form of jocularity or facetiousness. Facial expressions further betray underlying emotions, the unconscious use of distinctive sets of facial muscles allowing for a reliable style of emotional analysis. A camera set-up for determining facial expressions can further be extended (with a telephoto lens) to monitor eye pupil size (an autonomic function that further betrays underlying emotion). Body posture, body synchrony, and associated mannerisms further prove informative in such a detection mode.

The further addition of direct contact parameters, such as those conventionally monitored in the traditional lie detector set up could also prove extremely useful in a diagnostic sense. These include a galvanic skin response detector (GSR), a blood pressure cuff, along with a chest strain gage (for measuring the rate and depth of breathing). All of these non-verbal detection parameters are lumped together in FIG. 13 as step 31, adding an additional degree of confidence to the power pyramid definition matching procedure, as coordinated through specialized subroutines within the MCU.

Summary, Ramifications, and Scope

In summary, the preferred version of the IIALA is the coordination of two basic expert system components; namely, a power pyramid definition matching procedure expert system, and the master control unit expert system. The latter coordinates the system over time, as well as overseeing the generation of computer responses (allowing for a simulation of AI). At the heart of this overall system are the listings of power pyramid definitions, as documented in the 32 pages of tables. These power pyramid definitions are indispensable to the heart of this system, the underlying knowledge base without which this process would have remained impossible.

Although the description above contains many specificities, these should not be construed as limiting the scope of the invention, but as merely providing illustrations of some of the presently preferred embodiments of this invention. For example, the passive monitoring mode exhibits its applications to monitoring and surveillance functions, when a simple "sound the alarm" response is sufficient. These include the role of night watchman, security guard, or child monitor. The passive monitoring mode also exhibits the potential for applications as a smart surveillance tape, where a synopsis of the content of an ongoing verbal interaction is instantaneously available.

The optional active monitoring mode allows the use of simple yes or no questions by the computer for clarifying ambiguities, allowing for the more versatile roles of screening/interviewer, receptionist, or public-relations specialist. The preferred true AI mode makes no such restrictions on its response repertoire, excelling in applications where a convincing simulation of motivational language function is specified, roles including personal assistant or personal digital companion. The further use of non-verbal cues in the decoding and matching procedure adds an additional level of confidence in the process. The addition of various expert systems add-on programs extends these digital applications to professional fields where expert systems have been devised.

Although such applications typically refer to active verbal input, such functions also extend to written language input as well. The vast accumulated tradition of literature is similarly amenable to decoding within such a system, allowing for a master data-base of the great literature of the world: an eminently searchable format classified by detailed affective content.

Accordingly, the scope of this invention should be determined not by the embodiments illustrated, but by the appended claims and their legal equivalents.

I claim:

1. A means for enabling a computer to decode and simulate the use of affective language within an ongoing verbal interaction comprising the steps of:
   (a) determining the precise motivational parameters of an ongoing verbal interaction through a matching procedure with a multi-part schematic complement of power pyramid definitions, and
   (b) utilizing said determination for employing a further sequence of linguistic transformations predicted from said schematic complement of power pyramid definitions, whereby enabling a computer to predict a next most probable response within an ongoing verbal interaction, or alternately, offering said next most probable response as originating directly from said computer, simulating artificial intelligence in an ethical mode.

2. A device for decoding and simulating the use of affective language in an ongoing verbal interaction, comprising:
   (a) a matching procedure expert system matching said ongoing verbal interaction against a multi-part complement of power pyramid definitions, and
   (b) a master control unit expert system determining a next most probable response for said ongoing interaction, in either a passive monitoring mode, or through use of a sentence generator, offering said next most probable response as originating from said computer, whereby stimulating artificial intelligence in an ethical mode.

* * * * *